United States Patent [19]
Fiorenza et al.

[11] 4,069,488
[45] Jan. 17, 1978

[54] COMPUTER CONTROLLED DISTRIBUTION APPARATUS FOR DISTRIBUTING TRANSACTIONS TO AND FROM CONTROLLED MACHINES TOOLS

[75] Inventors: Robert M. Fiorenza, Shelbourne, Vt.; Alan J. Fleming, Poughquag, N.Y.; Ralph J. Gerlach, Austin, Tex.; Larry W. Holmstrom, Boca Raton, Fla.; John C. Pace, Wappingers Falls, N.Y.

[73] Assignee: IBM Corporation, Armonk, N.Y.

[21] Appl. No.: 673,011

[22] Filed: Apr. 2, 1976

[51] Int. Cl.² ............................................. G06F 15/46
[52] U.S. Cl. .................................. 364/474; 364/200; 364/119; 364/107
[58] Field of Search ............. 340/147 P, 147 R, 172.5; 318/562, 567; 235/151.1; 307/117

[56] References Cited
U.S. PATENT DOCUMENTS

| | | | |
|---|---|---|---|
| 3,237,164 | 2/1966 | Evans | 340/147 P |
| 3,597,743 | 8/1971 | Murphy | 445/1 |
| 3,715,725 | 2/1973 | Kievit et al. | 340/147 |
| 3,792,332 | 2/1974 | Fuller | 318/562 |
| 3,801,800 | 4/1974 | Newton | 307/117 |
| 3,949,277 | 4/1976 | Yosset | 340/147 R |

*Primary Examiner*—Eugene G. Botz
*Attorney, Agent, or Firm*—J. B. Kraft

[57] ABSTRACT

A system for controlling a plurality of machine tools in which the central processor communicates data transactions to and from a plurality of tool controllers, each of which is operatively associated with a machine tool. Each of the controllers comprises at least one machine tool control unit which is adapted to provide a digital output to the associated machine tool for controlling a particular tool function and/or for receiving from the machine tool a digital input indicative of a particular tool condition. The central processor has connected thereto a main multiple-channel data bus for conducting data transactions by transferring parallel bits of data to and from the processor. The system also includes a plurality of multiple-channel unit data buses, each of which is connected to one of the tool control units.

Data distribution apparatus in the system couple the unit data buses to the main data bus from the processor and serve to distribute the processor transactions to and from the specific tool functions of the controlled machine tools. This data distribution apparatus includes means responsive to a set of distribution signals from the central processor for selectively activating one of the tool control units and for selectively activating only the data path from the main data bus through the unit data bus which is connected to the particular selected tool control unit. The data distribution apparatus also includes means for maintaining only this activated path open through said main data bus to the central processor and for maintaining all other data paths through unit data buses which are connected to unselected tool control units closed until the central processor issues the next set of distribution signals for selectively activating another tool control unit. In accordance with another aspect of the system, at least one of said tool controllers has means for completing a tool function initiated by a data transaction from the central processor after the data transaction is completed and the processor is no longer in communication with said tool controller.

22 Claims, 57 Drawing Figures

DISTRIBUTED INTERFACE BUS SYSTEM (31)

| | | | | | | | | | | |
|---|---|---|---|---|---|---|---|---|---|---|
| OUTBUS | (93) | X0 | X1 | X2 | X3 | X4 | X5 | X6 | X7 | XP | 9 |
| INBUS | (94) | Y0 | Y1 | Y2 | Y3 | Y4 | Y5 | Y6 | Y7 | YP | 9 |
| COMMAND TAGS | (25) | | C0 | C1 | C2 | C3 | | | | | 4 |
| SYNC | (26) | | | | | | | | | | 1 |
| RETURN | (30) | | | | | | | | | | 1 |
| INTERRUPT REQUEST | | | | | | | | | | | 1 |
| INTERRUPT ACKNOWLEDGE | | | | | | | | | | | 1 |
| | | | | | | | | | NUMBER WIRES | | 26 |

MACROFUNCTION INTERFACE BUS SYSTEM (29)

| | | | | | | | | | | |
|---|---|---|---|---|---|---|---|---|---|---|
| DATA BUS (LINE 23) | D0 | D1 | D2 | D3 | D4 | D5 | D6 | D7 | DP | 9 |
| BLOCK LOGICAL SPACE ADDRESS | | | L.S. SELECT, 1–15 / MACROFUNCTION | | | | | | | 15 |
| COMMAND TAGS (LINE 25) | C0 | C1 | C2 | C3 | | | | | | 4 |
| SYNC (LINE 26) | | | | | | | | | | 1 |
| RETURN (LINE 30) | | | | | | | | | | 1 |
| INTERRUPT REQUEST | | | | | | | | | | 1 |
| INHIBIT PAR GEN | | | | | | | | | | 1 |
| | | | | | | | | NUMBER WIRES | | 32 |

INTERFACE LINE DEFINITION

FIG. 4

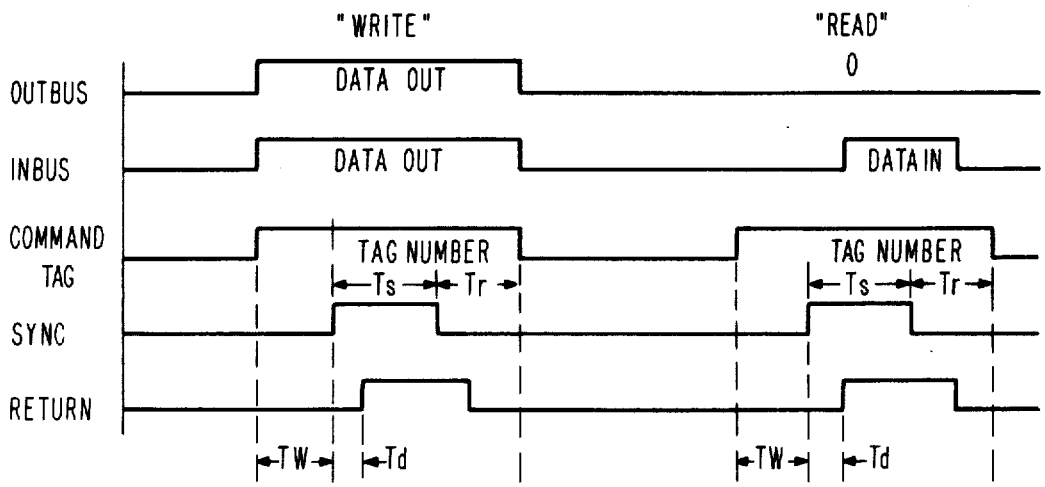

BASIC INTERFACE TIMINGS SHOWING USE OF COMMAND TAG COMBINATIONS TO IDENTIFY INFORMATION ON THE DATA BUS

FIG. 5

TOOL CONTROLLER BLOCK

TRANSFER BYTE WITH CONTROL
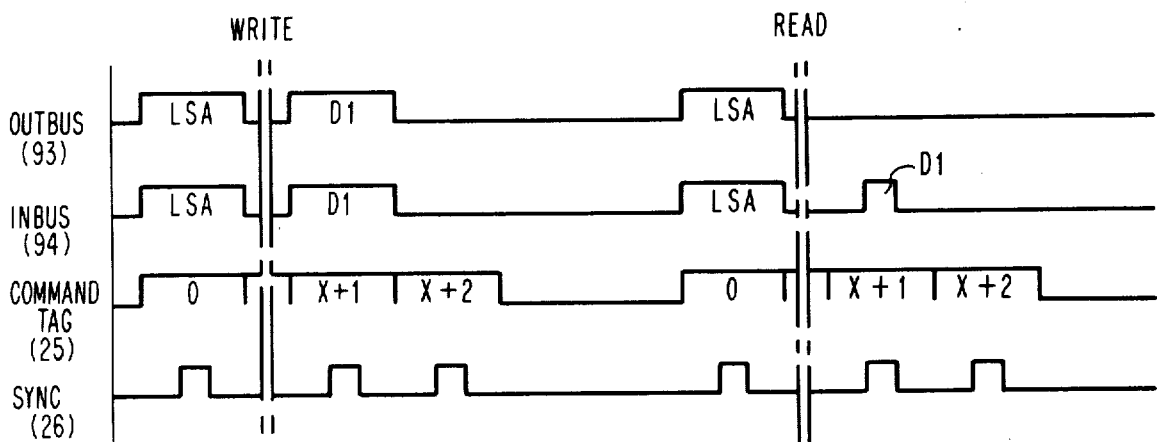
TRANSFER HALFWORD WITH CONTROL
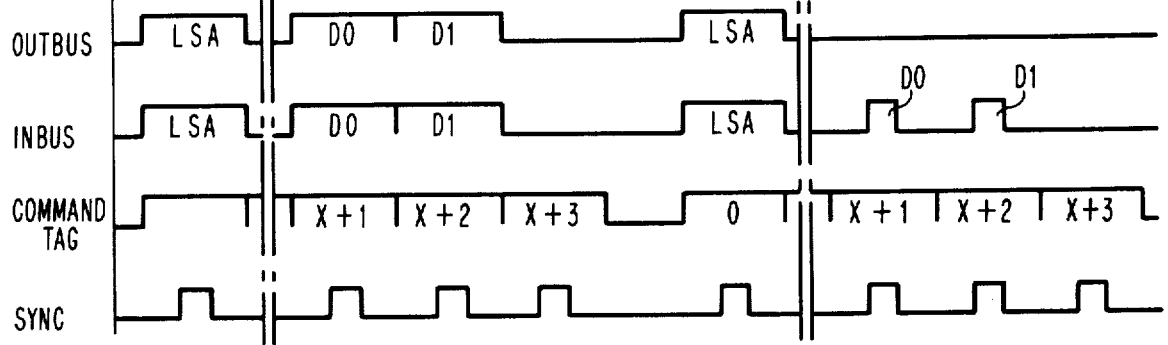
LSA — LOGIC SPACE ADDRESS
D0 — HIGH BYTE
D1 — LO BYTE
X — COMMAND TAG COMBINATION
        X = 0 RESERVED FOR LSA
        X = 1 RESERVED FOR RESET INTERRUPT REQUEST LATCH
OTHER COMMAND SEQUENCES
FIG. 8B

ASSIGNING OF BLOCK NUMBERS IN AN I/O SPACE

| 0 | 1 | 2 | 3 | 4 | 5 | 6 | 7 | | P |

| HIGH ORDER | | | | | | | LOW ORDER | |
|---|---|---|---|---|---|---|---|---|
| 128 | 64 | 32 | 16 | 8 | 4 | 2 | 1 | WEIGHT (BINARY) |
| X0 | X1 | X2 | X3 | X4 | X5 | X6 | X7 | OUTBUS |
| Y0 | Y1 | Y2 | Y3 | Y4 | Y5 | Y6 | Y7 | INBUS |
| D0 | D1 | D2 | D3 | D4 | D5 | D6 | D7 | MACROFUNCTION BUS |

| HIGH ORDER | | | | LOW ORDER | | | | |
|---|---|---|---|---|---|---|---|---|
| 0 | 1 | 2 | 3 | 4 | 5 | 6 | 7 | |
| B0 | B1 | B2 | B3 | A0 | A1 | A2 | A3 | ADDRESS |
| BLOCK NUMBER | | | | BLOCK LOGICAL SPACE OR MACRO ADDRESS | | | | |

I/O SPACE ADDRESS
OR LOGICAL SPACE ADDRESS

| HIGH ORDER | | | | | | | | | | | | | | | LOW ORDER |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| 32768 | 16384 | 8192 | 4096 | 2048 | 1024 | 512 | 256 | 128 | 64 | 32 | 16 | 8 | 4 | 2 | 1 |

HIGH (0) BYTE | LO (1) BYTE

HIGH BYTE PRECEEDS LOW BYTE OVER INTERFACE

<u>BIT CONVENTIONS</u>

FIG.12

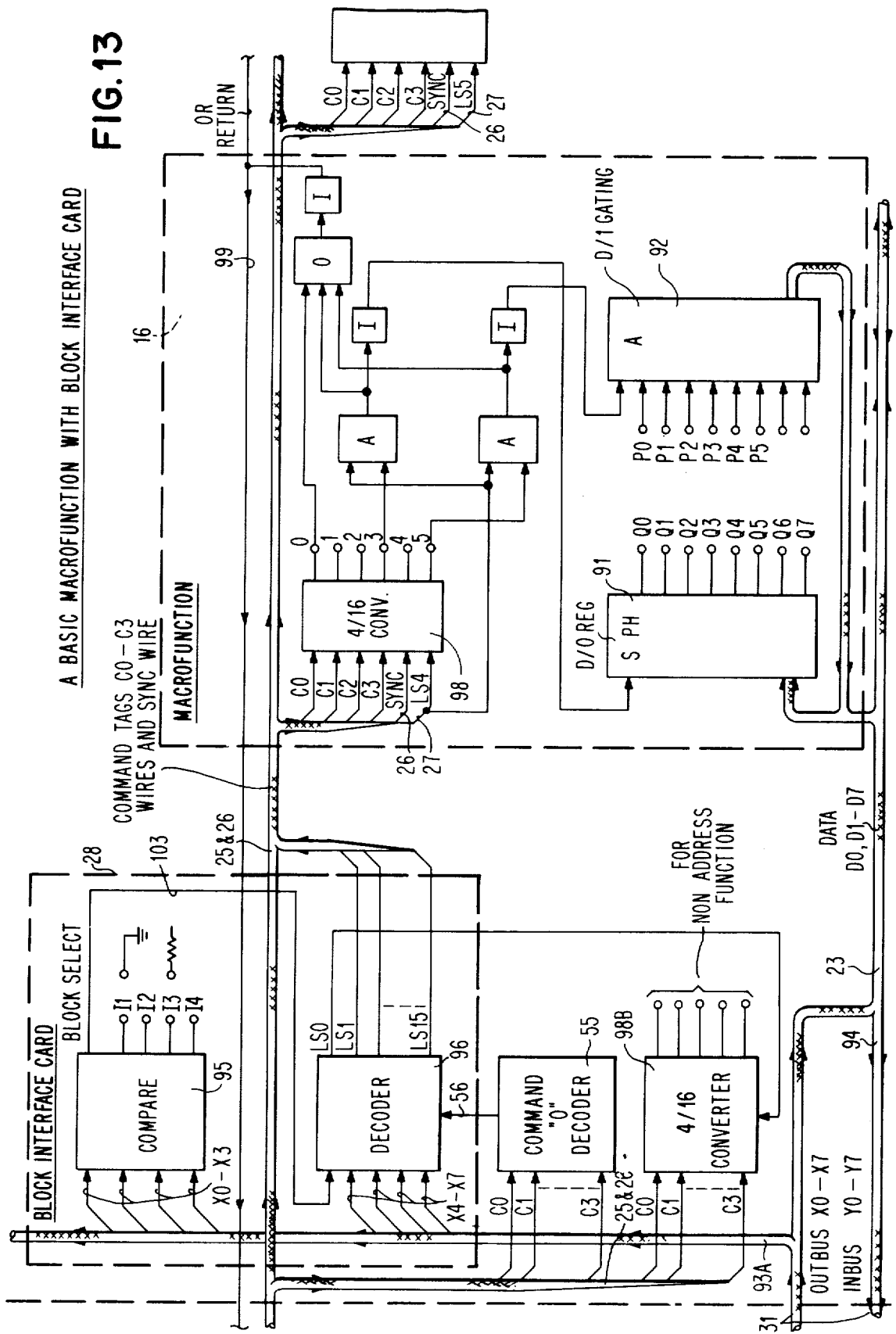

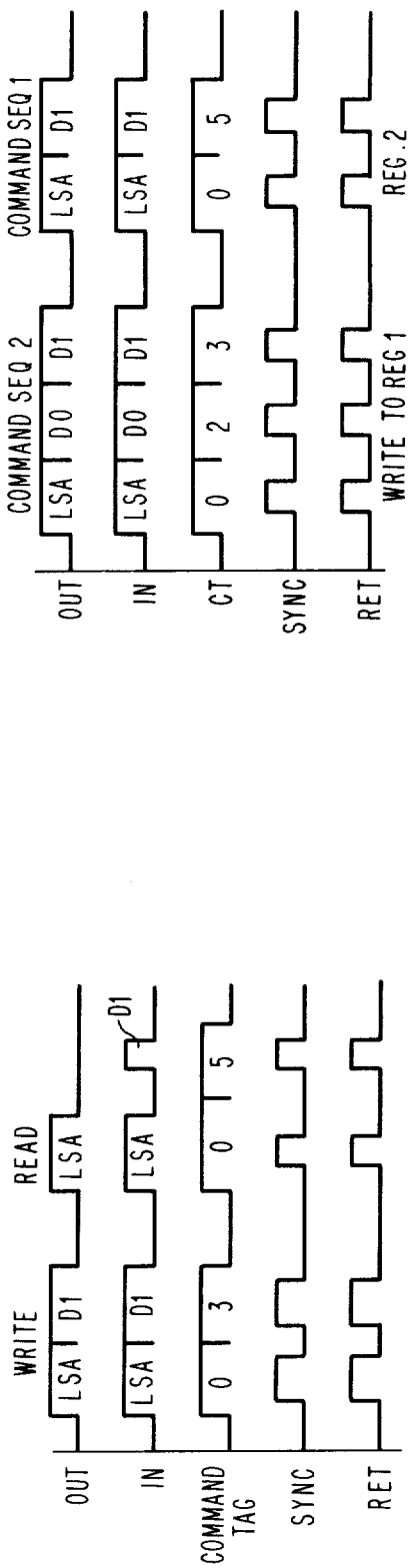
FIG. 13A
FIG. 14A
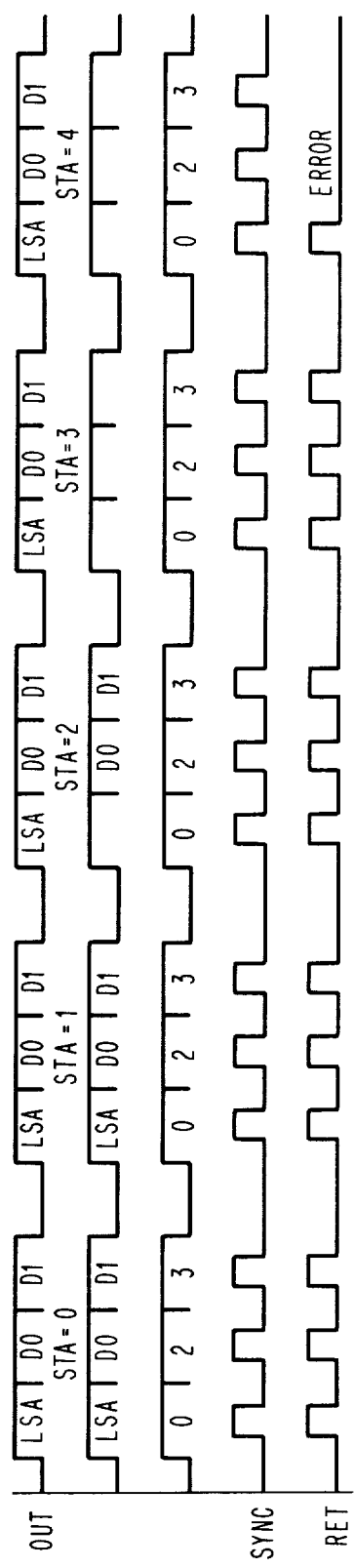
FIG. 15A

MACROFUNCTION HAVING ONE 16 BIT REGISTER AND ONE 8 BIT REGISTER

GENERATION OF TWO PULSES WITH INTERVAL TIMER AND DRIVER MACROFUNCTIONS

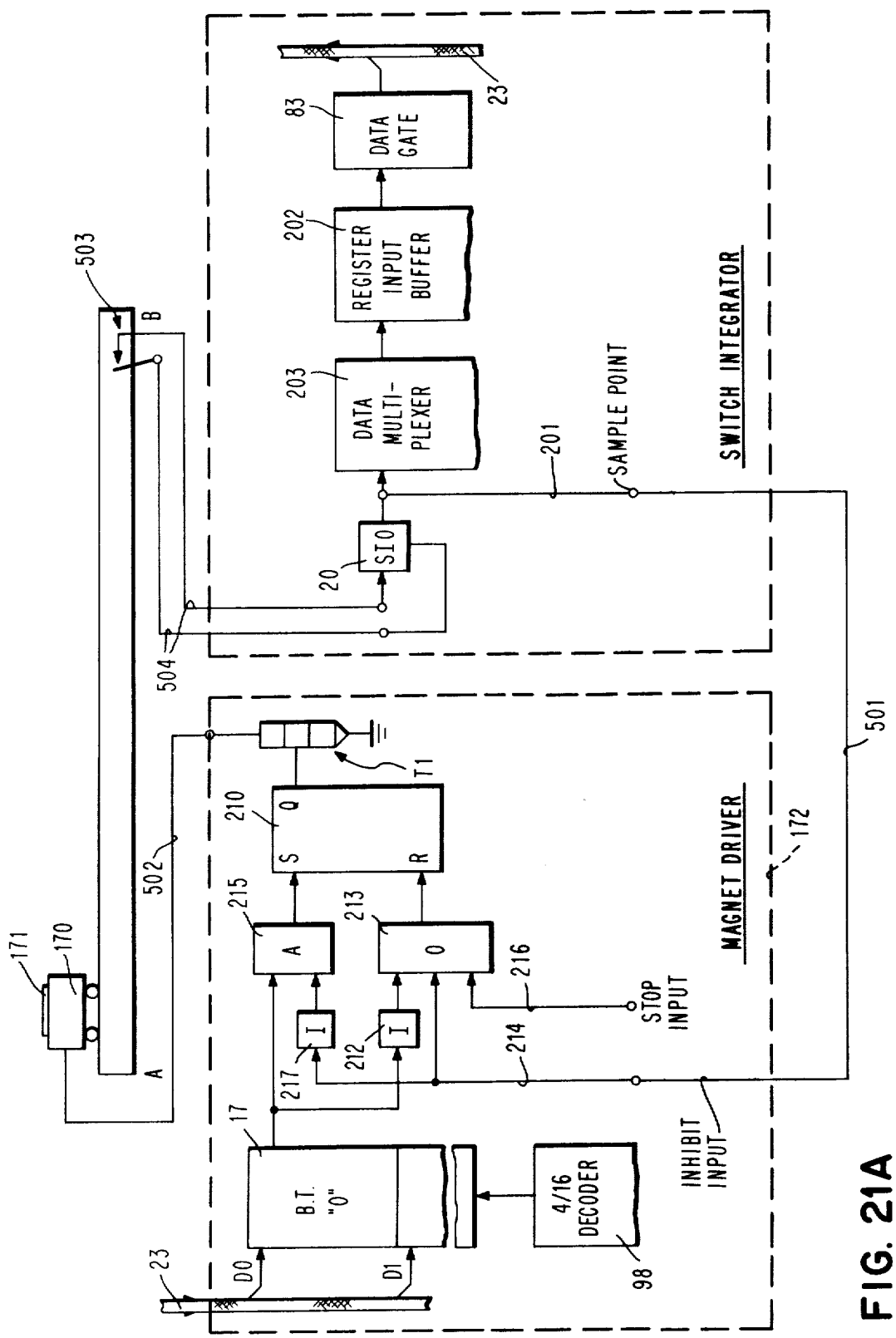

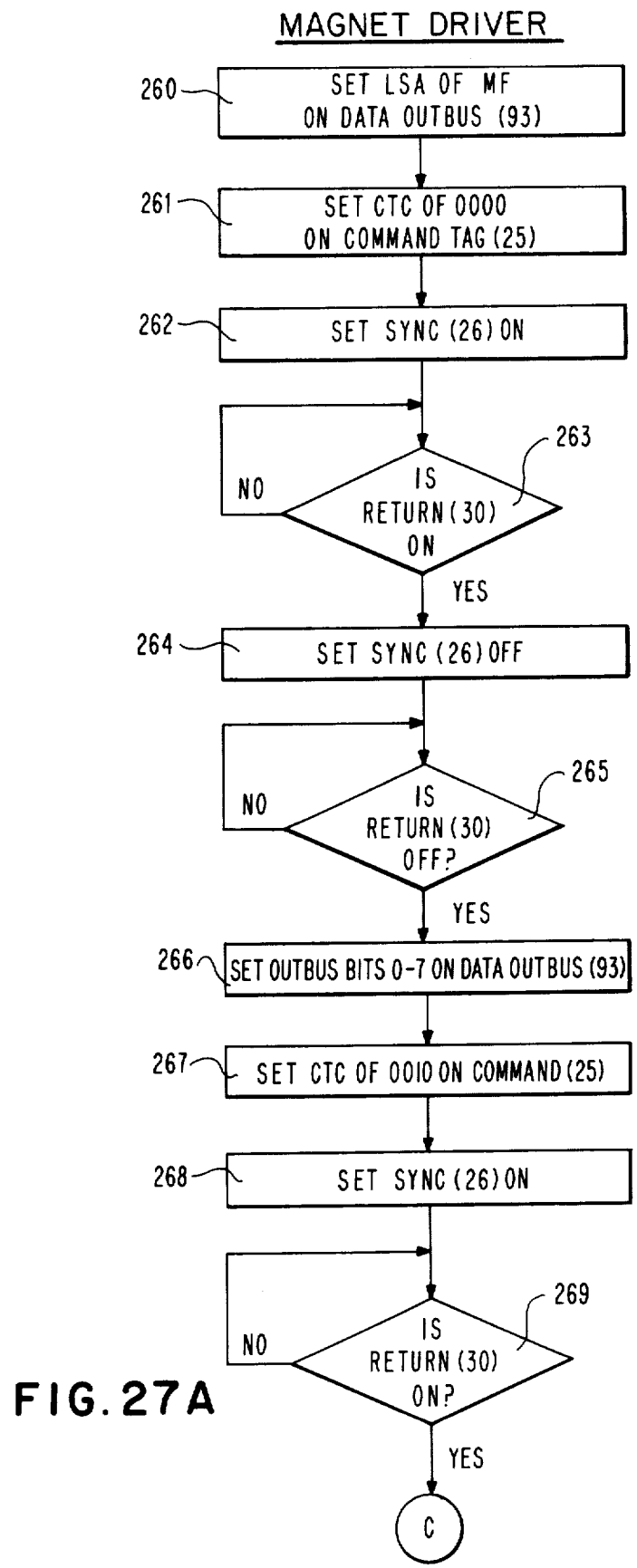

COMPUTER CONTROLLED DISTRIBUTION APPARATUS FOR DISTRIBUTING TRANSACTIONS TO AND FROM CONTROLLED MACHINES TOOLS

CROSS-REFERENCED TO RELATED PATENT APPLICATION

Serial No. 673,161; Title: Computer Controlled Distribution Apparatus for Distributing Transactions To and From Controlled Machine Tools Having Means Independent of the Computer for Completing or Stopping a Tool Function Initiated by a Computer Transaction: Inventors: A. J. Fleming et al Filed: Apr. 2, 1976.

BACKGROUND OF THE INVENTION

This invention relates to digital data controlled systems and more particularly to systems for controlling and monitoring an extensive number and variety of machine tools.

With the increasing automation of industry, both in manufacturing and in facilities controlling and monitoring, as well as the ever increasing automation of many aspects of life, both in homes and business offices, there is a constant demand for means for increasing the distribution potential of the central processing unit input/output in order to increase the capability of such central processors to interface effectively with an extensive number and variety of machine tools capable of carrying out automated industry, office and home operations. One traditional approach toward increasing the input/output distribution potential of a central processing system is to use standard centralized multiplexing techniques either directly within the central processor or in an associated centralized data processing subsystem which has an extensive multiplexing potential and responds to instructions from the main central processor applied through a single or double I/O bus by interpreting such instructions and then conducting digital data transactions with the selected remotely located machine tools over one of up to a thousand or more I/O buses which would be required for the multiplexing subsystem to individually communicate with all of the remotely located machine tools interfacing with it.

While such multiplexing systems have been effectively used where there are a limited number of machine tools being monitored and controlled by the central processor or where the machine tools can be located reasonably close to the central processor, such multiplexing systems have been less than fully satisfactory where a great number of machine tools or at least machine tool subfunctions have to be controlled by the central processor or where the machine tools to be controlled are remotely located with respect to the central processor, i.e., at distances exceeding hundreds and even thousands of feet. Some of the shortcomings of the standard multiplexing systems and subsystems in the latter cases are that the data from the multiplexing subsystem has to be transmitted over up to one thousand or more individual data buses over long distances. Thus, signal conditioning (bringing the digital I/O signal from the central processor into a condition to which the machine tool can respond) at a centralized location adjacent to the multiplexing function is impractical since the conditioned signal would then have to travel for considerable distances on its respective bus through a hostile environment where it could be adversely affected by stray noise. This would necessitate individual signal conditioning units either adjacent to or within the machine tool, thereby increasing the expense of signal conditioning.

In any event, even when the signal conditioning is conducted on an individual basis at the machine tool, the problem of running up to one thousand or more individual data buses over long distances becomes very expensive. The hostile environment through which such data buses must run will affect even bilevel digital data on the line and great lengths of expensive coaxial protective cabling has to be used for the numerous data buses.

The prior art has recognized many of these problems, and has to some extent developed systems having remotely located tool controllers functioning under the control of the central processor for controlling tools associated with the tool controllers. However, the operation of such systems with respect to the distribution of data transactions between the central processor and the digital I/O to the machine tool has been slower and less efficient from a digital data processing viewpoint than the aforementioned more expensive multiplexing systems.

In addition, it would be desirable in the art to have a system of tool controllers located near the machine tools and remote from the central processor wherein the tool controller would require minimized data transactions with the central processor.

SUMMARY OF THE INVENTION

Accordingly, it is an object of the present invention to provide a system for distributing and conditioning the digital input/output of a central processor and applying the same to a remote machine tool which eliminates multiple bus communication over long distances to the machine tool while utilizing a minimum of central processor time or involvement.

It is another object of the present invention to provide a system for distributing and conditioning the digital input/output of a central processor and applying the same to remote machine tools which eliminate communication over multiple data buses for long distances without any significant sacrifice in communication time between the central processor and the machine tool input/output.

It is a further object of the present invention to provide a system for distributing and conditioning digital input/output of a central processor and applying the same to remote machine tools which eliminates communication over multiple data buses for long distances and for the continued distribution and conditioning of said digital input/output when the central processor has ceased communicating transactions to and from the distribution system.

It is still a further object of the present invention to provide a system for distributing and conditioning the digital input/output of a central processor and applying the same to remote machine tools which eliminates communication over multiple data buses for long distances and which provides for the completion or termination of a machine tool function initiated by an output of the central processor after the central processor has ceased communication with the distribution system.

It is yet another object of the present invention to provide a system for distributing and conditioning the digital input/output of a central processor and applying the same to remote machine tools which eliminates communication over multiple data buses for long distances and in which the central processor and those portions of the distribution and conditioning system other than that through which a communication path exists between the central processor and a selected machine tool are completely isolated from ground and other random current differentials capable of damaging or interfering with the processor and the system.

In accordance with the present invention, there is provided a system for controlling a plurality of machine tools comprising a central processor, and a plurality of tool controllers each operatively associated with a machine tool wherein each of the controllers comprises at least one tool control unit, adapted to provide a digital output to the associated machine tool for controlling a tool function and/or for receiving from said tool, digital input indicative of the tool condition. A main multiple-channel data bus is connected to the central processor for conducting data transactions to and from the processor by transferring parallel bits of data. The system further includes a plurality of multiple-channel data buses each of which is connected to one of the tool control units.

Data distribution means in the system couple the unit data buses to the main data bus. These distribution means include means responsive to a set of distribution signals from the central processor for selectively activating one of the tool control units and for selectively activating only the data path from the main bus through the unit data bus connected to this selected control unit. The distribution means further include means for maintaining only this activated data path open through the main data bus to the central processor and maintaining all other data paths through the unit data buses to the unselected tool control units closed until the central processor issues the next set of distribution signals for selectively activating another tool unit.

In accordance with another inventive aspect of this invention, there is provided a system for controlling a plurality of machine tools comprising a central processor, and a plurality of tool controllers, each operatively associated with a machine tool. A main multiple-channel data bus is connected between the central processor and each of the controllers for conducting data transactions between the processor and the controller through the transference of parallel bits of data to and from the processor.

Each of the controllers comprises at least one tool control unit adapted to provide a digital output to the associated machine tool for controlling a tool function and/or for receiving from said tool a digital input indicative of a tool condition. The controller further includes means for completing a tool function initiated by a data transaction from the central processor after the data transaction is completed and the processor is no longer in communication with the tool controller.

The tool controllers also include means for stopping the controlled tool function upon receiving from the tool a digital input indicative of a preselected tool condition. Both the means for completing the tool function and for stopping the tool function are wholly operable within the controller without any further communication to or from the central processor.

The foregoing and other objects, features and advantages of the invention will be apparent from the following more particular description of the preferred embodiments of the invention, as illustrated in the accompanying drawings.

BRIEF DESCRIPTION OF THE DRAWINGS

FIG. 4 is a chart listing of buses and lines in the distributed interface bus system and in the macrofunction interface bus system.

FIG. 5 is a timing diagram showing the pulse levels of the various buses and lines in the distribution system during write and read operations.

FIG. 8B contains timing charts showing the data pulses on various lines in the system during some additional system distribution command sequences.

FIG. 12 is a chart illustrating some of the address arrangements shown in FIG. 9.

FIG. 13 is a logic diagram illustrating the relationship of a generalized macrofunction card (tool controller unit with the block interface card on a particular block.

FIG. 13A is a timing chart illustrating the pulse levels on various buses and lines in FIG. 13 during write and read cycles.

FIG. 14A is a timing chart illustrating the pulse levels on various buses and lines in FIG. 14 during write and read cycles.

FIG. 15A is a timing chart illustrating the pulse levels on various buses and lines in FIG. 15 during write and read cycles.

FIG. 21A is a logic diagram illustrative of the coaction of two macrofunction cards in completing an operation independent of the processor.

FIG. 26 is separated into FIG. 26A and FIG. 26B.

FIG. 27 is separated into FIG. 27A and FIG. 27B.

FIG. 28 is separated into FIG. 28A , FIG. 28B and FIG. 28C.

FIG. 29 is separated into FIG. 29A, FIG. 29B and FIG. 29C.

FIG. 30 is separated into FIG. 30A, FIG. 30B and FIG. 30C.

FIG. 31 is separated into FIG. 31A and FIG. 31B.

DESCRIPTION OF PREFERRED EMBODIMENTS

General Description

Figure 1:
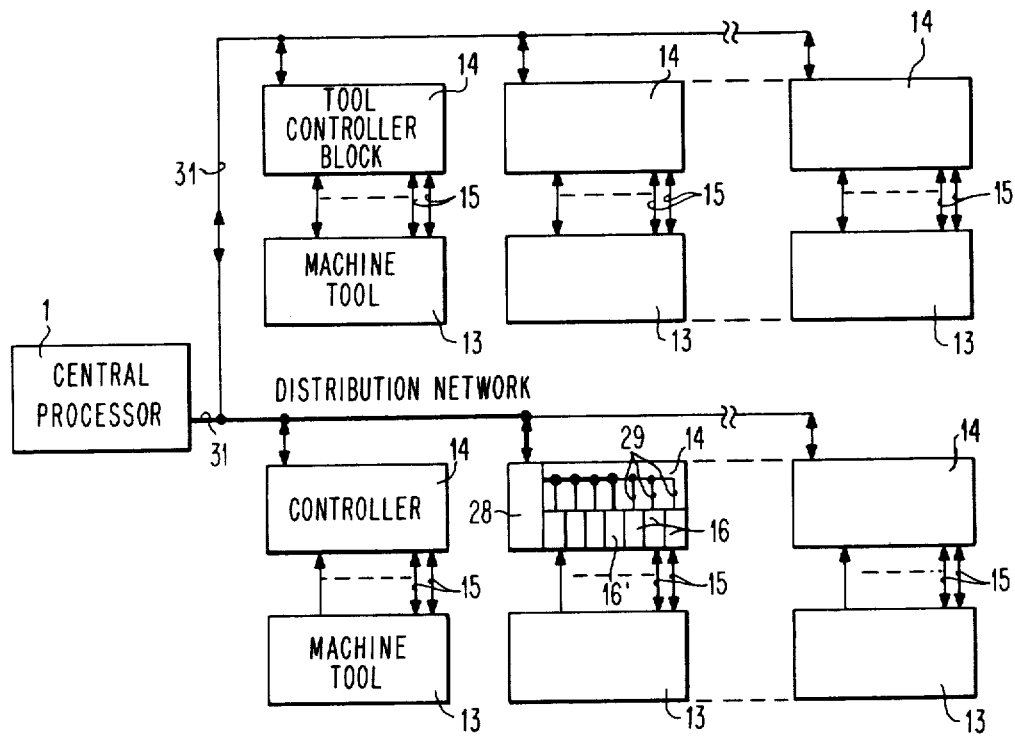
FIG. 1 is a very generalized block diagram of the system.

FIG. 1 shows a very generalized diagram of the present system. The system provides control over a plurality of machine tools 13. Such machine tools may be any known machine tool, the operating conditions of which may be monitored by a computer or central data processor. Such machine tools may also be tools the operation of which may be controlled by such a central data processor. Thus, the machine tools may vary from a tool as simple as an oven wherein the central processor receives monitored temperature data and in turn controls heating element switches in response to such monitored data to more complex tools such as tools used in electron beam or ion beam treatment of workpieces.

Each machine tool 13 in FIG. 1 has operatively associated therewith at least one tool controller block 14. The more complex machine tools may require more than one tool controller block. Each tool controller block contains a plurality of tool control units 16 which provide a digital output to the associated machine tool 13 for controlling a particular tool function designated as 13A or 13B in the machine tool and/or for receiving from the machine tool, a digital input along I/O lines 15 which is indicative of a particular sensed condition in the tool. The digital outputs provided along lines 15 from the tool control units 16 are connected to machine tool units or functions such as solenoids, valves or switches for driving such units and/or connected to various sensing devices in the machine tool for receiving from the tool a digital input indicative of a particular tool condition such as temperature, pressure or volume. The central processor 1 is connected to the respective tool control units or macrofunctions 16 via a main multiple-channel data bus 31 on which the central processor may conduct data transactions by transferring parallel bits of data to and from itself. Each tool control unit or macrofunction 16 has associated with it a unit data bus which is also a multiple-channel bus.

Without going into extensive detail at the present time, the system further includes data distribution means associated with the tool controller blocks for each machine tool. These data distribution means which include a block interface card 28 act in response to a set of distribution or address signals from the central processor to selectively activate one of the tool control units 16 and for selectively activating only the data path from this selected tool control unit back to the central processor to the exclusion of all data paths from any other tool control unit in the entire system. For example, if tool control unit 16' is activated, then the only data path back to the central processor in the entire system which will be activated will be the one shown in FIG. 1 in heavy black lines from tool control unit 16'.

As will be subsequently described in greater detail, once this path is selectively and exclusively activated, the system provides for a path lock wherein only this path to the central processing unit remains open; all other paths from other tool controls are closed until the central processor issues the next set of distribution or address signals for selectively activating another tool control unit.

In addition, as will be described subsequently in the present specification in greater detail, one or more of the tool controller blocks once addressed by the central processor have the means for completing one or more tool functions initiated by a data transaction from the central processor even after the data transaction is completed and the central processor is no longer in communication with the tool controller 14.

Tool Controller

Figure 2:
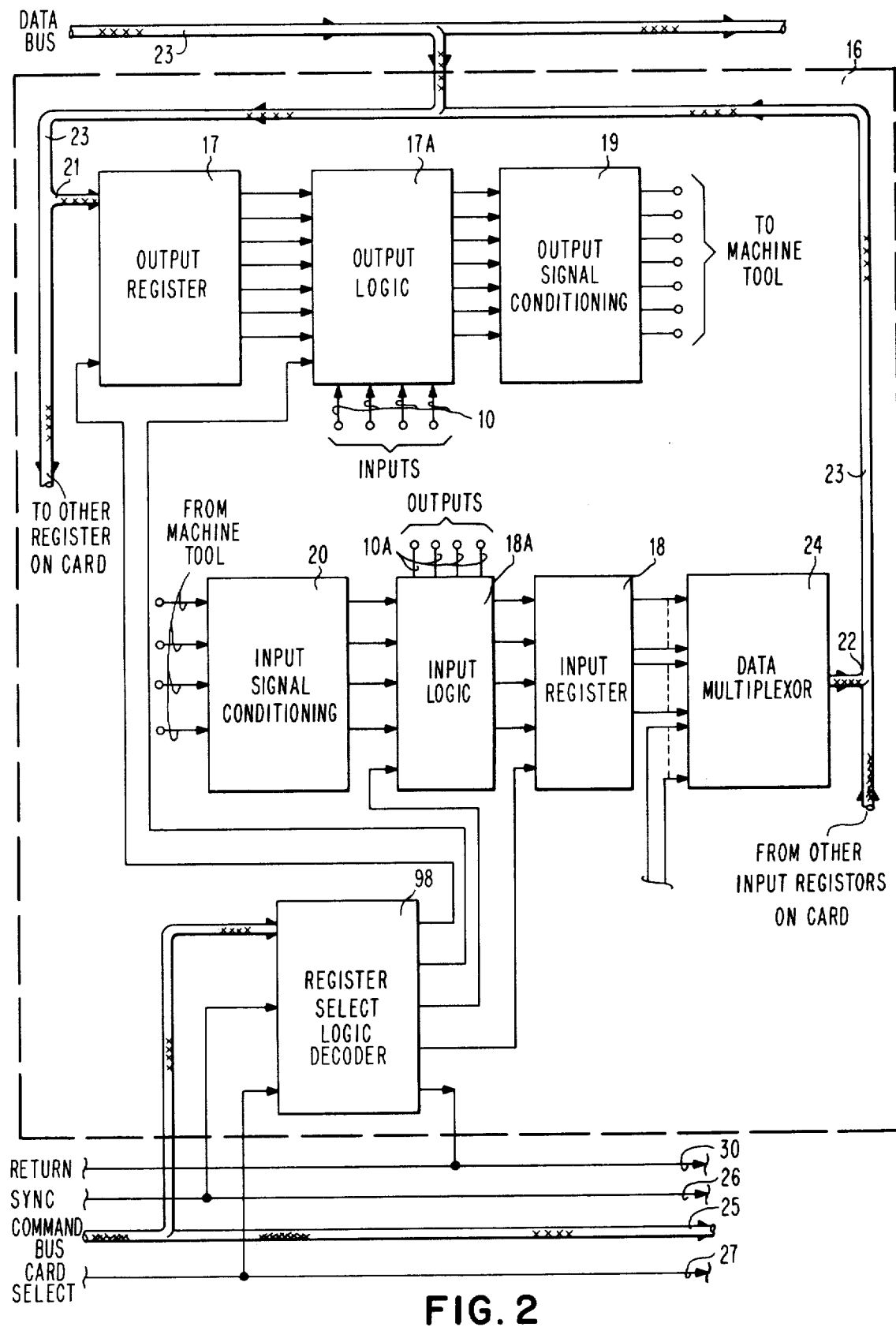
FIG. 2 is a generalized block diagram of a tool control unit or macrofunction card.

The machine tool 13 connects into the system through the tool controller block which contains various interface cards which are circuit macrofunctions. A typical interface card or macrofunction (tool control unit) 16 is shown in FIG. 2. The key control elements of a typical macrofunction are the output registers 17, control functions and the input registers 18. These registers are connected to and from the machine tool through output signal conditioning logic 19 and input signal conditioning logic 20. There is output logic 17A and input logic 18A between the respective register and the signal conditioning logic. Several output registers, control functions and input registers may be located on the macrofunction circuit card 16. The output and input registers are connected to a data bus at points 21 and 22 as shown in the FIG. 2. The input registers are in turn connected to the data bus 23 by a dot ORing function. Since there are usually input registers from several macrofunction cards connected to data bus 23 for a particular block, the actual connection may be achieved by dot-OR functions which are common to the several interface cards on the block. Where there are more than one input register on a card, the connections to data bus 23 may be multiplexed through a multiplexor 24.

The output register 17 may conveniently be a conventional polarity hold register. Strobe pulses are required to gate data into the output register 17 from the data bus 23 and to also gate data onto the data bus 23 from the input register 18. This is performed by the register select logic 98 (which may be a decoder as will be hereinafter described in greater detail). This logic receives signals from the command bus 25, the sync line 26 and the card select line 27, the operation of which will be described in greater detail hereinafter. An activated select line indicates which card 16 is to receive data.

Figure 3:
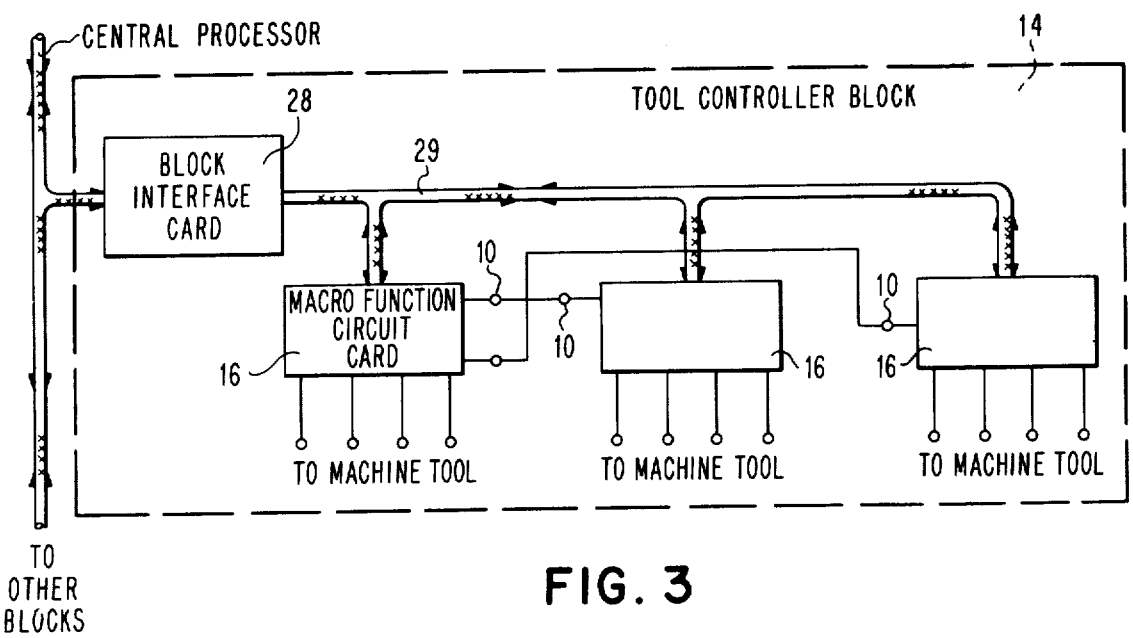
FIG. 3 is a generalized block diagram of a tool controller block.

The activation of the particular card select line 27 which determines the card which will be requested to either send or receive data is selected by a block interface card which is part of the tool controller block 14. FIG. 3 illustrates the relationship of a block interface card 28 to a series of individual macrofunction cards (tool control units) 16 in an overall tool controller block 14. The common bus or macrofunction interface bus 29 from the block interface card to the various interface or macrofunction circuit cards 16 contains the data bus 23, command bus 25 and sync 26, return 30 and card select lines 27, shown in FIG. 2. The command bus 25 (FIG. 2) is decoded to generate sublevel commands used to indicate which register or function is to be activated. The register select logic 24 (FIG. 2) performs one other function. Whenever the sync line 26 is active, the card is selected, and a valid command combination is on the command bus, as defined for the specific interface card, the return response line 30 (FIG. 2) is activated by register select logic 24 indicating a successful transaction.

Interface Buses To and From Macrofunction Cards

FIG. 2 shows the physical boundary of the macrofunction card 16 in dotted lines. Note there are several standard lines coming onto and off of the card 16. These are the data bus 23, sync 26, return 27 and command bus lines 25 and card select lines 27 (all part of the macrofunction interface bus 29). All interface cards will be connected to the same type of macrofunction interface bus 29.

The distribution network 31 or distributed interface bus system (FIGS. 1 and 3) from central processor to the block 14 has two data buses which are unidirectional, the outbus and the inbus. The macrofunction interface 29 has a single data bus 23 which is bidirectional. The makeup of these interfaces are listed in FIG. 4.

In the distributed interface bus system 31 in addition to the nine data bus lines each for the outbus and inbus, there are four command tags. These four lines are used in all binary combinations, giving possible sixteen combinations. A single basic line provides a sync pulse to provide the timing of data. Likewise, in the macrofunction interface bus system 29, there is a single nine line data bus 23, four command tag lines and a sync pulse line.

FIG. 5 is a timing chart showing the sequence of pulses on the appropriate inbus or outbus of the distributed interface bus 31 as well as on the macrofunction interface bus 29 during a typical write or read operation.

Note that when data is written onto the interface system comprising the macrofunction 29 and distributed interface buses 31, the command tags, through their binary decoding, provide a means of identifying the type of information on the bus. For example, if the logical space address were encoded on the outbus, then control tag cominbation 0000 (0) would be found on the four control tag lines 25. (The logical space address and the addressing function will be subsequently described in greater detail in the specification section logical organization of the interface for addressing in connection with FIGS. 9–12). The sync pulse would be used to indicate when valid data is present on the bus. The return line 30 is used to provide handshaking information back to the processor as previously described. The return pulse is generated at the selected macrofunction or interface card 16 (FIG. 2) by decoder 98, and is turned on by the sync pulse whenever the action, as indicated by the command tags, has been successful. If, for example, when the processor addresses a logical space, and a macrofunction circuit or interface card function 16 is located at the address, the return pulse returns, indicating to the central processor 1 that the operation was successful. If no card functions 16 are at the selected address, no return pulse would result. Therefore, the processor 1 would be aware of an I/O error. The appropriate processor programming to establish these sequences will be subsequently discussed in greater detail. Timings are also defined in FIG. 5. Tw is the period from the start of the data on the bus to the time that the sync pulse is turned on; Ts is the duration of the sync pulse, and Tr is the period that the data is valid on the bus after the sync pulse is turned off. The return pulse will come back to the processor after a delay of Td. The duration of Td will vary depending upon the distance from the central processor 1 to the tool controller block 14 and the amount of logic delays in the chain. The central processor 1 will use the return pulse (line 30) to provide handshaking capability to avoid data overrun, acknowledgement of a successful transfer of data and an indicator to the processor to terminate the sync line. The data should remain valid on the data bus 30 until after the sync pulse turns off.

The duration of the time periods can vary. The minimum duration of the pulses will be determined by the response and band-width of the interface distribution system. This is a function of the line length and interface components. Where faster data rates are required, special transmission line techniques or wider bus widths will be used which should allow data rates approximating 10 mhz.

There are no restrictions on the maximum duration of the time periods, as there are no time dependent functions in the macrofunction circuit or interface cards 16. Thus, the distributed interface bus system 31 may be cycled manually, phase-by-phase, for maintenance purposes where required. This feature allows for the use of indicators, located on the block interface card 14 and macrofunctions 16, to be used during system maintenance to locate faulty cards 16 in the system without the use of special equipment such as oscilloscopes and probes.

The read mode of the interface is similar to that of writing except that data is gated onto the inbus by the macrofunction 16. It should be noted that the contents of the inbus is determined by the ORed combination of the information of the outbus, together with the information gated onto the inbus by the macrofunction since macrofunction interface is supported by a common I/O data bus 23 (FIG. 2). Thus, when reading, the outbus must contain the value 00000000 (0).

The return line 30 serves an additional function when reading data. In this case, the return pulse is generated at the macrofunction simultaneously with the gating of data onto the inbus. Therefore, the return pulse will be used by the processor as a sync line 26 to indicate that valid data is present on the inbus. A short delay will be applied at the processor adapter to account for any data skew due to propagation differences between bits.

Direct Access To and From Macrofunction Cards From Tool Environment

With reference to FIG. 2 regarding the output and input logic, many interface cards require local intelligence or control to be available between the output data registers 17 and the signal conditioning 19. These connection points are available to the user through interface pins 10 (also see FIG. 3). Examples of such user control feedback points are described subsequently in the specification in the illustrative examples section described in connection with FIGS. 17 and 18. In these examples, the control points are sample and inhibit points.

The definition of the input 17 and output registers 18 play a key roll in the operation of the interface or macrofunction circuit card 16. All data flow paths to the processor are established through input 17 or the output registers 18. Therefore, all operations will be defined and described subsequently in this specification in terms of these registers.

It should be noted that all signals and communication from the central processor 1 to the tool controller blocks 14 through the distributed interface buses 31 and the macrofunction interface buses 29 are carried out under control of the central processor 1 with programs to be hereinafter described.

Tool Controller Block 14 (FIG. 3)

Several macrofunction circuit cards 16 are combined into a block 14. These are shown in FIG. 3. Note that there is also a block interface card 28 which controls signal distribution to the macrofunction cards 16 in the block. The machine tool connection points are also shown in FIG. 3. The block interface card 28 provides several functions. It connects to the distributed interface bus 31 that feeds to the central processor. Other blocks can also attach to this channel. The block interface card 28 provides the address selection function and when selected, powers the macrofunction interface bus 29 to the selected interface cards. The addressing function will be subsequently described.

Assembling Macrofunction Cards 16 Into Blocks 14 (FIG. 3)

Figure 6:
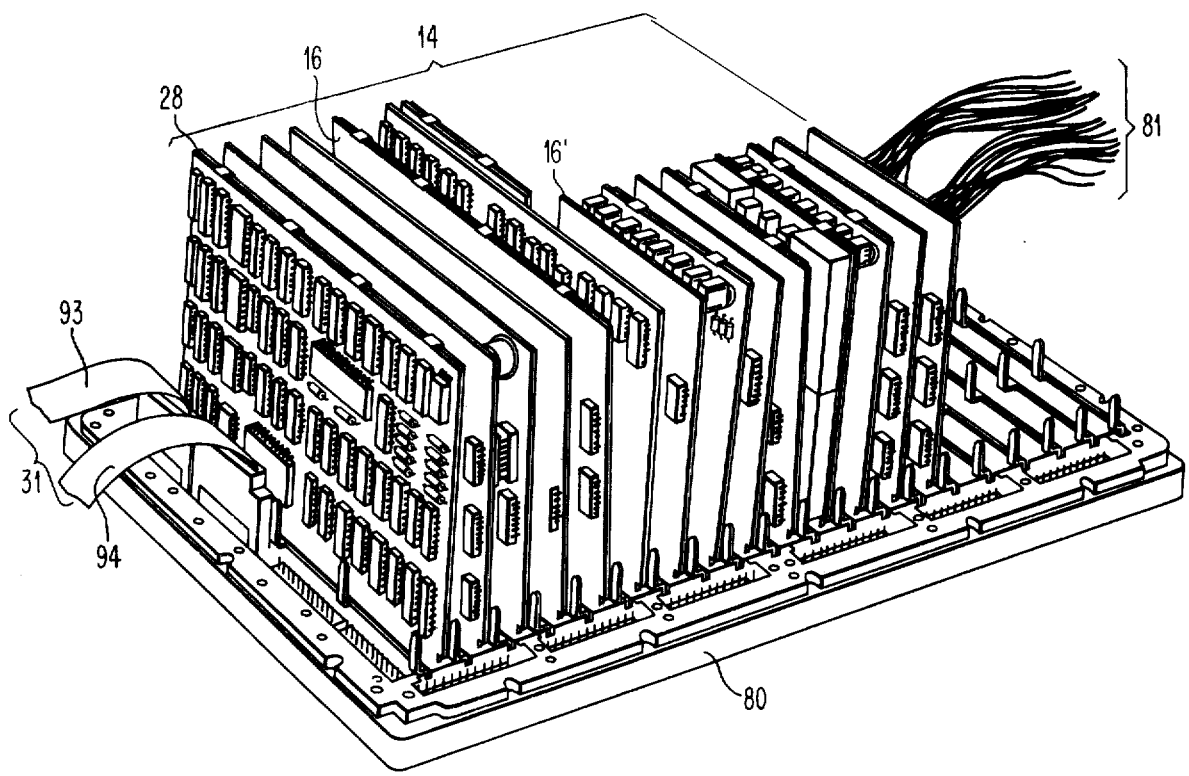
FIG. 6 is a diagram of a tool controller block illustrating the arrangements of the various macrofunction cards in the block.

The sequence in using the standard distributed interface bus 31 and its associated macrofunctions 16 is first the user determines his control requirements, then selects the appropriate macrofunctions 16 which may be implemented in integrated circuits to meet his needs on conventionally packaged cards. Then assigns the macrofunction interface cards 16 to conventional supporting "mother-boards" for packaging. The macrofunction card structure will allow the user to package for example, a block interface card 28 and up to fifteen macrofunction cards 16 on a single "mother-board". This group of up to fifteen macrofunctions is a tool controller block 14. FIG. 6 shows the location of the various cards in the block on a typical "board" which represents a typical block 14.

The arrangement of a board or block in FIG. 6 will be generally described with reference to the structure and numerals of FIGS. 2, 3, and 13, the latter will be subsequently described in greater detail. Board 80 is prewired to provide the interconnection and wiring shown in FIGS. 2, 3, and 13. The mother-board 80 contains appropriate prewired sockets in it to receive block interface card 28 and up to 15 macrofunction cards 14. Since each card may vary in the complexity of the circuitry required to carry out its function, provision is made in the prewired mother-board 80 to receive cards varying in lateral dimension from one to four units wide. Block interface card 28, because of the complexity of its circuitry, is four units wide as are a good portion of the macrofunction cards. However, some of the macrofunction cards such as card 14' are only two units wide in the embodiments shown. Outbus 93 from the central processor and inbus 94 to the central processor are connected into the mother-board 80 as shown which in turn wires them directly to the BIC 28.

Wires and cables 81 from the board or block are connected to the machine tool to provide the various inputs and outputs to and from the machine tool. In addition, user and environment access points to the tool control block are also made through lines 81.

Block Interface Card

Each block 14 requires a block interface card (BIC) 28 (FIG. 3). This is a predesigned card which functions with the block. It has several functions, described in the following paragraphs.

The block interface card 28 provides the proper loading capability to allow any mix of macrofunctions to be provided by macrofunction cards 16 to be assigned to a single block 14. It also performs a portion of the multiplexing function to minimize the logic required on the macrofunction card 16 for multiplexing purposes.

In addition, the block interface card will have several control functions. It is addressable by the central processor 1 and as such will have digital output points assigned to it to provide gating functions. Thus, the processor 1, through use of digital outputs avialable on the block interface card 28, can connect or disconnect all of the macrofunction cards 16 assigned to the particular block 14. The block interface card 28 is also used when polling for location of interrupt sources. This allows a two-stage interrupt polling sequence which reduces the time required to locate an interrupting macrofunction. This interrupt sequence will be subsequently described in greater detail.

The block interface card 28 will also provide power-up capability for the system. In power-up sequence, the central processor through the combination of the distributed interface 31 and macrofunction 29 buses, the BIC's 28 and the macrofunction circuit cards 16 presents all conditons for the respective operation to be performed, prior to the powering machine tools 13 to be controlled. Thus, prior to the machine tool power-up all control conditions are set.

Parity for all incoming data is generated at the block interface card. Thus, the accuracy of the transmission of data back to the processor over the distributed interface is assured. The parity check which accomplished on the BIC 28 may be any conventional parity check routine using the parity bit. Similarly, the central processor will generate parity for outbus data and commands to the BIC 28 which is verified by the BIC 28. An illustration of a parity check will be subsequently given with respect to FIG. 13B.

The block interface card also provides four pins (not shown) that are connected either to logical voltage level or to ground to assign one of sixteen block addresses to the board (FIG. 6). Thus, the use of this capability will eliminate ambiguous addresses as differnt tool controller blocks 14 along distribution network 31 (FIG. 1) are configured.

Two cable sockets are assigned on the block or board 80 to connect the block into the distributed interface (cables 93 and 94, FIG. 6). All signals coming into or out of these cables are at transmission line levels. The proper conventional level translation circuits are located on the block interface card. The remainder of the sockets on the block mother-board are unassigned and available for user applications. Interlock circuitry, output cables, operational amplifiers and other required components can be located in these sockets.

SECTOR DISTRIBUTION

Figure 7:
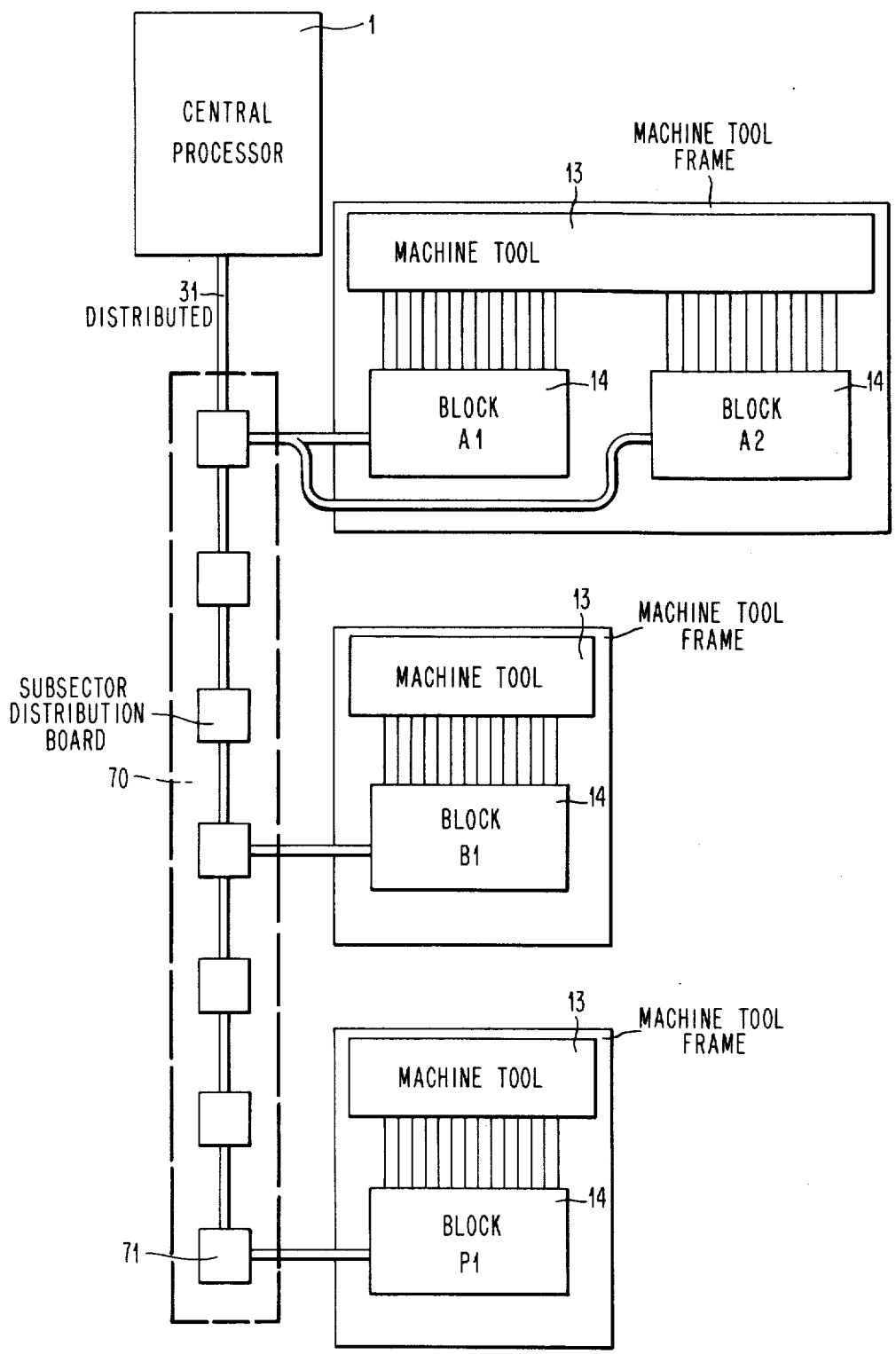
FIG. 7 is a block diagram showing in greater detail the arrangement of machine tools, the control blocks and the distributed interface bus system with respect to the central processor.

FIG. 7 shows the assembly of several tool controller blocks 14 into sectors each controlling a particular machine tool and several subsectors under the control of a central processor 1. Data is distributed to the blocks 14 from the processor 1. The processor may conveniently be an IBM System/7. Other types of computers which can be attached to the subsectors, include IBM 360/30 based logic control units, IBM 1130's, or minicomputers, or microprocessors.

In the present illustration, the distributed interface bus system, leaving the central processor is a twenty-six wire distributed interface bus system 31 described with respect to FIG. 4. This distributed interface is packaged in the standard sector backbone 70 (FIG. 7) with "outlets" 71 for example, every four feet. These "outlets" are referred to as the subsector distribution boards. These boards are conventional feedthrough type boards, which allow for the modularity of the backbone to be maintained. Data is sent down the backbone the same way as other facilities such as water, air, or power may be. Where a subsector is attached to the backbone 70, the backbone distribution board 71 is populated with standard integrated circuit cards that provide line receiver and driver functions. This allows the sector logic to be connected to the transmission lines 31 in the sector backbone without causing undue reflections and line matching problems. Optical isolation is provided between circuits that are connected to the sector distributed interface, and the signal lines feeding the sector. This optical isolation will be subsequently described in greater detail. That portion of the logic on the subsector distribution board 71 that is connected to the processor 1 will receive power from the processor 1. The other side of the optical isolation component will receive its grounding and voltage from the subsector. Thus, any DC ground loops between subsectors and the processor will be eliminated.

If no subsector is attached to the backbone subsector distribution board 71, there will be no components plugged into the board. Data signals will merely pass through the board.

SEQUENCING OF DATA

Figure 8A:
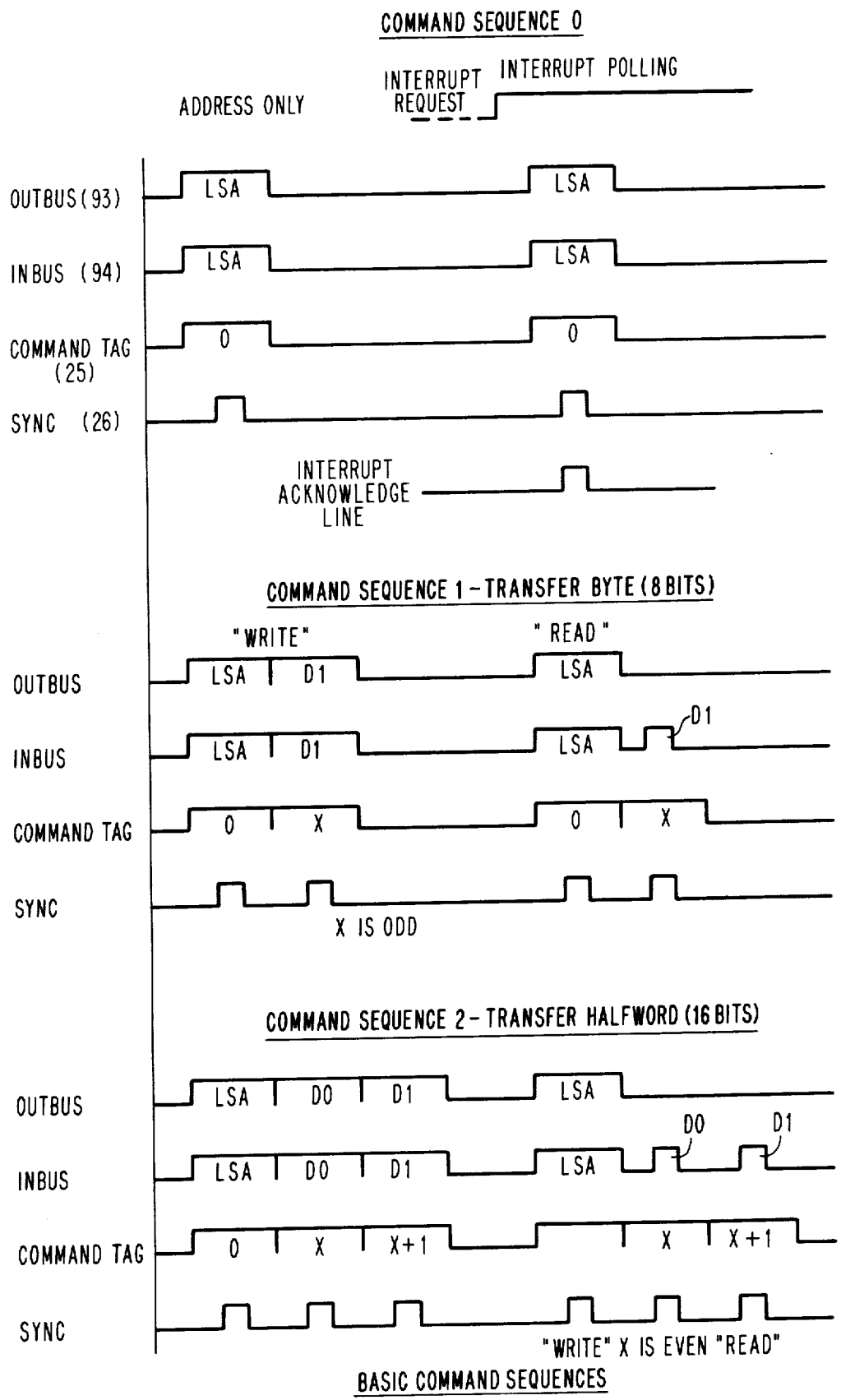
FIG. 8A contains timing charts showing the data pulses on various lines in the system during various system distribution command sequences.

Let us now consider how data is sequenced through the system under the control of the central processor. The sequences are illustrated in FIG. 8A and will be best understood if read in conjunction with FIGS. 3, 2, 4, and 5.

Data is transferred over the inbus and the outbus (FIG. 4) through a series of command data sequences. FIGS. 8A and B shows several such sequences, which are differing modes of operating the tool controller block interface. Associated with each command sequence is a variable X, which represents one of the sixteen combinations of the command tag lines. Four command tag combinations, one of which is not in use (it is intentionally reserved for a spare), are reserved for a fixed use in the system. These combinations are: zero, which is the logical space address, one, which is used to reset the interrupt request latch located at the macrofunction card 16, fourteen (not in use), and fifteen, which will be used to read the macrofunction identification number. The other assignments of the remaining twelve command tag combinations will be dependent upon the requirements of the macrofunction or interface card 16. A description of several basic command sequences will illustrate these usages.

Command sequence 0 is used for two functions:

One function is to provide address only information on the interface bus. Each macrofunction is to have a logical space select line. The function of this line is to be turned on when the logical space is selected. This line, being on, opens the logical space. The line is reset whenever any other logical space is selected. The address only sequence will allow the resetting and setting of logical space select lines without the transfer of any data.

INTERRUPT POLLING

The second function of the command sequence 0 is polling for interrupts. An interrupt is a conventional predetermined condition wherein the macrofunction is to obtain control of the central processor. Thus interrupting what the process is doing in order for the processor to carry out a high priority function. Each macrofunction that has interrupting capability will have an interrupt request latch 65, FIG. 16. This latch is set by some action of the macrofunction 16. Setting any interrupt request line will turn on the interrupt request line on the interface through the block interface card 28 (BIC). The processor 1 will respond to this interrupt request. The location of the interrupting BIC is determined through a polling sequence. Command sequence 0 will be used for this function. This is subsequently described with respect to the hardware of FIG. 16 and the programs of FIGS. 32 and 33. When the logical space is addressed and, if the addressed block has a pending interrupt, it will turn on the interrupt acknowledge line. This line will signal to the processor 1 that an interrupt has been located.

In order to minimize the time required to poll for interrupts, the interrupts are first polled by block 14 and then by macrofunction 16 via the interrupt request line to be subsequently described with respect to FIG. 16. Thus, the worst case polling sequence would require sixteen polling actions.

The interrupt request latch would be reset at the macrofunction after the interrupt has been serviced with the use of a command sequence one having the command of one.

Command sequence one is used to transfer one byte of information over the interface. Note that the same sequence is used in both the read and write operations. The only difference is that during the read operation, the outbus must contain 00000000. By convention, the D1 byte is transferred on the single byte operation. The D0 byte of a sixteen bit half word transaction is ignored and not used with this sequence. Conveniently to transfer a single byte, X may have an odd value (as shown in FIG. 8A).

Command sequence two is used to transfer two bytes or one half word of information over the interface. By convention, the D0 byte is sent first, followed by the D1 byte. The value of X is supplied by the software control subroutine that is supporting the macrofunction. The particular values required for a particular macrofunction will be determined at the time the macrofunction is designed.

Other command sequences can be defined for specialized macrofunctions. For example, some other possible command sequences are defined in FIG. 8B. Note these commands allow for the transfer of one or two bytes of information. In addition, additonal command tag combinations are used for providing timing and control pulses at the macrofunction. Generalized digital input and output macrofunctions will need these types of sequences for the gating and preparation of data.

LOGICAL ORGANIZATION OF THE INTERFACE FOR ADDRESSING

Figure 9:
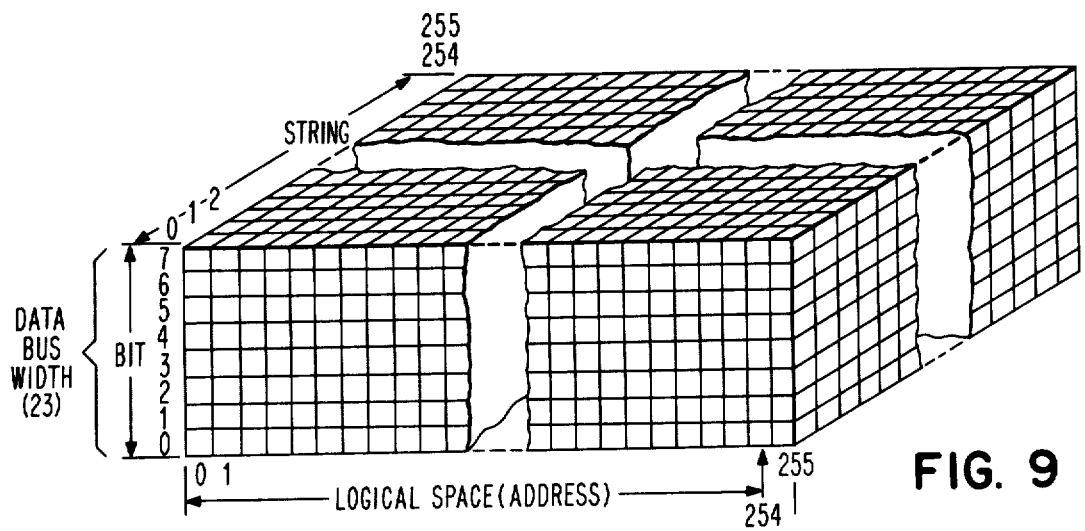
FIG. 9 is a diagram of the conceptual arrangement of the distribution system.

With reference to FIG. 7, the distributed interface bus 31 from central processor 1 may be considered to service an I/O space as illustrated conceptually in FIG. 9 for purposes of addressing. In the previous section on data sequences described with respect to FIGS. 8A and 8B, the logical space address (LSA) was discussed. We will describe how this is determined.

The addressing of the interface system may be best described with reference to a cube of bits as shown in FIG. 9. Each small cube illustrates a single bit in a register on an interface card 16 (FIG. 3). The vertical axis represents the data bus 23 width and the unit along this vertical axis indicates a specific data bit. The depth of the cube represents a string of data that may be impressed upon the data bus. Associated with each byte of data on the data bus 23 is a command tag. Thus, there is also associated with the depth of the cube a string of command tags. The central processing unit could write a string of data, to each with a different command tag, thus addressing each possible register on the macrofunction. In this case some 16 registers could be addressed by the sixteen binary combinations of the command tags $C_0$ through $C_3$.

Instead of transfering data to different registers, the central processor could transfer data such that each byte having the same command tag associated with it. This would transfer a string of data to only one register on the macrofunction. Thus any combination of strings of command tags, changing with each data bus tranfer or remaining constant are allowed. A register could thus relieve either a strings or a single byte of data. This register might conveniently represent a printer or other serial data device. It is important to note that it is necessary that the central processor program know the proper command tags that must be sent to each macrofunction in order to achieve the desired data transfer and function. The width of the address cube represents the address of each particular macrofunction. They are called logical spaces and are addressed as a logical space address (LSA). The the three dimensions of the I/O space cube are defined.

Since the I/O space operates from an eight-bit data bus, special consideration is made for writing sixteen-bit words. In this case, the sixteen-bit half word is written as a string where two bytes represent one word.

The 256 logical space addresses of the I/O space are broken down into sixteen blocks. Each of these blocks is represented as one block 14 of macrofunctions 16. Thus, the interface can address 16 blocks. Within the block fifteen macrofunctions can be assigned. The zero address in the block is reserved for block interface card 28 usage.

Figure 10:
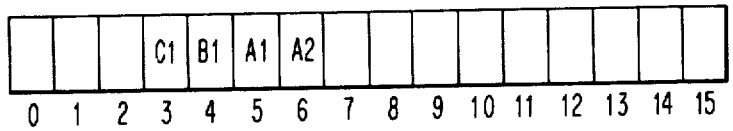
FIG. 10 is an illustration of some of the subunits of FIG. 9 in a single plane.

The block interface card 28 (FIGS. 3 and 13) have the capability of allowing the block number or block address to be assigned on a system basis through selection of four wires which are personalized through tab pins feeding the block interface card. This will be subsequently described in greater detail with respect to FIG. 13 (pins I1-4). FIG. 10 shows this type of capability. In this figure, note that three sectors (A, B, and C) are to be combined into a multiple tool controller under the control of the processor. This sector will be addressed by a single I/O space. Thus, these blocks are assigned as shown in the figure where sector A uses block addresses 5 and 6, sector B uses block address 4 and sector C uses block address 3. Blocks within a single sector need not be assigned continuous block addresses. It is evident that after the blocks are assigned block numbers in the I/O space, the control programs in the processor which address these blocks must be updated to reflect the logical space address for each block and its macrofunction.

Figure 11:
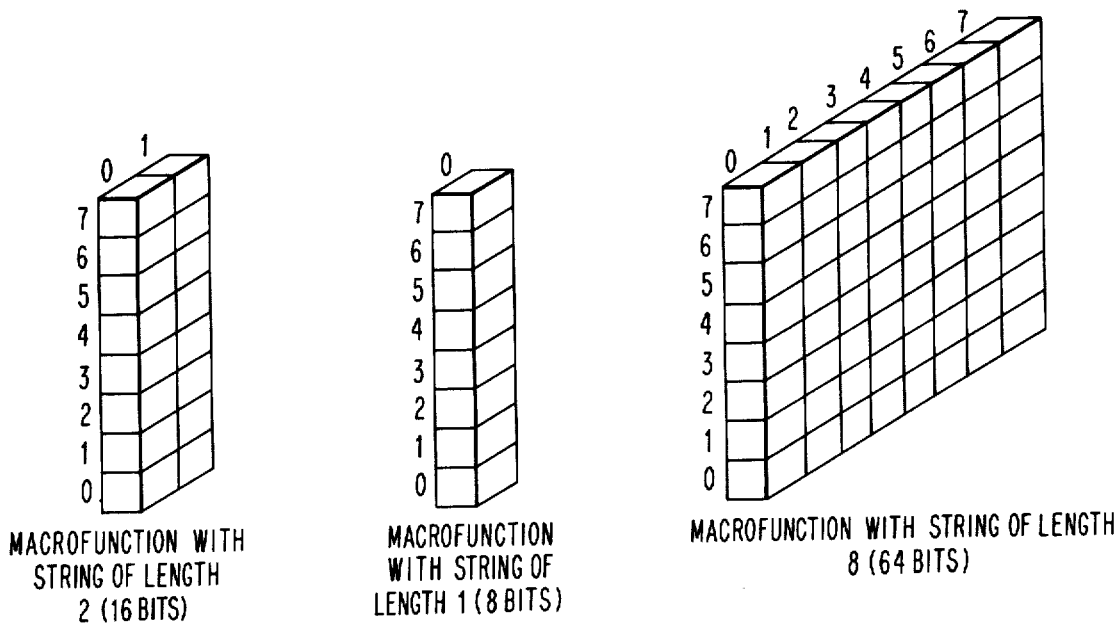
FIG. 11 is an illustration of the arrangement groups of subunits of FIG. 9 along another plane.

Each macrofunction will require the utilization of several bytes of data in the I/O space. This is shown in FIG. 11. Note here that three macrofunctions (cards 16) are shown. One will require 16 bits of data and a string of length two to contain the data. Another macrofunction requires only eight bits and a string of length one to address it. The third macrofunction requires eight bytes and therefore a string of length eight is used to supply the data to the macrofunction.

FIG. 12 shows the bit conventions for the distributed interface. Normally, data buses are eight bits wide and serve various functions. FIG. 12 gives the line names and their assignments for the In and Out data buses as well as the breakdown of address information, by bit, into the block number and the block logical space address of an eight bit wide data bus.

FIG. 12 also shows the sixteen-bit or half word conventions. The primary feature of the half word system is that the data is referenced as two eight-bit bytes. These are referred to as the high or (0) byte and the low or (1) byte. By convention the high byte is always transmitted over the bus first, followed by the low byte.

BASIC MACROFUNCTIONS 16 AND THE ADDRESSING OF SUCH MACROFUNCTION BY CENTRAL PROCESSOR THROUGH BLOCK INTERFACE CARDS

Now that the system units and operations have been generally described, let us consider the interaction from the central processor 1 through the distributed 31 and macrofunction bus systems 29 to blocks 14 and macrofunction circuit cards 16 (FIGS. 1, 3 and 7).

The distributed and macrofunction interface buses 31 and 29 and their interaction with the macrofunctions 16 is best illustrated with several examples. FIG. 13 is a simplified diagram showing a macrofunction 16 that has one eight bit digital output register 91 and one eight bit digital gating function 92. Both of these functions are located at the same logical space address; however, only one mode can be used at any one time. Also shown in the figure is a portion of the block interface card 28 that supports the macrofunction.

Two interface buses are shown in FIG. 13. (FIG. 13 should read together with FIG. 13A which shows the timing chart for the signals involved). The distributed interface bus 31 has two data buses; the outbus 93 and the inbus 94. These buses come onto the macrofunction card 16 where they are combined into the single macrofunction data bus 23. This macrofunction data bus 23 is two-directional: the macrofunction 16 can receive data from data bus 23 in addition to having the capability of gating data onto this bus.

The previously described logical space addressing function is broken down into two parts and carried out in block interface card 28. Outbus 93 is branched to the BIC 28 by branch 93A. The high order bits, which describe the block address or number, are decoded with a four bit compare function 95. Since four bits are indicative of the block address, they can indicate up to sixteen different combinations for 16 blocks. The combination of the four bits that will cause the equal condition to occur, which indicates that the block controlled by the selected block interface card is selected, is generated by fixing the other four inputs $I_1$-$I_4$ to the compare function 95. These bits may be programmed by bringing the four pins $I_1$-$I_4$ into the socket of the block interface card 28 and connecting the socket pins to either ground or a logical one voltage.

When the equal condition occurs from the compare function 95, the block is selected by activating block select line 103. This condition will permit the gating of the lower order bits $X_4$-$X_7$ of the outbus 93A to the decoder 96 which is a conventional four to sixteen bit decoder on the block interface card 28 which will in turn raise one of fifteen address lines (LS 1 through 15) which may be used to select one of fifteen possible macrofunctions of which one macrofunction 16 is shown in the drawing. The use of the block address compare 95 will cause the activation of decoder 96 for the address lines (LS 1 - LS 15) and a logical space within the block will be activated. Lines LS1-15 which are respectively the card select lines for the fifteen macrofunction cards are attached to command bus 25 and 26 in sequence in same manner the illustrative macrofunction card is attached. For convenience, lines LS 1-15 join the bus 25 and 26 as shown. Then each of lines LS 1-15 is respectively connected to a different one of the sequence of cards 16 as the select line 27 for that particular card.

The command tags $C_0$-$C_3$ 25 and sync wires 26 are shown in a single bus are passed through the block interface card 28 to each of the macrofunctions 16 assigned to the block. When the outbus 93 contains the logical space address information, the command tags will have the 0000 (0) combination. This reserved combination will then gate the results of the four inputs and selected block, which enables the selected logical space select line (LS 1-15). This line will be set when the macrofunction is selected. The logical space select line will be reset when any other logical space line is addressed.

It should be noted that decoder 96 is only active during the addressing operation of the system. In order to insure this operation, each block interface card 28 (FIG. 13) has an address operation or command tag (0) decoder 55 to which command tags $C_0$-$C_3$ from bus 25 are applied. Thus, when the $C_0$-$C_3$ input to decoder 55 is 0000, line 56 will be activated which will enable decoder function 96 on all block interface cards 28 so that if block select line 103 is also activated by compare 95 indicating that the block is selected, then decoder function 96 will be operational.

It is important to note here that when the macrofunction card 16 at a particular logic space address is selected, the only channel in or out of the central processor will be to the selected macrofunction card. In effect, the channel of communication between the card selected first along data 23 then through either outbus 93 or inbus 94, in a path out of the tool controller block via distributed interface bus system 31 to the central processor 1 will remain locked until central processor addresses another macrofunction card. In other words, until a different macrofunction card is addressed by the central processor, all data flowing in and out of the central processor will be capable of affecting or being affected by only the selected macrofunction card.

Figure 13B:
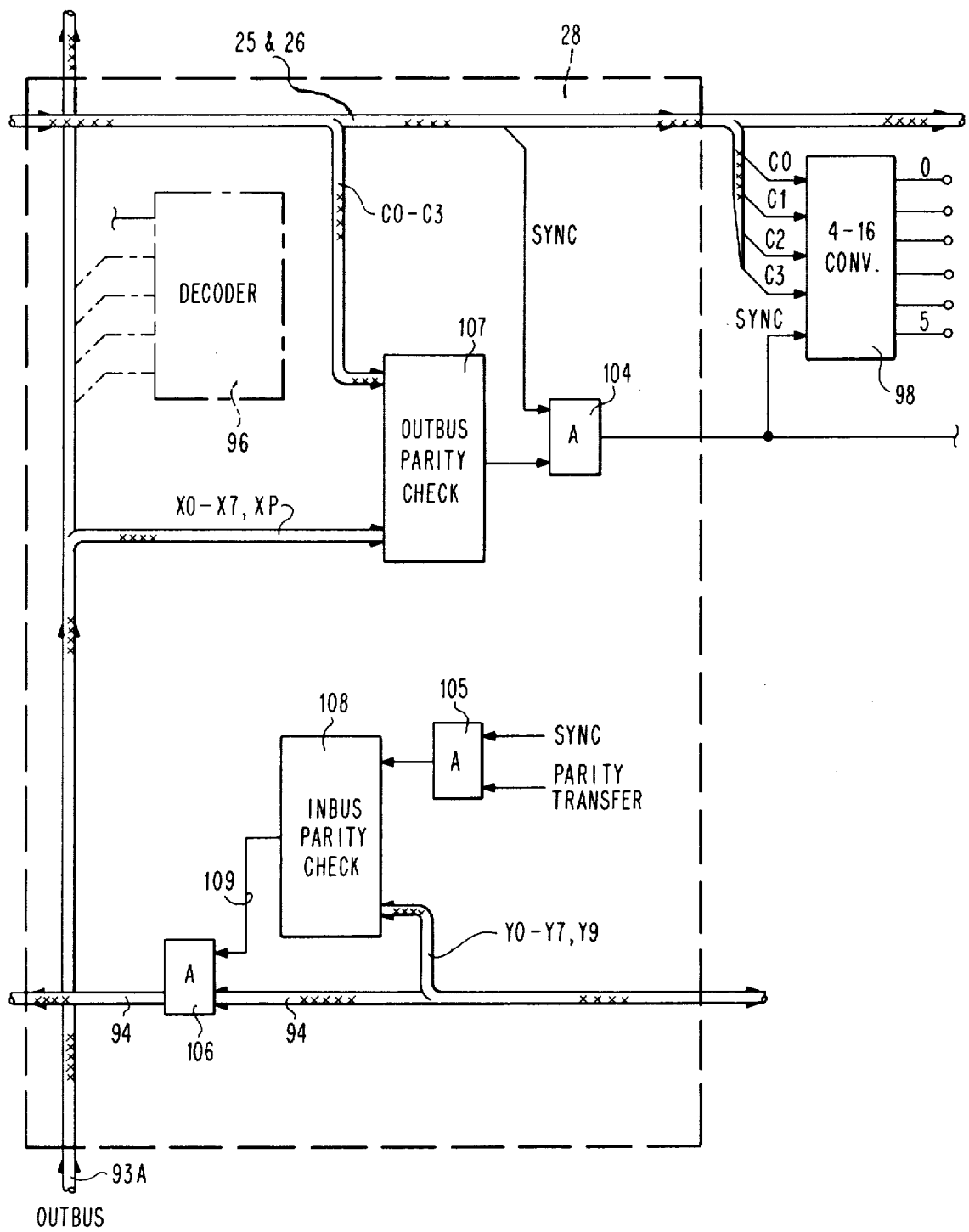
FIG. 13B is a logic diagram illustrating the additional circuitry found on a standard block interface card for performing standard parity checks.
Figure 13C:
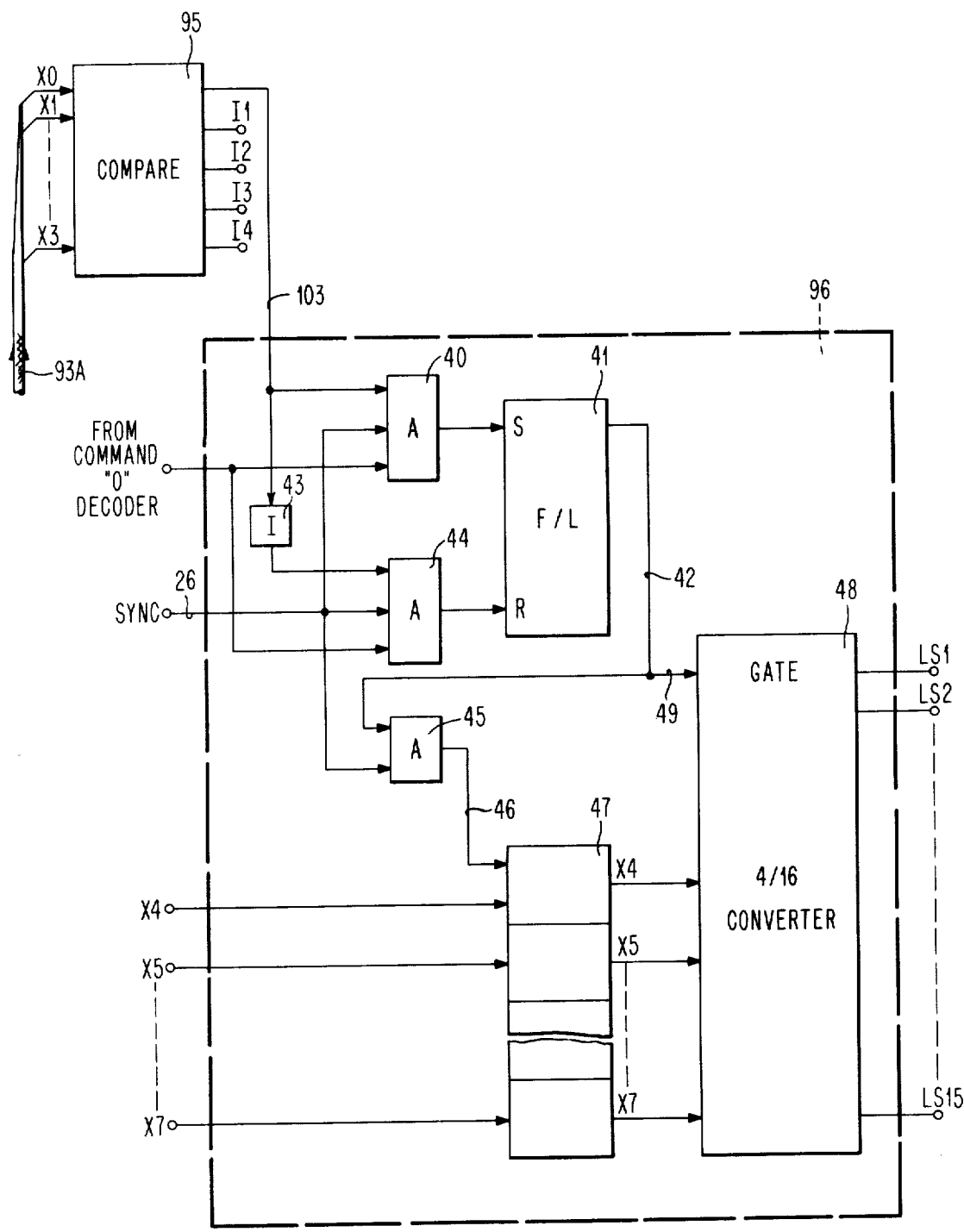
FIG. 13C is a logic diagram showing in greater detail the circuitry of decoder logic 96 in FIG. 13.

How this locked channel between the central processor and the selected macrofunction card 16 (FIG. 13) may be maintained will be better understood with reference to FIG. 13C which shows in greater detail the relationship between the compare logic function 95 and the docoder logic 96 on each block interface card. In FIG. 13C, the logic which makes up decoder 96 is shown in greater detail within the limits of the dashed line box 96. When, as previously described, the compare logic function 95 determines that, this particular tool controller block has been selected it issues an output along block select line 103 indicative of this selection. Block select line 103 will apply a signal to AND gate 40 which when coupled with the conventional sync pulse on line 26 used for the addressing function will activate AND gate 40 and set the latch on flip latch 41 to activate latch line 42. (Note that line 56 has already enabled both AND gates 40 and 44 upon the previous activation of command "0" on address function decoder 55 on the BIC 28 (FIG. 13). Incidentally, in order to insure that flip latch 41 is never reset so as to deactivate latch line 42 so long as block select line 103 is active, block select line 103 is also fed to inverter 43 which keeps AND gate 44 inactive thereby preventing flip latch 41 from being reset. Thus, when latch line 42 is active, AND gate 45 will provide an output on line 46 upon the application of the previously mentioned address sync pulse. This in turn will activate four bit polarity hold register 47 to receive and hold the previously mentioned four lower order bits $X_4$ to $X_7$ indicative of a selected macrofunction card on this selected block. At the same time, an output on latch line 42 will be applied to 4/16 converter 48 which in turn will provide the previously described activation of one of the address lines LS 1 - LS 15 which will, of course, result in the selection of only one out of the possible fifteen macrofunction cards.

Thus, until a new address is applied to the address and decode circuitry as shown in FIG 13C on each of the block interface cards of each of the tool controller blocks in the system, only the selected block will have a signal on block select line 103 and only on this selected block will the $X_4$ to $X_7$ input be decoded and a card selected via one of the address select lines LS 1 - LS15. In this manner, the path from the selected macrofunction card back to the central processor remains locked. There can be communication with no other macrofunction card anywhere in the system until a new address sequence is initiated by the central processor. When such a new address sequence is initiated and the block and card illustrated with respect to FIGS. 13 and 13C is no longer selected, then block select line 103 will be deactivated and gate 40 will go off while AND gate 44 will go on when the sync pulse is applied on line 26 during this addressing procedure, which in turn will reset flip latch 41 so that output 42 is in the "off" or inactive state. Thus, there will be no input to either polarity hold register 47 along line 46 or no gating line to 4/16 converter 48 along line 46 or no gating line to 4/16 converter 48 along line 49, and the channel from the card which is no longer selected to the central processor will be closed.

Figure 13D:
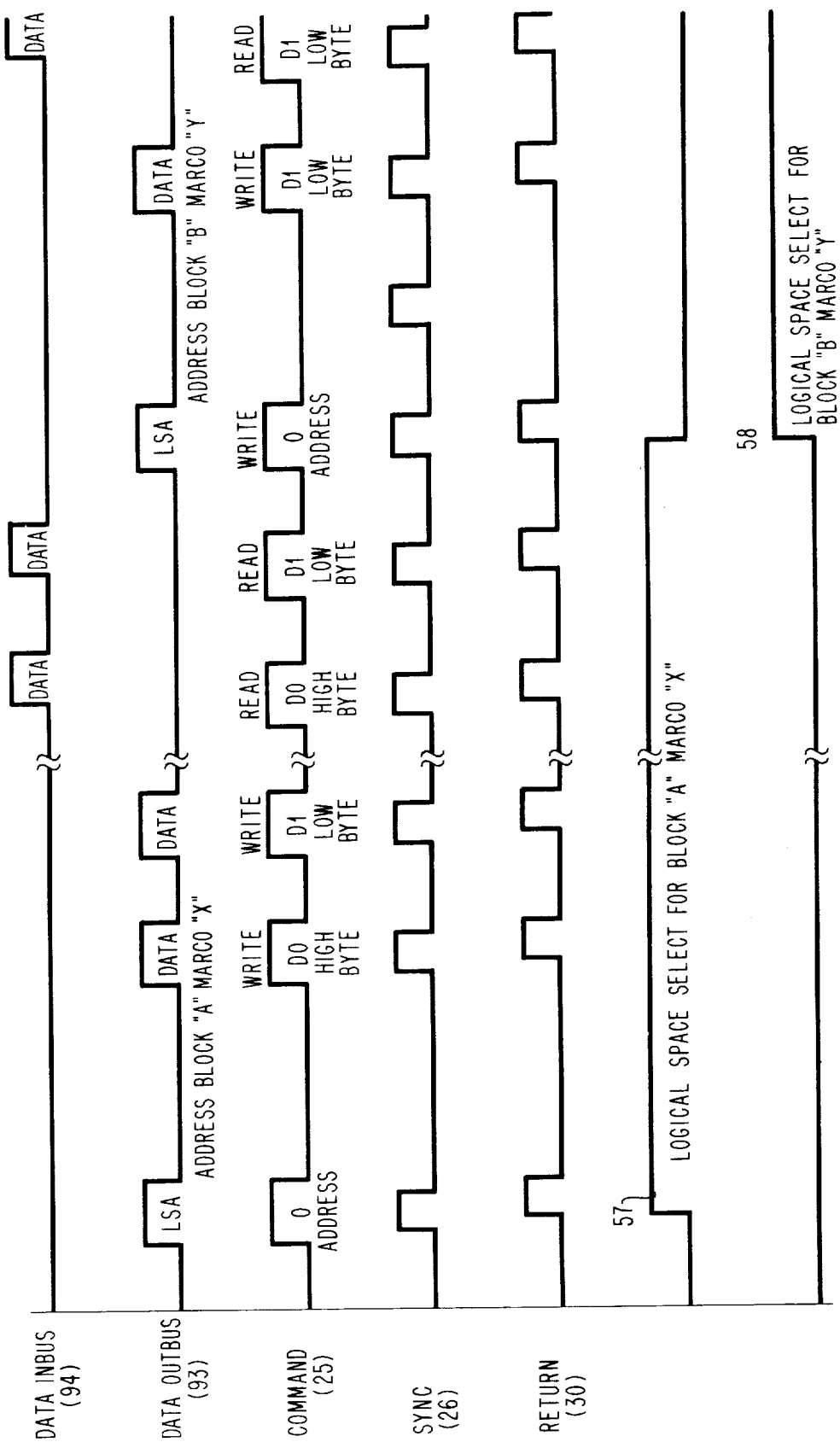
FIG. 13D is a timing chart similar to that in FIG. 13A but illustrating in greater detail sequences of pulse levels on the various lines of the logic in FIG. 13 during a series of data transactions between the macrofunction card and the central processor.

With respect to the locked path from an addressed macrofunction card back to the central processor, it should be emphasized that this path remains locked irrespective of whether the central processor is communicating data transactions to and from the selected macrofunction card. As long as no other macrofunction card has been subsequently addressed, the path between the central processor and the last addressed macrofunction card will remain open for communication to and from the central processor irrespective of which data transactions the central processor is currently conducting. This may be better understood with reference to FIG. 13D which shows the timing of the system for a sequence of data wherein a first macrofunction X is addressed, then data sent to (write) macrofunction X along outbus 93 after which data is read from macrofunction X. Then, macrofunction Y is addressed and data is sent to and read from this macrofunction. In this example, let us assume that during the period where the timing diagrams are shown in FIG. 13D as broken or interrupted, the central processor after addressing and writing into macrofunction X is programmed to conduct a series of data transactions not involving macrofunction X or any other macrofunction in the control system. Assume that it is to analyze some unrelated personnel data during this period. While the central processor is off on its own, the path between the central processor and the last addressed macrofunction X remains open as indicated by the continuous up level 57 on the timing graph indicating that macrofunction X is on.

When the central processor couples its unrelated functions and returns to the present control system, the path as indicated by up level 57 is still open and macrofunction X need not be addressed again. As shown in the graph, the computer issues a pair of read commands along command bus 25 at this point which respectively result in two bits of data being returned to the central processor along in bus 94.

It is only when macrofunction Y is addressed that the path from the central processor to macrofunction X is finally broken as indicated by the removal of up level 57 and the exclusive path from the central processor to macrofunction Y opened as indicated by up level 58. The processor may then proceed with the write and read transactions with macrofunction Y along this exclusive path as indicated by the timing graph in FIG. 13D.

The command tag combination $C_0$-$C_3$ is always grated through 4/16 converter 98 in the selected macrofunction 16 circuitry by the activation of the logic space address line 27 and the sync line 26 by means of decoder 96. In the present example, the activation of LS 4 picks the macrofunction shown. Thus, subsequently, when another logical space is selected, the logical space select line on any other macrofunctions will be reset.

The next byte of information on the outbus 93, when in the write mode, is the data $D_0$-$D_7$ that is to be gated into the D/O register 91 by data bus 23. When this data is impressed upon the outbus 93, the macrofunction of FIG. 13 has activated the output number 3 of the 4/16 converter 98 to strobe the data into the D/O register 91.

If the operation is a read operation, the macrofunction would gate the data contained in the D/I register 92 onto the data bus. The macrofunction of FIG. 13 has preassigned command tag combinations which must be impressed on the command tag lines 25 and 26 during the second phase of the command sequence. FIG. 13A shows the phasing of this data and the values of the information on the outbus and the inbus to operate macrofunction 16 in a timing chart.

The control subroutines that are written for the central processor to be subsequently described in greater detail to support the macrofunction will contain the constants which define the command tag combinations to operate this macrofunction in the write and read modes. Other macrofunction can use other combinations for read or write, depending upon their requirements.

The return line 30 becomes active whenever the sync pulse is active, the macrofunction 16 is selected and the operation, as defined on the command tag lines, is successful. If some undefined command tag combinations were decoded, the return pulse would not be generated. This would signal an I/O error to the processor.

PARITY CHECK FUNCTION ON BLOCK INTERFACE CARD

It has been previously mentioned that conventional parity checks may be carried out in the present system. There will now be illustrated with respect to FIG. 13B how such a simple parity check function may be carried out using conventional parity check routine generated by the central processor. Such a parity check is carried out on the block interface card 28 by incorporating circuitry such as that typically shown in FIG. 13B; this circuitry is in addition to that already shown on the BIC 28 in FIG. 13. An outbus parity check may be typically accomplished by connecting lines $X_0$ to $X_7$ and $X_P$ from outbus 93A to outbus parity check logic 107 under the control of the central processor. Command tags for the parity checks $C_0$ to $C_3$ from bus 25 and 26 are also connected to outbus parity check logic 107 which carried out a conventional odd parity check routine. If the resulting parity is odd, a gating signal is made to AND gate 104 which then permits the sync pulse to propagate from bus 25 and 26 to the 4/16 converter 98 of the address select logic on the selected macrofunction card 16 previously described with respect to FIG. 13. And the selection proceeds as previously described with respect to FIG. 31.

In a similar fashion an inbus parity check may be accomplished. Again, with respect to FIG. 13B, the parity transfer line from the macrofunction 16 is gated through AND gate 105 by the sync pulse which is valid for the particular macrofunction 16. When gated through gate 105, the parity transfer activates the inbus parity check logic 108 into which lines $Y_0$-$Y_7$, $Y_P$ are connected, and under the control of the central processor a conventional odd parity check is carried out. If the odd parity check is valid, the signal on line 109 will gate inbus 94 through AND gate 106. In addition, for those macrofunctions which are not designed to provide parity to the BIC 28, the BIC itself will generate proper parity. Conventional parity generation logic is incorporated in logic 108 for this purpose.

THE INTERRUPT FUNCTION

The system must be capable of interrupting central processor 1 operation under predetermined conditions. FIG. 16 illustrates the control logic to be located on the block interface card 28 and the interrupt request logic located on each macrofunction card 16 which requires interrupt handling support. It should be noted that not all macrofunctions will require interrupt handling support. In addition, interrupts may be directly presented to the block interface card 28 from the machine tool 13.

The block interface card 28 provides eight 8 process interrupt points. The input to each of these points is a bipolar logic level (TTL). Each input is compared to the corresponding position of a reference register 164 on the BIC as shown in FIG. 16. If the two differ, the interrupt request output 165 on the BIC is activated, on the distributed interface bus 31. The central processor 1 having located the interrupting block (see command sequence) previously described in the section on data sequences for polling for interrupts, can read the content of the reference register 164 and interrupt register 166 to determine which interrupt point(s) has (have) been set (see programming sequence of FIGS. 32 and 33).

In addition, for diagnostic purposes the processor may write to the interrupt inputs 167, to generate an interrupt under program control (having degated the actual interrupt inputs feeding the BIC). This operation is supported through a logic multiplexer which is located between the interrupt inputs 167 and the interrupt register 166. This multiplexer is not represented in FIG. 16.

Figure 16:
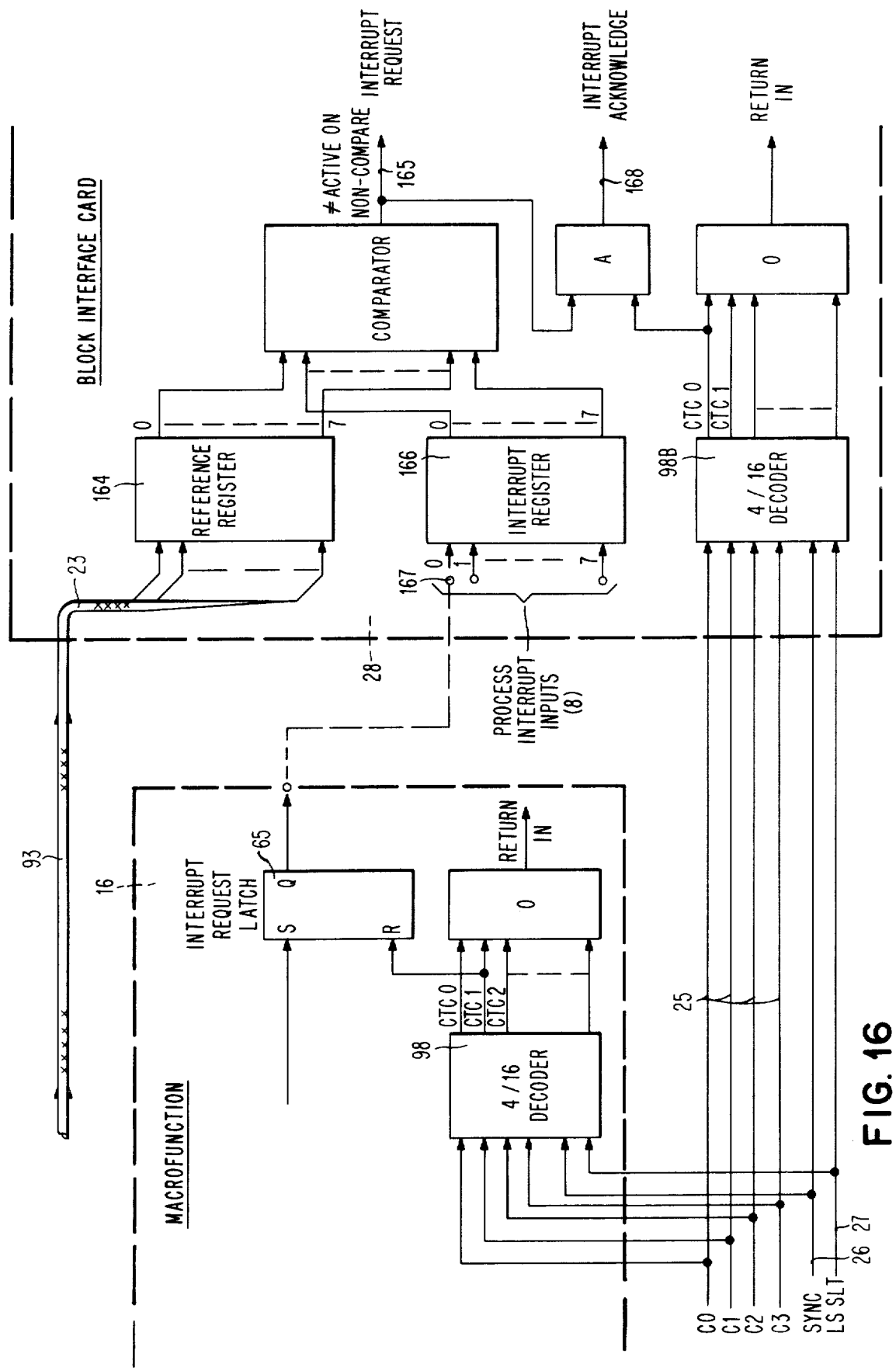
FIG. 16 is a logic diagram illustrating the logic required on each of the macrofunctions and on the block interface card for carrying out the interrupt function in the system.

It has been specifically indicated with respect to FIGS. 13, 13B and 16 that the block interface card 28 is involved in such functions as addressing, interrupt sequences, and parity checks. In performing such functions, the BIC 28 has to activate the appropriate circuitry on it to perform the respective tasks. This is accomplished by the BIC through appropriate commands from a 4/16 converter or decoder 98B on the BIC which is the counterpart of 4/16 converters 98 on all of the other macrofunction cards. This 4/16 converter on the BIC is illustrated in FIG. 16. Like the 4/16 decoders on each macrofunction card 16, the BIC decoder receives command lines $C_0$ to $C_3$ from bus 25 as well as a sync line 26 and a card select line 27 which is activated by an LS "0" output from an address decoder such as decoder 96, FIG. 13. When the decoder 98 of the BIC is thus activated, it may be controlled by inputs $C_0$ - $C_3$ to issue the appropriate commands on command lines CTC0-CTC15 to activate the appropriate circuitry for the particular function to be performed, e.g. the interrupt function of FIG. 16.

SOME EXAMPLES OF GENERALIZED MACROFUNCTION CARDS

The macrofunction of FIG. 13 is rather basic in nature. All other macrofunctions may be considered to be variations of this expedient. Multiple registers with combinations of read and write can be installed. These would be, however, variations of the simple macrofunctions of FIG. 9.

Figure 14:
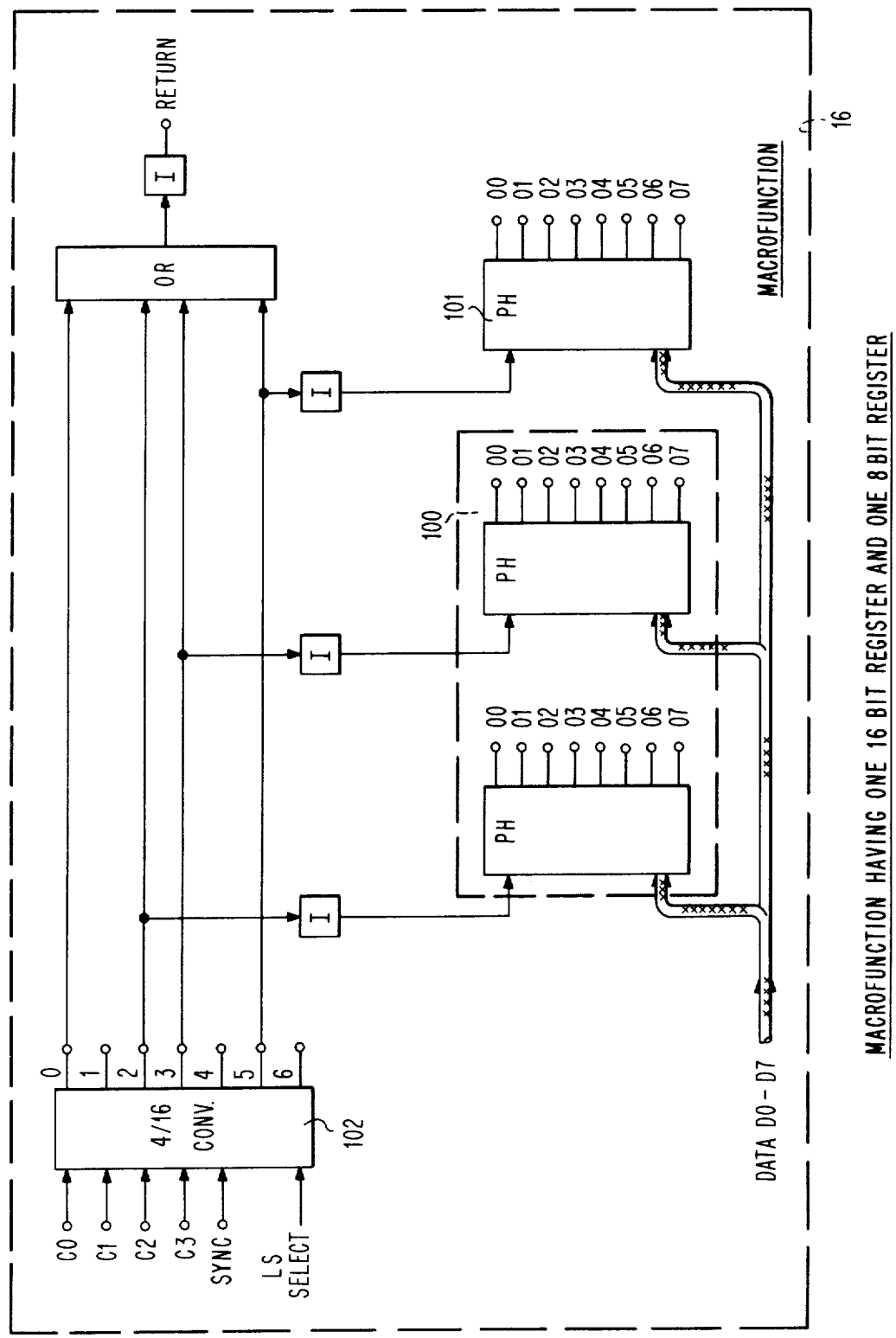
FIG. 14 is a logic diagram illustrating another generalized macrofunction card.

One extension of the simple macrofunction of FIG. 13 is that of FIG. 14. (The timing chart for the signals involved is shown in FIG. 14A). Here, this macrofunction 16, has one sixteen bit D/O register 100 which is actually a pair of eight-bit registers and one eight-bit D/O register 101. In this macrofunction, command tag combinations 2 and 3 from 4/16 converter 102 are used to write a half word into the sixteen bit register 100. Command tag combination 5 is used to write data into the single eight bit register 101.

Either the sixteen bit register 100 or the eight bit register 101 can be written into by the processor. The register would be selected by the command code combinations sent to the macrofunction. The control program in the processor would indicate the proper registers by passing the command codes 2 or 5. When writing to the sixteen bit register 100, the command code of three to the low byte is implied, due to the command sequence two definition. A maximum of twelve eight bit registers can be addressed using the unreserved command code combinations.

Figure 15:
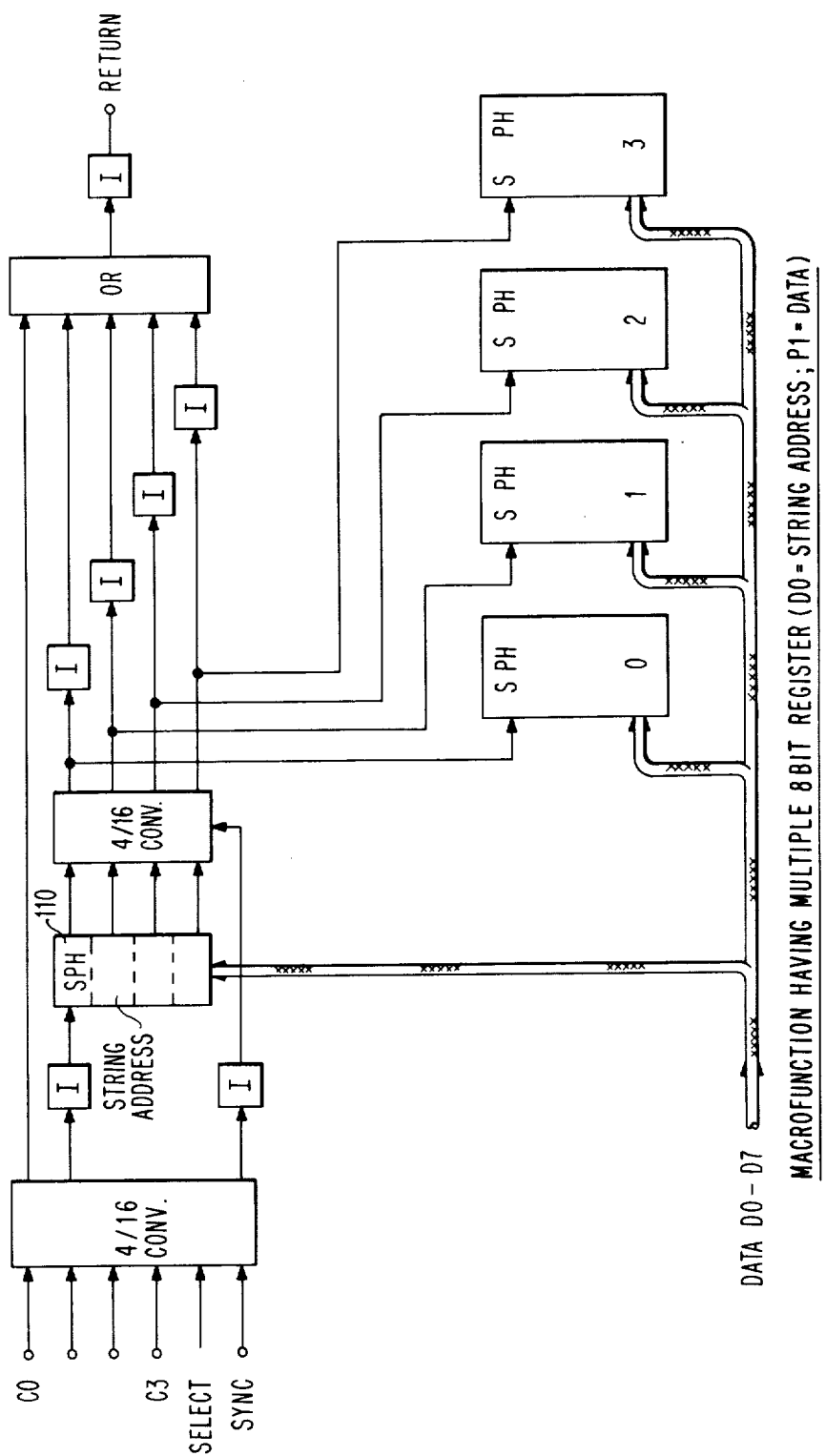
FIG. 15 is yet another logic diagram illustrating another generalized macrofunction card.

A macrofunction, which allows more than twelve bytes of data to be written into it, is shown in FIG. 15. (The timing chart for the signals involved is shown in FIG. 15A). Here, one of the command tag combinations is used to define an eight bit register as a string address register 110. For this macrofunction, the assumption is made that eight bit half words are written to the macrofunction. The high byte will contain the string address, and the low byte will contain the data. This macrofunction will use command tag 2 to gate data into the string address register 110. The output from this register will then gate the data accompanying command tag combination 3 into the properly selected register. If the control program in the central processor was to try to write data for a string address which has no register assigned to it, no return pulse would be generated. This would cause an I/O error to be generated back at the processor. The last transaction shown in the phasing diagrams of FIG. 11 shows this condition.

OTHER MACROFUNCTION CARD APPLICATIONS

Macrofunctions, in general, will utilize the basic digital input, digital output and interrupting capability described above. In addition, the macrofunction may include photocell amplifiers or other logic functions required for the detailed macrofunctions. Each of these specialized macrofunctions will require differing combinations of the basic read, write and interrupt capability. The detailed requirements for each macrofunction will differ, depending upon the need; some typical macrofunction for particular application will hereinafter be described in greater detail.

COMPLETION OR TERMINATION OF CONTROLLED TOOL FUNCTIONS BY TOOL CONTROLLER MACROFUNCTIONS WITHOUT CENTRAL PROCESSOR INTERVENTION

Figure 17:
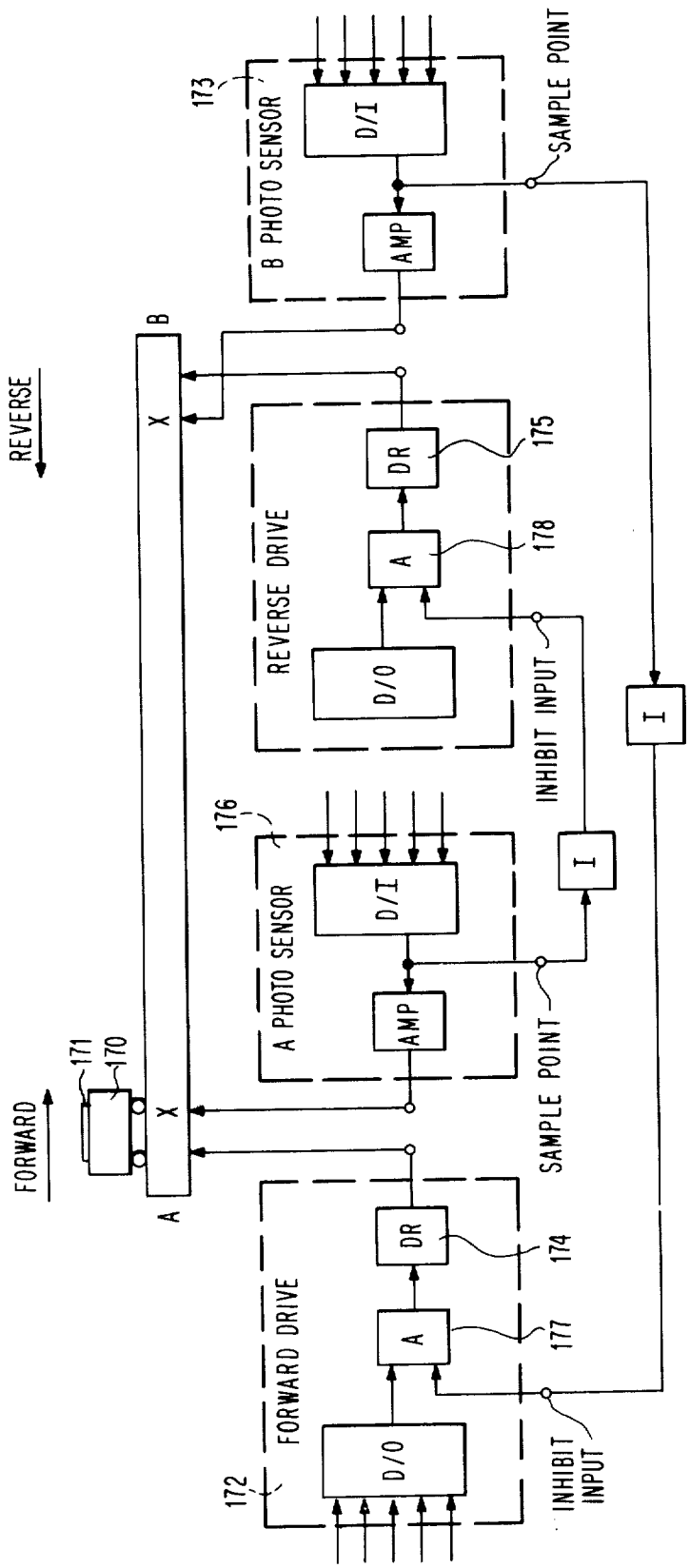
FIG. 17 is a logic diagram illustrating the coaction on generalized sensing and drive mechanisms on a cooperating plurality of macrofunction cards in a tool controller to control the operation of a machine tool.

FIG. 17 shows a simple example of how the macrofunctions are used and the normal user effects such use. The example of FIG. 17 assumes a trolley 170 to move from point A to B, and in reverse from B to A. Such a trolley could be used to move a workpiece 171 from one station to another, at which it could be picked up. Interlock conditions must be such that, when the trolley reaches point A, the reverse drive must be turned off and when the trolley reaches point B the forward drive must be turned off.

The user, in implementing this function, would choose two macrofunctions. One would be the D/O solenoid driver macrofunction 172 and the other would be the D/I photocell amplifier macrofunction 173. He would plug these cards into the standard block having a block interface card (FIG. 6). The user will connect two wires to the forward 174 and reverse drive solenoids 175 located in the subsector controlled by the block. Photocells at X are respectively connected to the photocell amplifier macrofunctions 173 and 176 through two wires each. This connects these subsector control points to the processor through the macrofunctions.

Figure 20A:
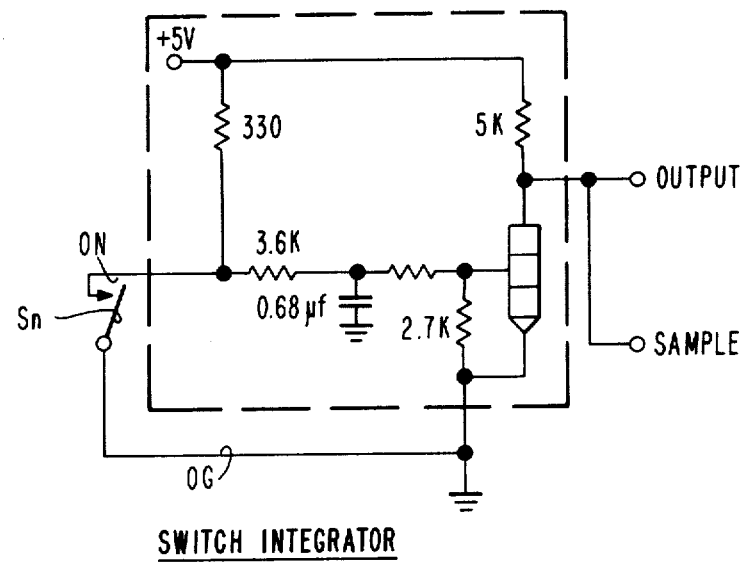
FIG. 20A is a circuit diagram of a typical switch integrator unit of FIG. 20.
Figure 20:
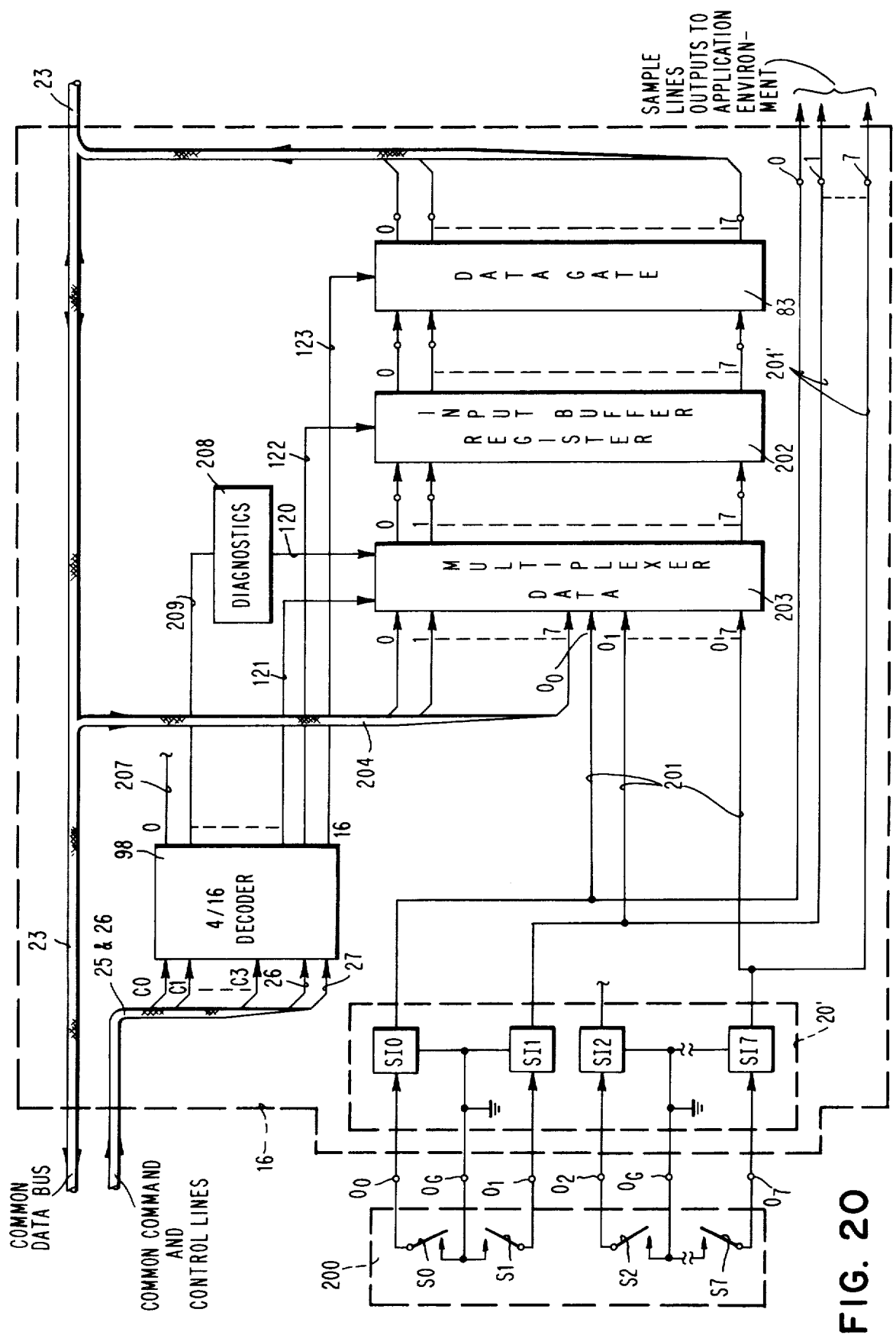
FIG. 20 is a logic diagram of a switch integrator macrofunction card.

An analysis of the interlock conditions indicate that certain inhibits must be provided. The sample points from the respective photocell macrofunctions 173 and 176 are inverted and connect to the inhibit inputs gates 177 and 178 on the respective solenoid driver macrofunctions. Thus, the user will implement the control and interlock requirements for this sample trolley with the use of two macrofunctions. This aspect may also be implemented using the magnet or solenoid driver macrofunction described subsequently with respect to FIG. 21 in combination with a switch integrator macrofunction (FIG. 20). The coaction of these two macrofunctions will be described subsequently with respect to FIG. 21A.

Figure 18:
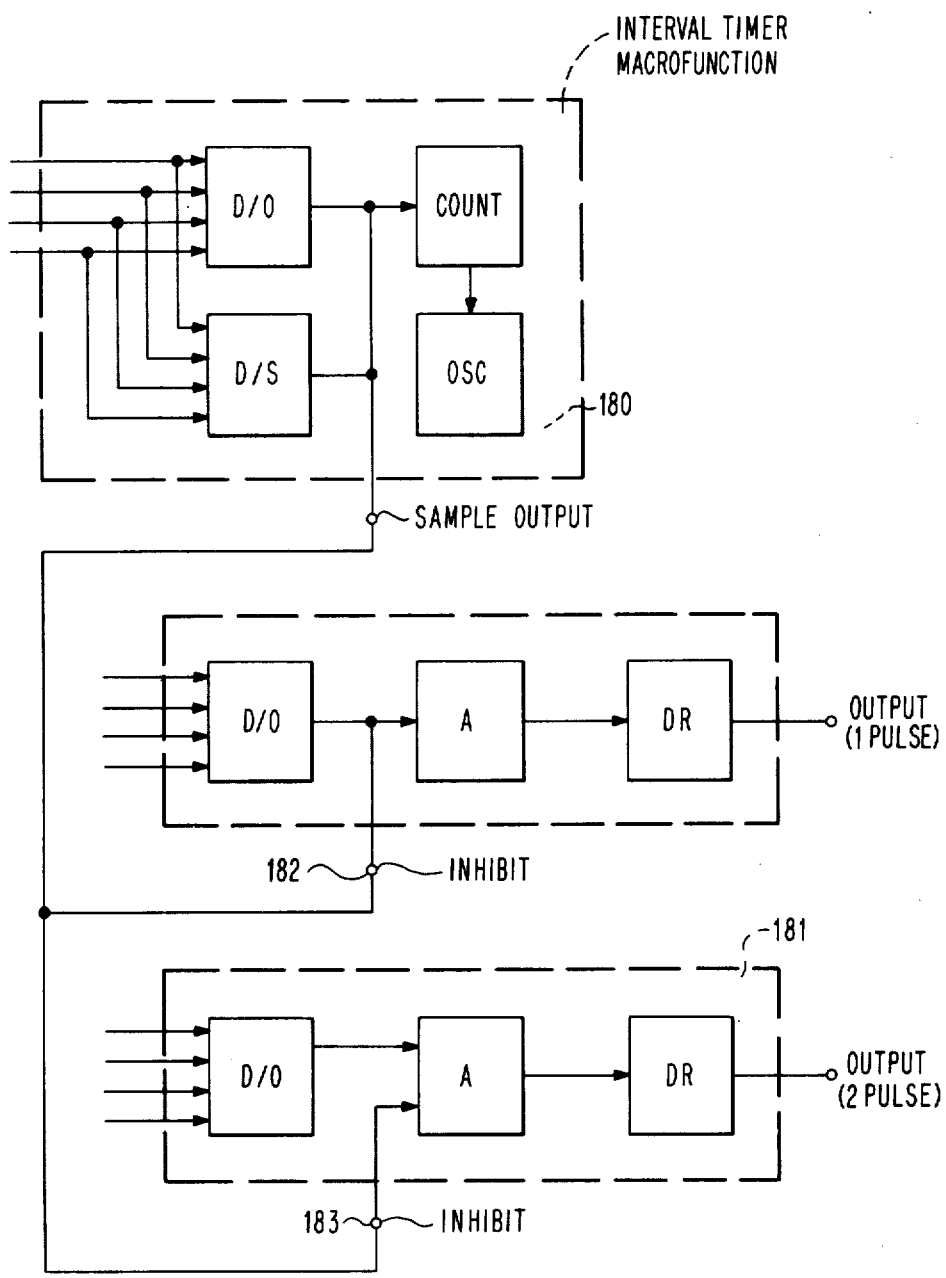
FIG. 18 is a logic diagram showing the coaction of an interval timer macrofunction and a solenoid driver macrofunction in order to achieve coaction between these two macrofunctions.

Other macrofunctions will operate in similar ways. For example, in FIG. 18, showing the use of an interval timer macrofunction 180 and a solenoid driver macrofunction 181 used to generate programmable pulse widths to two independent solenoids. Here, the user again selects his macrofunctions, connects the outputs from the solenoid driver macrofunction 181 to his required control points outputs 1 and 2 to a machine tool. The output from the interval timer macrofunction 180 is then sent to the inhibit inputs 182 and 183 to the driver macrofunction 181. The processor (not shown), by turning on the respective D/O, can select which output will receive the pulse from the interval timer 180. Obviously, the processor can control the pulse duration as generated by the interval timer. The interval timer card also has digital input capability, which allows the processor to read the status of the timer to see if the pulse period is completed.

DISTRIBUTION NETWORK TOPOLOGY

FIG. 7 shows one preferred topology or layout for the present distribution network wherein the blocks 14 are arranged along a single channel or distributed interface bus 31 to the central processor 1. However, it should be clear that a wide variety of topology variations are possible.

Figure 19:
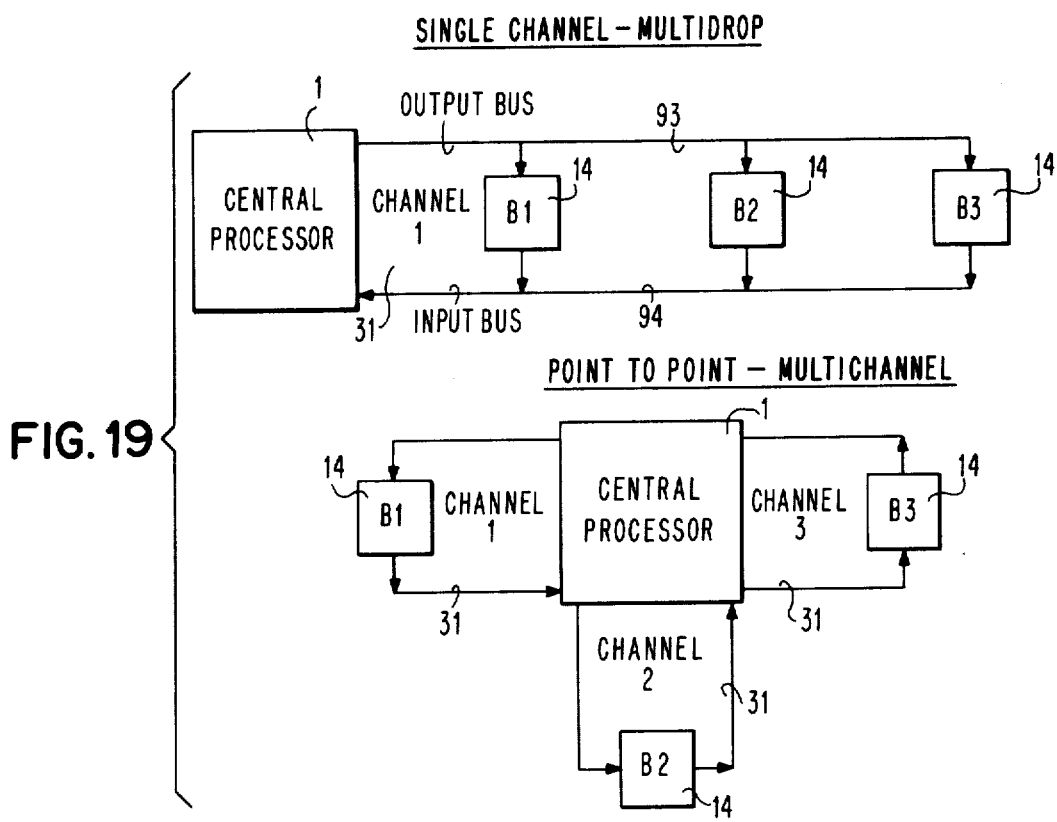
FIG. 19 is a very generalized block diagram illustrating possible topology variations in the layout of the present system.

FIG. 19 shows the topology variations that the distribution network can have. This includes multidrop single channel and a point-to-point multichannel network. Due to the symmetry of the inbus 94 and outbus 93, the convention is that where input to the central processor 1 is generated at some block 14, the symmetrical channel 31 always writes the zero logical condition into the existing data field. The function of the block is to OR into the data field the data it wishes to return to the central processor via inbus 94 in channel 31.

The multidrop single channel layout effectively utilizes the function of the block interface address and bus gating logic on the BIC's 28 in each block to connect the outbus 93 to the inbus 94 on the selected block as the block is selected. Thus, the propagation distance on the outbus 93 to the inbus 94 depends upon which block 14 is selected.

Another variation is to layout a point-to-point multichannel network. Here, each block 14 could be treated as a single unit on each channel.

SPECIFIC MACROFUNCTION UNITS

There has already been described with respect to FIGS. 1 and 3 how tool control or blocks 14 control machine tools 13 in general. As indicated, this is accomplished by one or more macrofunction circuit cards which perform one of a wide variety of basic control function with respect to the machine tool being driven. The generalized functioning of such macrofunction cards 16 has been previously considered with respect to FIGS. 2 and 13 through 15. These macrofunction cards either provide additional output to the machine tool for controlling a particular machine tool function or receive from the machine tool a digital input when monitoring a particular machine tool function. We will now consider some examples of particular macrofunction operations which would be typical of a wide variety of such operations which the macrofunction 16 may perform with respect to particular machine tools. Among the typical machine tool operations which macrofunctions 16 may control are included controlling of magnet drivers, switch integrators, timers, A to D convertors, D to A convertors, photocell amplifier control, timer control, dual arm control, stepper motor control, video display control, and control of read only memory buffers.

In performing these various functions, each of the macrofunction card 16 carries out common functions. The interface to and from the card 16 to the central processor 1 is always made through input and output registers, respectively, shown in FIG. 2 as registers 18 and 17. These registers, in turn, provide digital data to the logic which is unique to the particular card and determines the function which the card is to perform.

This output logic 17A and input logic 18A is shown in the generalized form in FIG. 2. The logic may be as simple as an AND block or as complicated as a plurality of counters, digital to analog convertors, or other unique forms of logic necessary to carry out the specific functions of the variety of macrofunction cards as set forth above.

User tab pins may be connected directly into the macrofunction input or output logic to either sample the condition of the logic or provide additional inputs or inhibits. These inputs and outputs are, respectively, shown in FIG. 2 as inputs 10 and outputs 10A. Of course, every macrofunction has signal conditioning logic both output 19 and input 20 to convert the normal logic level of the unique logic functions to the proper level required by the particular applications.

In general, the unique input or output logic on the specific macrofunction card is designed so as not to be time dependent, i.e., the card functions irrespective of when the data arrives at the input or output registers. In both signals are provided, as previously described with respect to sync pulse, to indicate to the unique input or output logic on the particular macrofunction card that data has been gated into the output register or that data has been gated through an input register back to the processor. As previously indicated, the sync pulse does not have any particular time limitations as to its maximum duration. As such, the particular unique logic in the macrofunction card is sensitive to the fall of the sync pulse which will indicate that the data has been gated either into the output registers or out of the input registers. With this background, let us now consider the operation of some specific macrofunction card.

SWITCH INTEGRATOR MACROFUNCTION CARD

This macrofunction card is typical of a variety of input macrofunction cards, i.e., cards that primarily receive data from the machine tool to be transmitted to the central processor. FIG. 20 shows the logic on this switch integrator macrofunction card. In describing each of the specific macrofunction cards, we will correlate them with the general structure of macrofunction cards as set forth primarily in FIGS. 2 and 13. Where wires, buses, logic blocks or other structures perform substantially the same general function as has been previously described with respect to FIGS. 2 and 13, they will be designated with the same numerals as the structures in these previous figures. The macrofunction card 16, the boundary of which is designated by dotted lines, is controlled, as previously described, through bus 25 and 26 which includes the four command lines as well as sync line. Data in and out of the macrofunction moves along common data bus 23 containing eight data lines for a byte of data and a parity check line. The command bus 25 connects the four command lines into the 4/16 decoder 98 which provides up to sixteen control lines which control the various logic functions within macrofunction 16, as has been previously described and as will hereinafter be particularly described with respect to the specific logic of the switch integrator macrofunction card.

The present switch integrator macrofunction card has specific logic designed to receive contact closure digital data from a plurality of output points designated in $O_1$ through $O_7$ from tool 200 which are applied as inputs to signal conditioning logic 20' in the macrofunction. The contact closure issue data on output point $O_1$ through $O_7$ of tool 200 must be generated to indicate the closure of switches such as reed relays, microswitches, or other such dry contacts. The signal conditioning function 20' provides antibounce integration in addition to generating a contact cleaning current for the contacts.

The signal conditioning unit receives from each of switches $S_0$ to $S_7$ in the machine tool an output designated $O_0$ to $O_7$. The signal conditioning unit 20' contains a plurality of switch integrators $SI_0$ to $SI_7$, one for each switch. The outputs $O_0$ to $O_7$ are respectively connected to these switch integrators. The other end of each switch $S_0$ to $S_7$ is connected to a ground input point. There is one of these common ground inputs for every pair of switches. It is within the respective switch integrators within signal conditioner 20' that the contact bounce on the make and break operations as each of the respective switches is opened or closed is integrated, as well as wherein a contact cleaning current for each of the switches is provided. These functions may be readily carried out in each respective switch integrator by a Schmidt trigger circuit such as that shown in FIG. 20A. The eight outputs from signal conditioning unit 20' are said as set 201 to data multiplexer 203. The output from signal conditioner 20' is also bused through bus 201' to eight sample output points as indicated on the drawing where the state of the switches may be sampled within the application environment. A second set of eight inputs is also bused to data multiplexer 203 along bus 204 connected to common data bus 23. This second set of inputs will be available for diagnostic purposes carried out under the control of the diagnostic logic 208. The diagnostics which are generally illustrated in greater detail elsewhere in the specification are triggered after an appropriate command to decoder 98 results in a signal along line 209 for the diagnostic routine contained in the logic of 208 which, in turn, supplies a diagnostic input 120 to enable data multiplexer 203 which coupled with a select command on line 121 from the decoder makes the data input along bus 204 available from the multiplexer for the diagnostic routine which will not be described at this point, but which will be similar to the diagnostic illustrations to be subsequently given.

Returning now to the normal operations of the system, in the absence of a command from the decoder 98 along line 121, the data multiplexer will make the initial input to the multiplexer along bus 201 available from the multiplexer. Then, upon an appropriate signal to input buffer register 202 along line 122 from decoder 98, register 202 samples the condition of the input lines fed to it from multiplexer 203. It should be noted that line 122 activating the input register 202 may be activated as soon as the macrofunction card is selected during the addressing procedure by the select input to the decoder 98 along select line 27. Thus, the address input $C_0$ - $C_3$ to decoder 98 which has previously been indicated to be 0000 may be decoded to activate line 122 to register 202. The data is then stored in this input buffer register 202. Thus, the data indicating the condition of the switches is received by the macrofunction and awaits in buffer register 202 for an appropriate signal through command lines 25 and 26 which will then be passed by the BIC 28 through decoder 98 which, in turn, will generate an appropriate pulse along line 123 to activate gate 83 to gate the data stored in input buffer register 202. At this time, the data will be gated out of 203 and returned to the processor via common data bus 23.

It should be noted that the sample lines along bus 201' to the appropriate output points to the application environment are substantially equivalent to the sample outputs 10A in FIG. 2. These outputs are indicative of the condition of the switches being monitored. They thus provide the user local intelligence from the macrofunction card. If desired for a particular function, these sample output points may be connected to interrupt points on a block interface card. For example, the sample outputs may be connected to input point 167 of interrupt register 166 in FIG. 16 to provide for an interrupt whenever a particular switch is closed. As another example, in FIG. 17, instead of a photosensor, the trolley could mechanically close the switch when it passes over the inhibit sense point marked X in FIG. 17, and if in place of the photosensor macrofunctions 172 and 173, switch integrator macrofunction cards were used, these sample points could be the equivalent of the two sample points shown in FIG. 17. Thus, the state of these sample points could be used to trigger the inhibit inputs necessary in FIG. 17 to stop the trolley. This will be described subsequently with respect to FIG. 21A.

MAGNET DRIVER MACROFUNCTION CARD

This macrofunction card is typical of a variety of output macrofunction cards, i.e., cards that receive data from central processor through the distribution network to be utilized to provide to machine tools a digital output which will drive certain functions on the machine tool. In the present case, the output from this macrofunction card is utilized to drive a magnet or solenoid.

There has been previously described, with respect to FIG. 17 in an illustration of the coordinated action of macrofunctions in general, a macrofunction which, on selected input, would drive a solenoid which, in turn, would drive a workpiece trolley. The present description, with respect to FIG. 21, will be of a specific solenoid or magnet driver macrofunction card. As previously mentioned, in this description we will attempt to correlate as many of the elements as possible on the macrofunction card with the general structure of macrofunction cards, as set forth primarily in FIGS. 2 and 13. Where wires, buses, logic blocks, or other structures perform substantially the same general function as has been previously described with respect to FIGS. 2 and 13, they will be designated with the same numerals as the structures in these previous figures.

Figure 21:
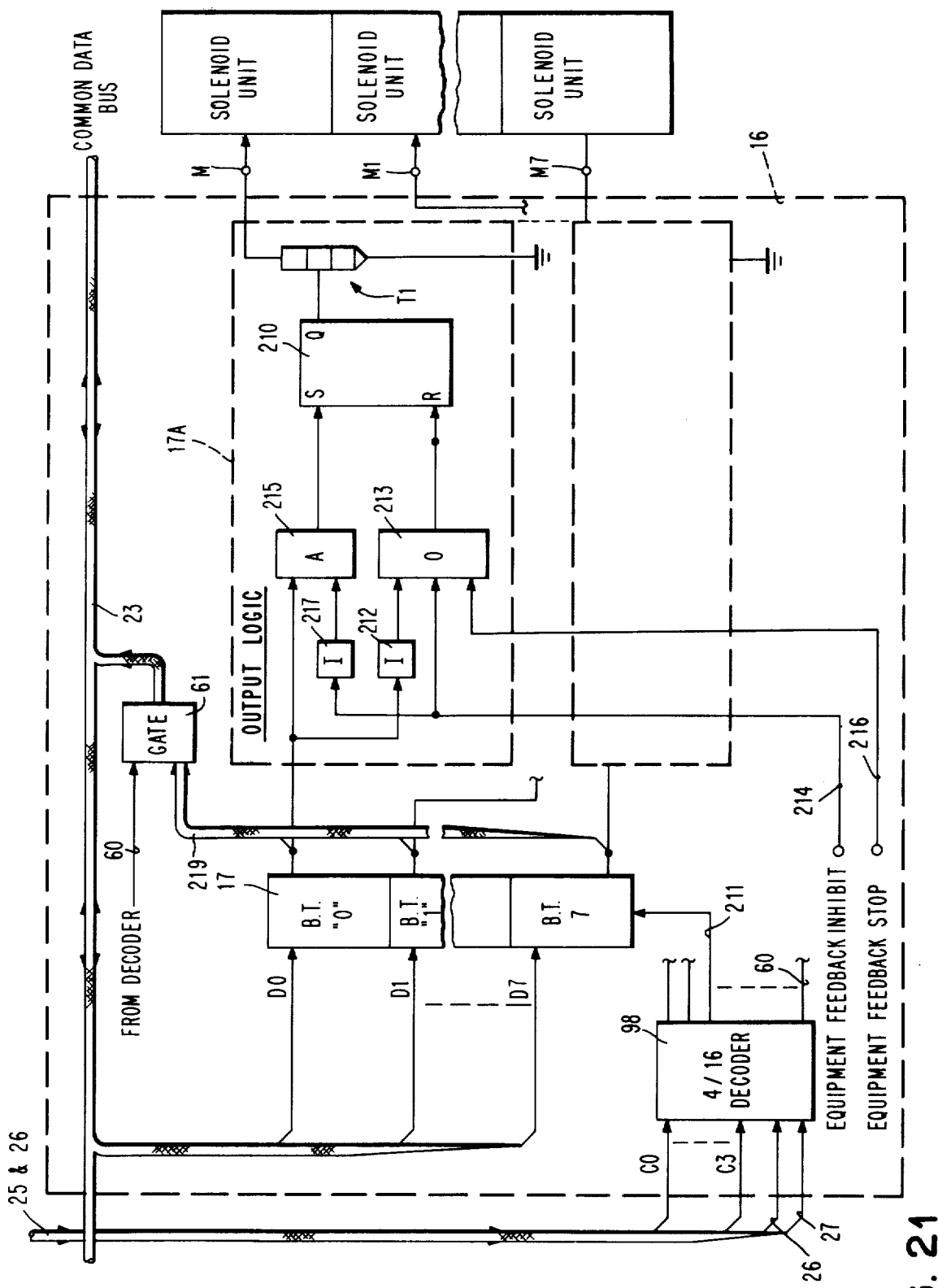
FIG. 21 is a logic diagram of a magnet driver macrofunction card.

Now, with reference to FIG. 21, macrofunction card 16, the boundary of which is designated by dotted lines, is controlled, as previously described, through bus 25 and 26 which includes the command lines $C_0$ - $C_4$, as well as the sync line and the return line 27. Data in and out of the macrofunction moves along a data bus 23 containing eight data lines for a byte of data and a parity check line. The command bus 25 connects the four command lines into the 4/16 decoder 98 which provides up to sixteen control lines which control the various logic functions of macrofunction 16, as has been previously described and as will hereinafter be particularly described with respect to the specific logic of this magnetic driver macrofunction card.

Output register 17 which is a polarity hold register contains eight bit positions which receive data along lines $D_0$ - $D_7$ from common data bus 23 connected to the central processor through outbus 93 (shown in FIG. 13). Data loaded into register 17 will be sufficient to drive eight magnet or solenoid driver units. It has been found practical to include on the macrofunction card 16 an additional eight bit output register, not shown, suitably multiplexed with the register shown to the data lines of the common data bus 23 to provide for the driving of eight additional solenoids for a total of sixteen solenoids. In initializing the macrofunction, the logic is conditioned by turning all digital output points $M_0$ - $M_7$ off. To accomplish this, flip latch 210 will be put into the off state. Thus, transistor T1 will not be powered and output $M_0$ will be at the inactive level. Please note that the logic shown in FIG. 21 for only the zero bit is repeated for each of bits 0–7. Thus, points $M_0$ - $M_7$ will be inactive or off. Accordingly, the level of each of the bit positions in output register 17 will determine whether output points $M_0$ - $M_7$ are respectively on or off. This, of course, will be subject to the state of both the stop and inhibit inputs which will be subsequently described in greater detail.

For certain purposes, the central processor may require the status of register 17. To accomplish this, it issues a "read" command tag to decoder 98 which in turn activates an input 60 to gate 61 to which the outputs of register 17 are connected. Gate 61 gates the output of register 17 back to the processor through common data bus 23.

In any event, let us now consider the operation of the output logic 17A associated with the "O" bit position, bearing in mind that equivalent output logic is associated with each of the seven other bit positions "1" to "7" in output register 17.

Along with the loading of the data in output register 17, the command along command bus 25 is decoded by decoder 98 to provide a gating pulse along line 211 to register 17 to gate the bits loaded in register 17. Similarly to the bit in the "O" position, each of the bits is inverted in an inverter 212 and fed to an OR block 213. This generates an up pulse to the reset R on flip latch 210. Then, if the bit at the bit position, i.e., first bit position in register 17, is on or up and if the inhibit input 214 is not on, AND block 215 will then generate a positive input on the set side, S, of latch 210. This will turn the latch on and provide an output which will turn on output drive transistor T1 which, in turn, will produce an active output on output point $M_0$ to drive its associated solenoid unit.

If an output such as $M_0$ is active and a stop input is applied to line 216, OR gate 213 will be turned on to apply a reset pulse to latch 210 which will turn the latch off, thereby removing the drive in transistor T1 and turning output $M_0$ inactive.

Unlike inhibit 214 which will be subsequently described, a stop input on line 216 may be over-ridden by the over-ride logic as follows. By turning the bit output from register 17 off and then back on again, the latch 210 will be reset, and will then return the drive pulse to transistor T1 if the bit position is up or on as is the case with the present bit.

On the other hand, when an up pulse on inhibit line 214 is OR'ed through gate 213 and resets latch 210 to an off position, no output from register 17 can over-ride this inhibit since inhibit pulse is also inverted through inverter 217 and fed to AND gate 215 as a down or off input. Consequently, as long as input 218 to AND gate 215 remains in the down position, no output on the line 219 from register 17 can produce an up output from AND gate 215. Consequently, latch 210 will remain in the off position. Thus, with reference to the example of FIG. 17, an inhibit pulse through either the forward drive macro 172 or the reverse drive macro cannot be over-ridden under any conditions and will thus inhibit the trolley.

It should be noted that once the flip latch 210 for each of the eight bits of data is set, the processor may dissociate itself from this macrofunction and go on to something else and the respective solenoids will remain in the same states until the macrofunction is addressed again.

In the illustration of the macrofunction card shown, an eight-bit driver has been described for convenience. However, for most applications, a sixteen bit driver is more appropriate. This can be readily accomplished by using a second polarity hold register such as register 17 for the second eight bits and the writing into the two polarity hold registers may be done in sequence under control commands to decoder 98. The second register will have the same circuitry shown associated with it for producing its eight bit drive output. With such a sixteen bit driver, the reading of the two polarity hold registers back to the processor may be similarly sequenced under the control of the decoder 98 in which case gate 61 would be a multiplexer with both eight bit registers connected to it. Decoder 98 would control the multiplexing.

With respect to FIG. 17, there has been described generally with the aid of some general examples how the tool controller units or macrofunction coact to complete or terminate controlled tool functions independent of the central processor, i.e., even when the processor is involved with other systems or is "down". Thus, the presence of the central processor is not critical and tool control operations may be completed or terminated when the processor goes down without any damage to either the tool controller or the machine tool.

Now that we have described the specific details of the macrofunctions, we will give a variation of trolley stop sequence described in FIG. 17 using a mechanical switch instead of a photosensor and using the magnet driver macrofunction of FIG. 21 in combination with the switch integrator macrofunction of FIG. 20.

This shows a drive mechanism 170 with a workpiece 171 similar to FIG. 17. In addition, one bit of a magnet driver 172 similar to FIG. 21 and one bit of a switch integrator similar to FIG. 20 is shown. The pieces are connected together by wire 502 which will provide a return to ground through transistor T1 to the drive mechanism 170. The end of the transport mechanism is identified by a switch 503 which will close when the transport mechanism 170 reaches point B. The switch 503 is connected to the switch integrator through wires 504. The sample point 201 of the switch integrator is connected through wire 501 to the inhibit input 214 on the magnet driver 172.

The central processor will turn off the digital output register 17 through the data bus 23 and decoder 98. This will reset the latch 210 through the OR block 213. The inhibit input 214 is at a zero level which is inverted through 217 conditioning one side of AND block 215.

Switch 503 is open which will make sample point 201 be equal to zero. When the computer turns on the digital output 17, the AND function 215 will set latch 210 which provides drive to the transport mechanism 170. The mechanism 170 will then process to point A.

When point A is reached, switch 503 is closed which will turn on the switch integrator mechanism 20. This will turn on sample point 201 which is connected to the inhibit input 214 of the magnet driver 172. This inhibit will turn off the latch 210 through OR block 213 which removes drive to transistor T1 and the mechanism will stop.

Note that the sequence terminated itself without the intervention of the central processing unit. The central processing unit can now sense the condition of switch 503 as the switch integrating mechanism 20 feeds information to the data bus 23 through the data multiplexer 203, input buffer 203 and data gate 83.

A convenient operation of the system would be for the computer to periodically interrogate the switch integrator to determine if the transport mechanism has reached point A. Between these interrogation periods, the central processor can be available for other processing tasks. It is not necessary for the central processor to read the switch integrator to turn off the digital output 17 in order to stop the transport mechanism 170. Thus, time criticality of response by the central processor is minimized.

TIMER MACROFUNCTION CARD

Figure 22:
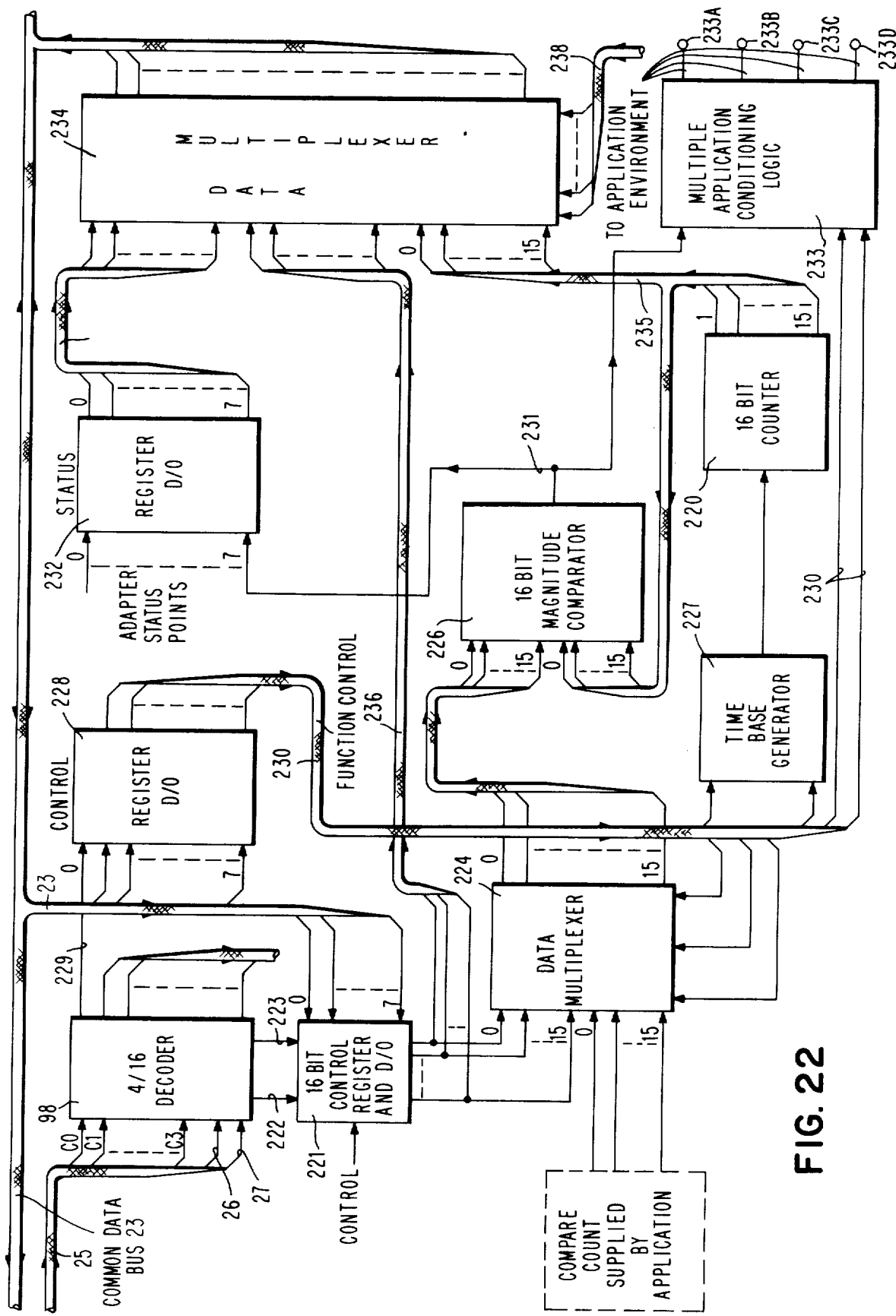
FIG. 22 is a logic diagram of a timer macrofunction card.

The Timer Macrofunction Card which is shown in FIG. 22 generates interval pulses under the control of a program in central processor. The macrofunction is provided with the standard data buses, command buses, and control lines as previously described with respect to the other macrofunction card as well as with respect to FIGS. 2 and 13, the generalized versions of the macrofunction cards. Wherever units or elements of this macrofunction card performs previously described function, we will attempt to use the same numeral designation as the previous figures.

The function of this macrofunction card is to provide a programmable time interval based on comparing the sixteen bit counter 220 with a sixteen bit output register 221. A time interval is achieved as follows: the macrofunction card is under the control of a 4/16 decoder 98 fed by four bit command tags on command line 25 in the conventional manner. Upon appropriate commands from decoder 98 along lines 222 and 223, two bytes of data are passed from data bus 23 through each of the two eight bit registers on counter register 221 to provide a sixteen bit count in this register. A sixteen bit count in register 221 is applied to data multiplexer 224 which functions to multiplex these sixteen bits with another sixteen bit group which may be applied by the application user through application bus 225. Thus, the counter may be either supplied from the central processor through counter 221 or from the application user through application inputs 225.

Whichever sixteen bit count is being used as the controlling count, i.e., the count provided from register 221 or the count supplied by the application through inputs 225, it is routed through data multiplexer 224 to the sixteen bit comparator 226 where this count is compared with an input from binary counter 220 which is indicative of the elapsed time since the start of the count which controls the operation. The time intervals are generated by time base generator 227 which is a conventional generator for digital time units known in the art. It may contain any conventional purposes.

The time base generator 227 is under the functional control of control register 228 which is a digital output register. The data required to control the base timer 227 is provided to control register 228 by an eight bit digital input off common data bus 23 as shown.

When the particular timing function is to commence an appropriate command, it is fed to decoder 98 along command control lines 25 from the processor. The decoder issues a signal along line 229 to activate control register 228 to provide the functional control digital data to time generator 227 along bus 230. Thus, generator 227 generates the time units which are counted by binary counter 220. When the output from binary counter 220 matches that from data multiplexer 224, comparator 226 issues the end of count signal along output line 231 which is fed both to digital input status register 232 and to the application environment through multiple application conditioning logic block 233. Depending on the application environment, conditioning logic block 233 contains appropriate logic to provide either one of four possible outputs to the application environment: a programmable time delay function, output 233A; an interval timing function 233B (which may be used to generate an interrupt signal); a programmable pulse generation function (where frequency and width may be varied), output 233C; and a pulse counting function at output 233D. In order to provide this variety of application output functions, logic 233 responds to functional controls from control register 228 applied through bus branch 230'.

It should be noted that the output 239 from status register 232 which is indicative of the status of the binary count through comparator 226 is fed to data multiplexer 234.

Data multiplexer 234 has several other major inputs which it is capable of multiplexing with respect to input 233. Input 235 from binary counter 220 is made to data multiplexer 234 as is input 236 from counter register 221. For simplicity of illustration, input 235 and 236 are shown as single buses. Actually, since they each come from sixteen bit counters, they are respectfully each a pair of eight line buses.

There is an additional set of inputs to data multiplexer 234 from macrofunction diagnostics which is not shown. Diagnostics in general will be dealt with elsewhere in this specification where it should be clear to one skilled in the art the applicability to such diagnostics to each of the macrofunctions shown.

Thus, upon appropriate input to decoder 98 resulting in commands from the decoder along inputs 238 to data multiplexer 234, the data multiplexer will multiplex in the conventional manner one of four sets of data back to the central processor along command bus 23.

In this manner, the status of the count may be sampled by the central processor. It also may be sampled by the user through output 233.

ANALOG TO DIGITAL CONVERTER MACROFUNCTION CARD

Figure 23:
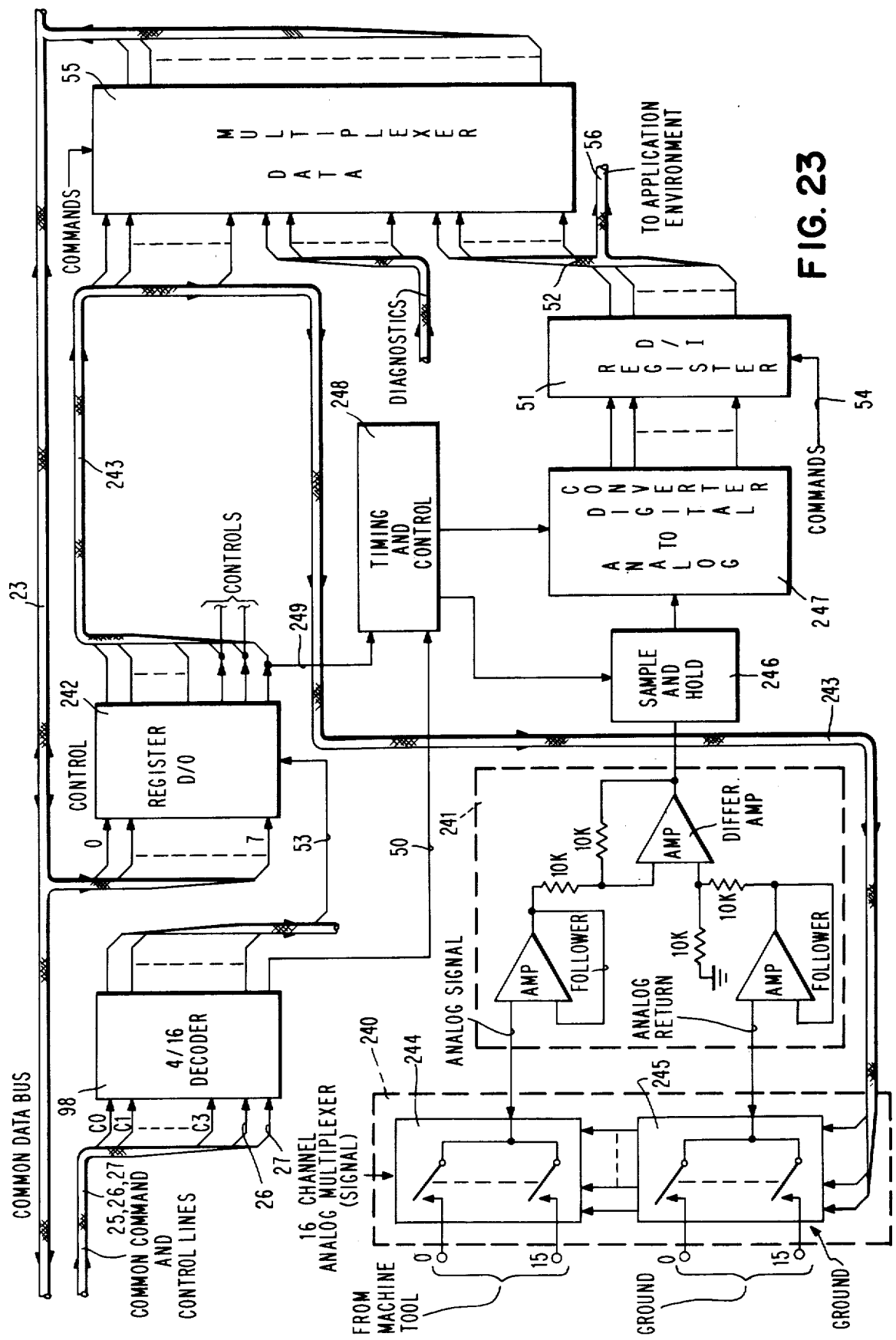
FIG. 23 is a logic diagram of an analog-to-digital converter macrofunction card.

This card which is shown in FIG. 23 converts analog to digital signals. Such analog signals would normally be received from a tool operation which is being monitored. As with the description of the other specific macrofunction card, the description will be coordinated with the previous general descriptions made in connection with FIGS. 2 and 13, and where possible, lines, registers, and other structural units will be designated with the numerals used in the general description when such elements perform substantially the same function.

The signal conditioning on this macrofunction card is accomplished through the operations of an analog channel multiplexer 240 in combination with differential amplifier circuitry 241 which provides an amplified output. These units function under the control of both control register 242 and decoder 98. Control register 242 which is loaded with a predetermined byte of data from the central processor along common data bus 23 provides for on-macrofunction-card-control of macrofunction operations without the intercession of the processor once the data is loaded into the control register. Decoder 98 receives command along command data bus 25 from the central processor which it decodes and utilizes to control various macrofunction operations. Analog channel multiplexer 240 is a conventional channel multiplexer which is controlled by four input bits 243 from control register 242 which are decoded within the multiplexer by conventional four to sixteen bit decoder (not shown) to select one of the sixteen channels. Upon selection of an appropriate channel, the channel multiplexer 240 will operate to close the path for the channel from one machine output point to input point in signal channel multiplexer 244 and the corresponding return path to ground through ground channel multiplexer 245. A signal indicative of the condition of the channel is provided to sample and hold logic 246 which feeds the signal to the single input along to digital converter 247. Both the sample and hold function 246 and the analog to digital converter 247 operate under control of timing and control circuitry 248 which in turn controls by coordinating inputs 249 from control register 242 and 50 from decoder 98. Timing and control logic 248 provides for the coordination of the digital-to-analog converter 247 with sync and return pulses provided to the timing and controls 248 through the decoder 98 which is fed along bus 25 (data), 26 (sync) and 27 (card select) with sync and return path to the central processor.

Under the control of the timing and control logic 248, analog-to-digital conversion logic which may be any conventional analog-to-digital conversion logic well known in the art, steps through and converts to digital output a series of analog signals provided by the closing of the sequence of up to sixteen channels through the channel multiplexer 240 as previously described. Converter 247 provides a multiple bit parallel output signal. In the particular macrofunction shown in FIG. 23, the particular analog-to-digital converter 247 used provides a twelve bit output. Upon the completion of each conversion of one analog input channel, A to D converter 247 will provide a twelve bit digital output indicative of the status of the analog input channel. These twelve bits represent eleven data bits and one bit representative of the sign of the eleven parallel data bits. The output of A to D converter 247 is stored in input register 51 which is a digital input register, i.e., a buffer register associated with the converter which will provide an input to the processor. Since it stores twelve bits of data, it may conveniently consist of two conventional eight bit registers.

Thus, in the operation of the macrofunction, when the central processor issues an instruction to determine the status of a selected analog channel, a write instruction is fed to control register 242 along bus 23, loading this register with the control data as previously described under the control of a write command to decoder 98 which issues a write command to control register 242 along line 53. Decoder 98 and control register 247 then issue appropriate commands to timing and control logic 248 which initiates the conversion by converter 247 of the selected channel. The output from A to D converter 247 is loaded into input register 51. Then, a read command is issued to decoder 98 through bus 25 resulting in a read command from decoder 98 along line 54 to input register 51 which in turn results in the transmission of the output from register 51 along bus 52 through data multiplexer 55 onto common data bus 23 to thereby return the results of the A to D conversion back to the central processor. All inputs back to the central processor from this macrofunction card are passed through data multiplexer 55 which operates in the manner described for previous data multiplexer logic. Multiplexer 55 multiplexes the data from input register 51 with data from other sources. It has an input from control register 242 which it makes available for the central processor when it requires a reading of the status of the control register 242. Also, the multiplexer 55 receives an input from diagnostic routines which will not be discussed here but will be considered elsewhere in this specification in greater detail with respect to macrofunction cards in general.

The status of register 51 may be sampled or used by the application's environment directly through output points 56.

OPERATION OF THE SYSTEM (AN ILLUSTRATIVE EXAMPLE)

For purposes of illustrating the generalized sequence of steps in the operation of the system, let us assume that the system is to be utilized to read the status of a series of switches (determine if the switches are opened or closed), and that this is to be determined through a macrofunction card such as a Switch Integrator Card described with respect to FIG. 20 in the specification. The data from this card indicative of the status of the switches is to be returned to the central processor after which the processor in response to the status of the switches is to activate one or more solenoid units in a particular machine tool utilizing a macrofunction card like that described with respect to FIG. 21. In going through the sequence of operations involved in carrying out these two major functions, reference will be made to appropriate sections of the specification and drawings if further information is desired with respect to any particular step.

First, with respect to FIG. 7 which shows the relationship of a group of controller blocks 14 to a central processor 1, FIG. 3 which shows the relationship with a plurality of macrofunction cards within the block 14 to the block interface card 28 in the block, and to FIG. 13 which shows the more specific relationship to macrofunction cards to the block interface card for purposes of addressing, the first major step is to address, under the control of processor 1, the particular macrofunction card which performs the switch integration and monitoring shown in FIG. 20. For purposes of this generalized description, we will assume that all of the conventional steps required to initiate the system and bring it up to the operational state have been carried out. In addition, it should be noted that the programming by the central processor required to issue the appropriate commands to the various hardware functions in the apparatus to be described in standard and readily determined by anyone skilled in programming and systems art. In any event, flow charts of the necessary programming will be set forth in greater detail subsequently in the present specification. Logical Space Address (LSA) of the Switch Integrator Macrofunction Card (shown in FIG. 20) is stored in the central processor. When addressing this LSA, central processor sends along output 93 of distributed interface bus system 31 a byte of data $X_0-X_7$ indicative of this LSA. This byte of data is fed to each of the up to sixteen initial tool controller blocks $A_1$ through $P_1$ illustrated in FIG. 7 as attached to back bone 70 at appropriate sector distribution points 71.

Each of these tool controller blocks 14 have the configuration essentially as shown in FIG. 13 with a block interface card 28 and up to fifteen macrofunction cards 16. The operation of each of the block interface cards on each of blocks $A_1$ to $P_1$ in interpreting whether the byte $X_0-X_7$ is applicable to the block and if so which macrofunction 16 on the block is being addressed is described in the specification with respect to FIG. 13, in the section entitled "Basic Macrofunction 16 and the Addressing of Such Functions". Thus, compare function 95 on each of blocks $A_1$ through $P_1$ will compare the four high order bits $X_0-X_3$ with the four bits in inputs $I_1$ to $I_4$ in order to determine which block is selected. Let us assume now that the block containing the desired switch integrator macrofunction card is selected, then compare function 95 will activate block select line 103 which in turn will activate decoder 96 on the block interface card only for the particular one selected block. As previously mentioned with respect to FIG. 13, decoders 96 on all BIC's 28 have already been enabled by an input on lines 56 from command "O" decoders 55 as a result the "O" command tag applied to decoders 55 from bus 25 and 26. This permits the decoder logic 96 on the selected block to operate when there is the input on block select line 103. Although low order bits, $X_4$ to $X_7$ are applied to decoders 96 on all of the block interface cards of block $A_1$ to $P_1$, only the one decoder 96 on the selected block as activated by block select line 103 will function to decode this low order set of four bits. Since decoder 96 involves a four to sixteen decoder, it is capable of decoding up to sixteen combinations. In the illustration, only fifteen combinations are shown, respectively, on outputs LS1 to LS15, each one for the selection of a different macrofunction card 16. However, the sixteenth state, LSO, may be said to represent the BIC card 28 itself; which, of course, has to be activated so that it can perform the address function. Obviously, decoder 96 cannot activate LSO the address function since decoder 96 is not itself active until the address function is activated. This is the reason for the above-mentioned command "O" decoder 55 which only activates the address function. Thus, line 56 activated by decoder 55 may be said to be the LSO line. In the example shown in FIG. 13, LS4 is selected which activates card select line 27 to one of the fifteen macrofunctions. Let us assume the card select line 27 is the input which activates switch integrator macrofunction card shown in FIG. 20.

However, before following the operation through switch integrator card in FIG. 20, it should be noted that the addressing procedure thus described may be better understood when considered in connection with concepts set forth in this specification in the section entitled "Logic Organization of the Interface for Addressing" which is illustrated in FIGS. 9 through 12, and further in connection with the section entitled "Sequencing of Data" illustrated in FIG. 8A, particularly with respect to the command sequence 0.

In any event, the switch integrator card shown in FIG. 20 has now been selected by an input on card select line 27 which activates decoder 98 on the card. It should be noted that during the addressing operation, the command tag being applied from bus 25 to the decoder 98 on the macrofunction card will be a command tag indicative of an addressing operation, i.e., previously indicated 0000 on input $C_0$ to $C_3$. Upon the completion of this addressing function of the switch integrator card, the sync pulse on line 26 to decoder 98 will be applied (see FIG. 8A and the address sequence described in connection therewith). This will result in the activation of a return signal to the processor which in effect will indicate to the processor that there was a macrofunction card at the selected address and that the addressing procedure has been accomplished. Although a return line is not shown in the switch integrator of FIG. 20, the generalized return function which is present in every macrofunction card is shown in FIG. 13 and the return to the central processor is made along line 30.

Once the specific macrofunction card is selected as in the present case, the switch integrator card of FIG. 20, the channel from central processor through the distributed interface bus system 31 to the selected controller block 14 and then through the selected macrofunction card within the block along macrofunction interface bus system 29 remains locked, i.e., no other macrofunction card anywhere in the system can communicate with the central processor until the central processor begins the execution of a new addressing step. FIG. 13 in combination with FIG. 13C show how this locked channel is accomplished.

Next, under the control of appropriate command tags along bus 25 from the central processor as decoded in decoder 98, switch integrator macrofunction card of FIG. 20 will operate to provide to the processor the condition of switches $S_0$ to $S_7$, i.e., whether these switches are opened or closed. This operation of the switch integrator macrofunction card is described in the specification with respect to FIG. 20. Then, the various required functions are carried out under the control of command sequences to decoder 98 as described in the section of the specification headed "Sequencing of Data" as illustrated in FIGS. 8A and 8B. When the card is initially addressed, the signal conditioning unit 20' through a plurality of switch integrators $SI_0$ to $SI_7$ corresponding respectively to each of the switches has already determined the status of the switches and maintained a series of outputs $O_0$ to $O_7$, indicative of this status, and as previously described in the absence of a signal putting multiplexer 203 in a diagnostic mode, the data will be waiting at the eight inputs to buffer register 202. Thus, when the switch integrator macrofunction is addressed and decoder 98 applies a signal to register 202 along line 122 (which may be as soon as the macrofunction is addressed), input (buffer) register 202 will pass this byte of data indicative of the condition of the switches through data gate 203 which is, in turn, activated via line 123 upon an appropriate command to decoder 98 so that this byte of data is gated back to the processor along common data bus 23 and then to inbus 94 of distributed interface bus system 31.

Since, in the operation described, the contents of an input register on a macrofunction card are fed back to the central processor, this function is essentially an operation in the "read" mode as described in the specification with respect to FIG. 5 and follows command sequence "1" in the "read" mode described in connection with FIG. 8A.

Now that the switch integrator macrofunction has completed its task, it no longer requires the locked channel back to the processor. Then, depending on the nature and number of operations controlled by the processor, the processor may either address another macrofunction card for the carrying out of some other unrelated tasks while the processor is interpreting the data received from the switch integrator macrofunction card, or the processor may immediately proceed with the addressing of an appropriate magnetic driver macrofunction card on which one or more solenoid driving outputs are to be activated in response to the interpretation made by the central processor of the switch integrator data. Irrespective of whether the central processor addresses some intermediate unrelated macrofunction or addresses the specific magnetic driver macrofunction immediately, the addressing by the central processor will unlock the channel from switch integrator macrofunction and will substitute the similar locked channel to the particular macrofunction card next addressed.

Whichever way the central processor then proceeds, let us now assume that the central processor has had an opportunity to interpret the data from the switch integrator macrofunction card indicative of the status (either closed or open) of the switches, and is now ready to activate one or more solenoids in response to the interpreted data.

The addressing procedure by the central processor of the magnetic driver macrofunction card which is to drive selected solenoid units in response to the command from the central processor is essentially the same as has been previously described, particularly with respect to the addressing of the switch integrator card. Consequently, the operation of the addressing procedure will not be repeated here. Thus, let us assume now that magnetic driver card of FIG. 21 has been properly addressed and the channel between this magnetic driver card and the central processor has been established and locked through macrofunction interface bus system 29 and distributed interface bus system 31. As previously described, the structure of the magnetic driver macrofunction illustrated in FIG. 21 which is capable of driving sixteen solenoid units has two output registers, one of which, 17, is shown. The status of each of the eight bit positions in the two output registers will determine driving outputs from the macrofunction card respectively to the sixteen solenoid units. Accordingly, through appropriate command input to decoder 98, one of the two eight bit output registers is activated. In the illustration, the command sequence first activates output register 17 via line 211. Then, upon an appropriate command to the data multiplexer, not shown, which multiplexes the data sequence $D_0$ to $D_7$ coming from the central processor along data bus 23 to the macrofunction card, data byte $D_0$ to $D_7$ is loaded into output register 17.

As has been previously described with respect to the magnetic driver macrofunction, the level of each of the bit positions in output register 17 will determine whether output points $M_0$ to $M_7$ are respectively on or off. The byte of data fed to register 17 will determine which of the eight solenoid units controlled by this register will be driven.

Next, an appropriate command is issued to decoder 98 which, in turn, sends a gating signal to output register 17. At this point, whether a particular bit position in the register which is gated is either up or down will determine, as previously described, whether the particular solenoid unit is driven or not, subject of course, to whether there have been inputs from the equipment or operational environment respectively to inhibit point 214 or stop point 216. Upon the completion of the operation which selectively provides driving outputs to one or more of the solenoid units, the decoder will put forth a return pulse to the processor along the return line in the conventional manner for returns from macrofunctions. The return which is not shown in the logic with respect to this specific magnetic driver macrofunction is the same as that generally described with respect to FIG. 13. Upon receipt of this return pulse, the processor is free to go on to the next programmed operation by addressing another macrofunction.

Even though the processor communicates with another macrofunction and this magnetic driver macrofunction is no longer being addressed, the driving of the selected solenoids will continue until either the processor again addresses this macrofunction or an inhibit or stop is applied from the equipment environment.

CENTRAL PROCESSOR INSTRUCTIONS

The central processor instruction programming support for the operation of the system described in the present specification is relatively simple and straightforward, and it should be clear to anyone skilled in the programming art how the central processor may be programmed in order to sequence the various hardware units in the present system to carry out their functions which are described in the present specification. In any event, in the following portion of this specification, there will be described with reference to flow charts the programming in general in the central processor required to sequence the hardware of the system in performing its functions.

Figure 25:
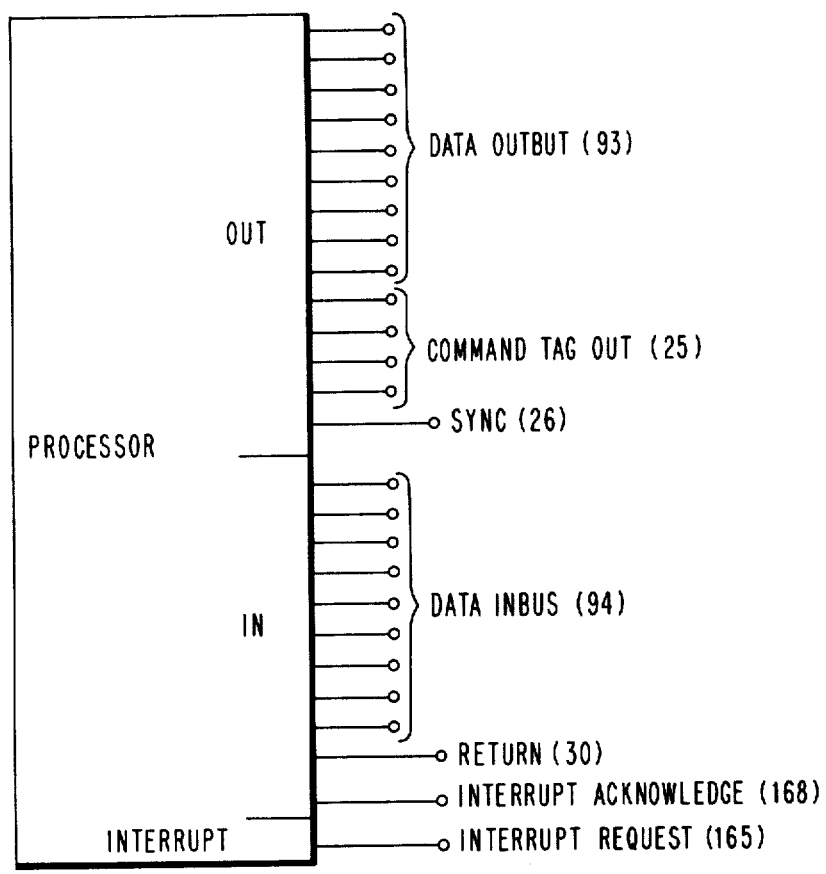
FIG. 25 is a diagrammatic view of the central processor to illustrate the connections to and from the processor of the various functional data lines or wires described in the specification.

First, with respect to FIG. 25, there is shown a generalized arrangement of a central processor showing the connection to the central processor of the twenty-six lines which make up the previously described distributed interface bus system 31. It should be noted that the arrangement wherein the four command tags or lines 25 and the sync lines 26 are part of the output 93 while the return, interrupt acknowledge and interrupt request lines are part of the in bus 94 is primarily one of convenience, and these lines could be arranged otherwise.

There follow some illustrative programming flow charts with respect to the operation of some of the previously described macrofunction cards as well as illustrative programming to illustrate some of the other general operations of the system of the present invention.

SWITCH INTEGRATOR MACROFUNCTION INSTRUCTIONS

Figure 26A:
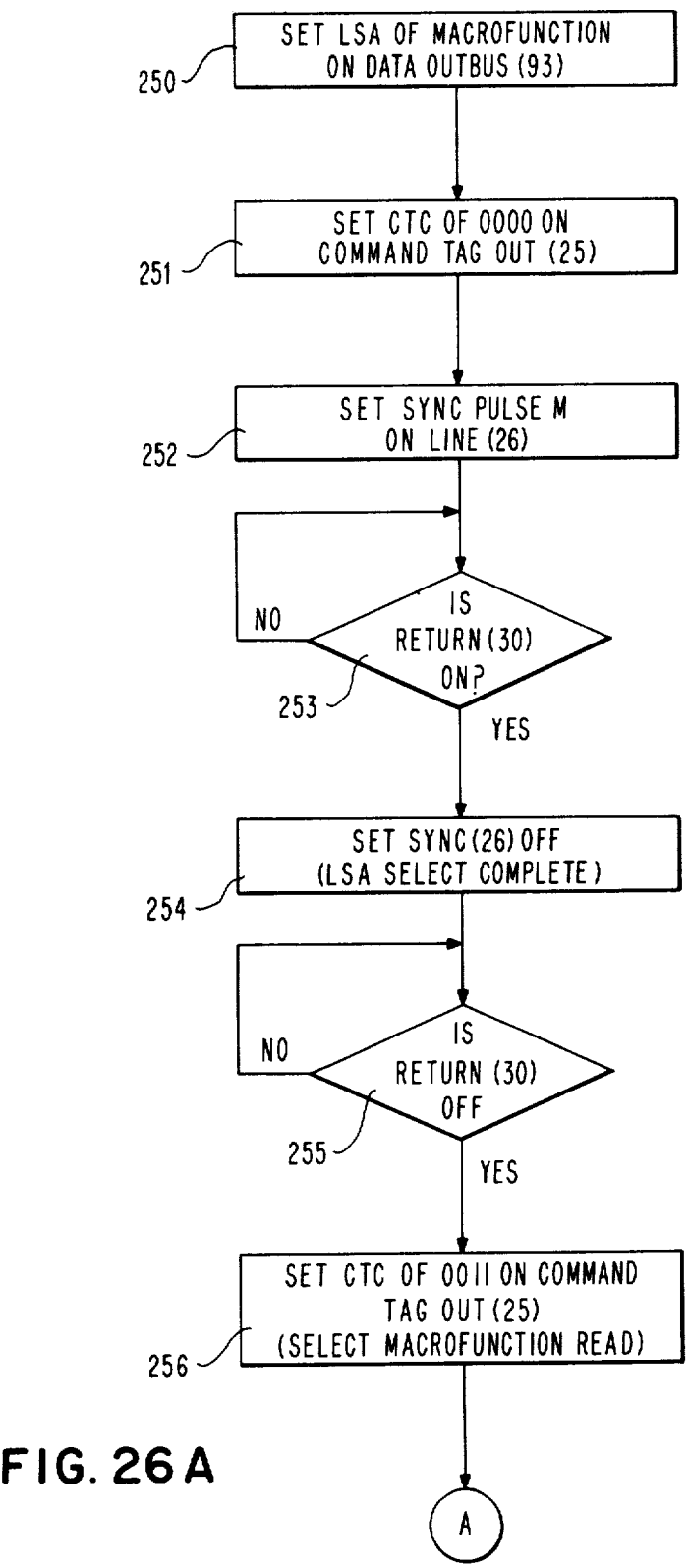
FIG. 26 is a flow chart of the central processor instructions to the eight-switch integrator macrofunction in order to assess the condition of the eight switches monitored by this macrofunction.
Figure 26B:
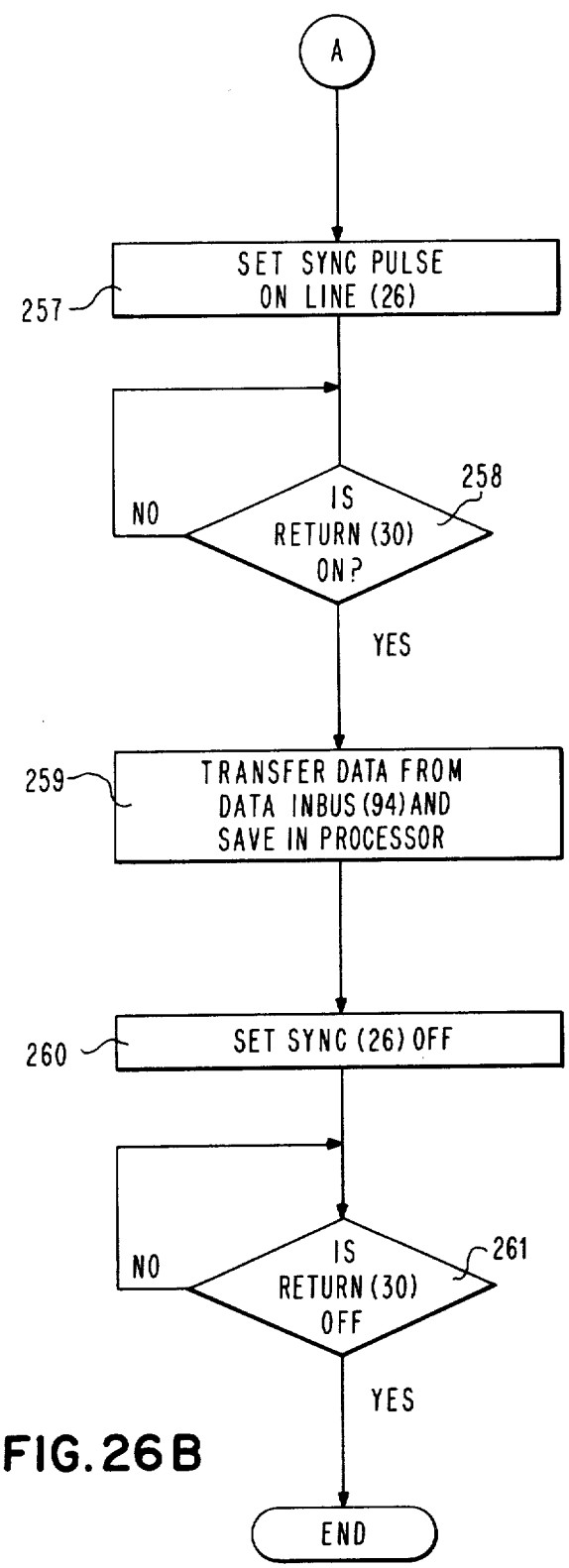

With reference to FIG. 26, in the flow chart shown, it is assumed that the processor and the system in general are now operational and it is desired to access back to the central processor the condition of the eight switches $S_0 - S_7$ (FIG. 20). First, step 215, the logical space address of the switch integrator macrofunction card being interrogated is placed on the eight data line of out bus 93, i.e., in the previously described addressing procedure the LSA is represented by $X_0 - X_7$. Then, step 251, processor sets a command tag combination of 0000 on the four wires of command bus 25. Next, as set forth in step 252, a sync pulse is applied to sync line 26. This follows the address command sequence previously described in the specification in connection with FIG. 8A. With the application of the sync pulse, block interface address hardware on each block will function as previously described with respect to FIG. 13 to compare higher order bits $X_0 - X_3$ and compare function 95, and then if the compare function is valid to decode lower order bits $X_4 - X_7$ through decoder 96 to select the macrofunction card which in the present case is the switch integrator macrofunction card shown in FIG. 20. The activation of card select line 27 from decoder 96 will, in turn, activate macrofunction card corresponding to this select line. The sequence is then looped through decision step 253 but until the central processor receives a return pulse generated by macrofunction hardware as shown in general in FIG. 13 along return line 30 which indicates that the addressing transaction has been completed.

Upon completion of the addressing procedure, the processor is programmed to turn the sync line 26 off, step 254, and the logical space address select sequence is now complete. Decision step 255 loops the sequence and prevents it from moving on to the next step until return pulse on line 30 which essentially tracks sync pulse on line 26 is off.

At this point, the "read" command tag which in the present case is 0011 is fed from the processor on bus 25, step 256. Next, step 257, the processor sets the sync pulse on line 26 and the read function proceeds in accordance with that described in the present specification, particularly in connection with FIG. 5.

Specifically, with respect to the hardware in FIG. 20, the read command tag is applied to 4/16 decoder 98 in combination with the application of the sync to the decoder on on line 26. Since the channel to the central processor 1 is locked to this switch integrator macrofunction card, card select line 27 will be on. Then, as previously described, decoder 98 will issue an appropriate command along line 122 to register 202 to receive the byte data indicative of the condition of the eight switches through data multiplexor 203; decoder 98 also sends a gating pulse along line 123 resulting in the gating of this byte of data from register 202 through gate 83 through common data bus 23 of the macrofunction which is then continuous with inbus 94, and the data is transferred from inbus 94 for storage in the central processor, step 259. At this point, as previously described, the processor turns the sync pulse 26 off, step 260, and a decision is made in decision step 261 until the return is off. When the return is off, this program routine ends and the data from the switch integrator macrofunction is now properly stored in the central processor.

ILLUSTRATIVE PROGRAMMED SEQUENCE FOR MAGNETIC DRIVER MACROFUNCTION

Figure 27B:
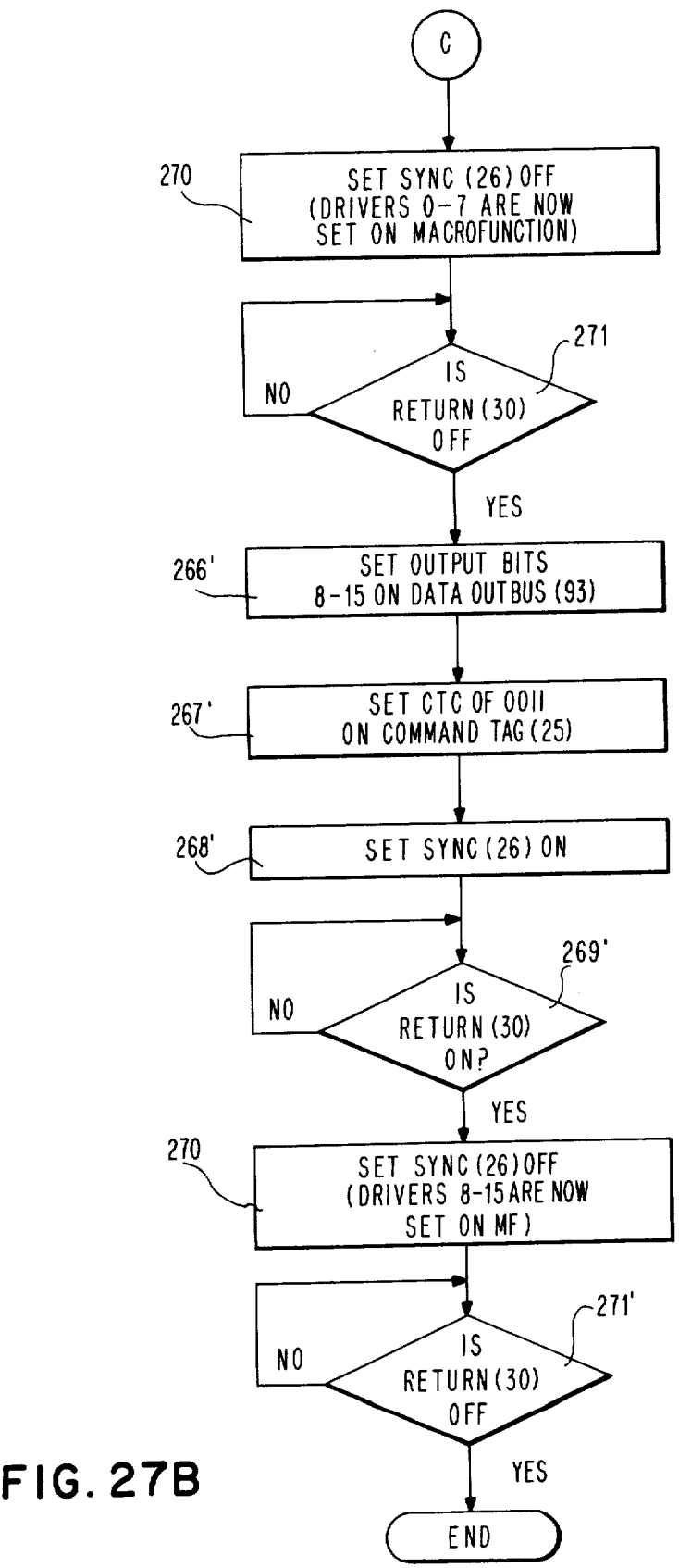
FIG. 27 is a flow chart of central processor instructions to a magent driver macrofunction in order to write a pattern of sixteen bits into the macrofunction corresponding to the driving output points of this macrofunction card.
Figure 28A:
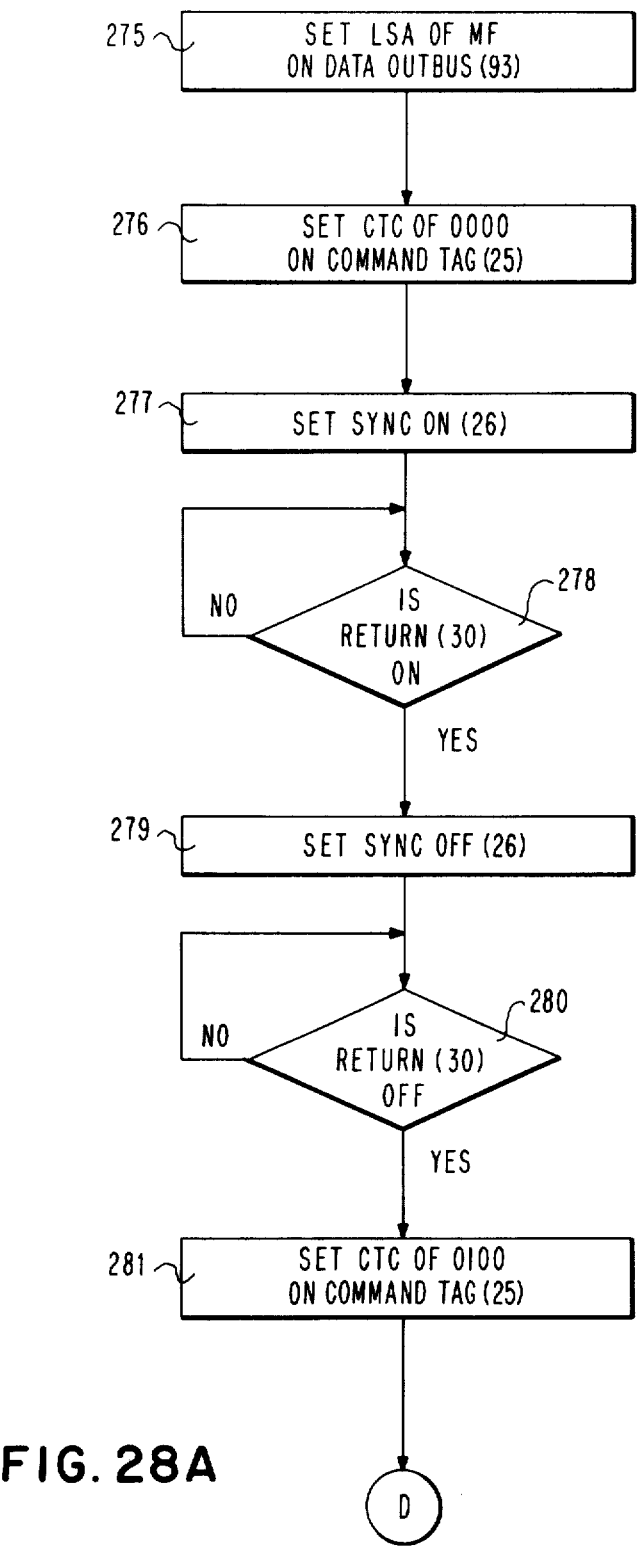
FIG. 28 is the flow chart of computer instructions to read from the magnetic driver macrofunction the condition of the driver outputs.
Figure 28B:
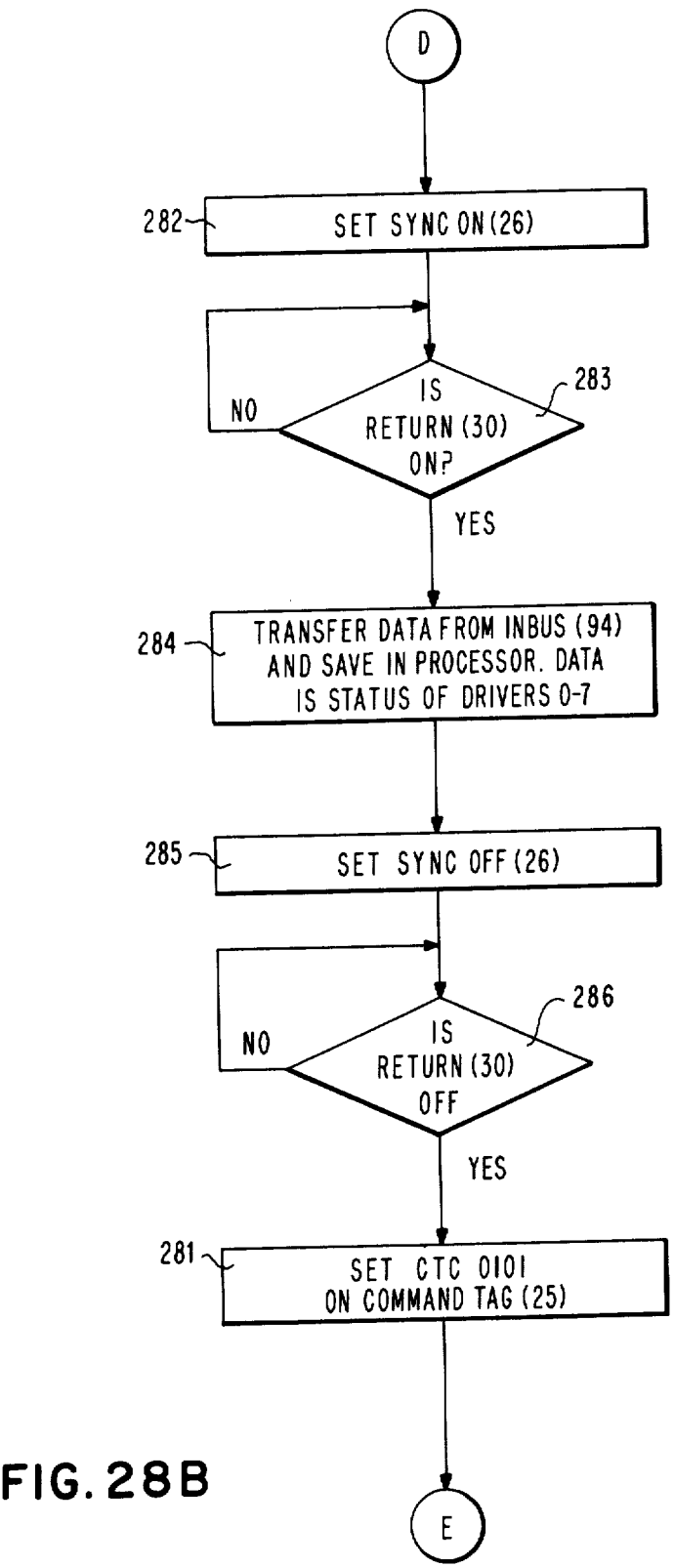
Figure 28C:
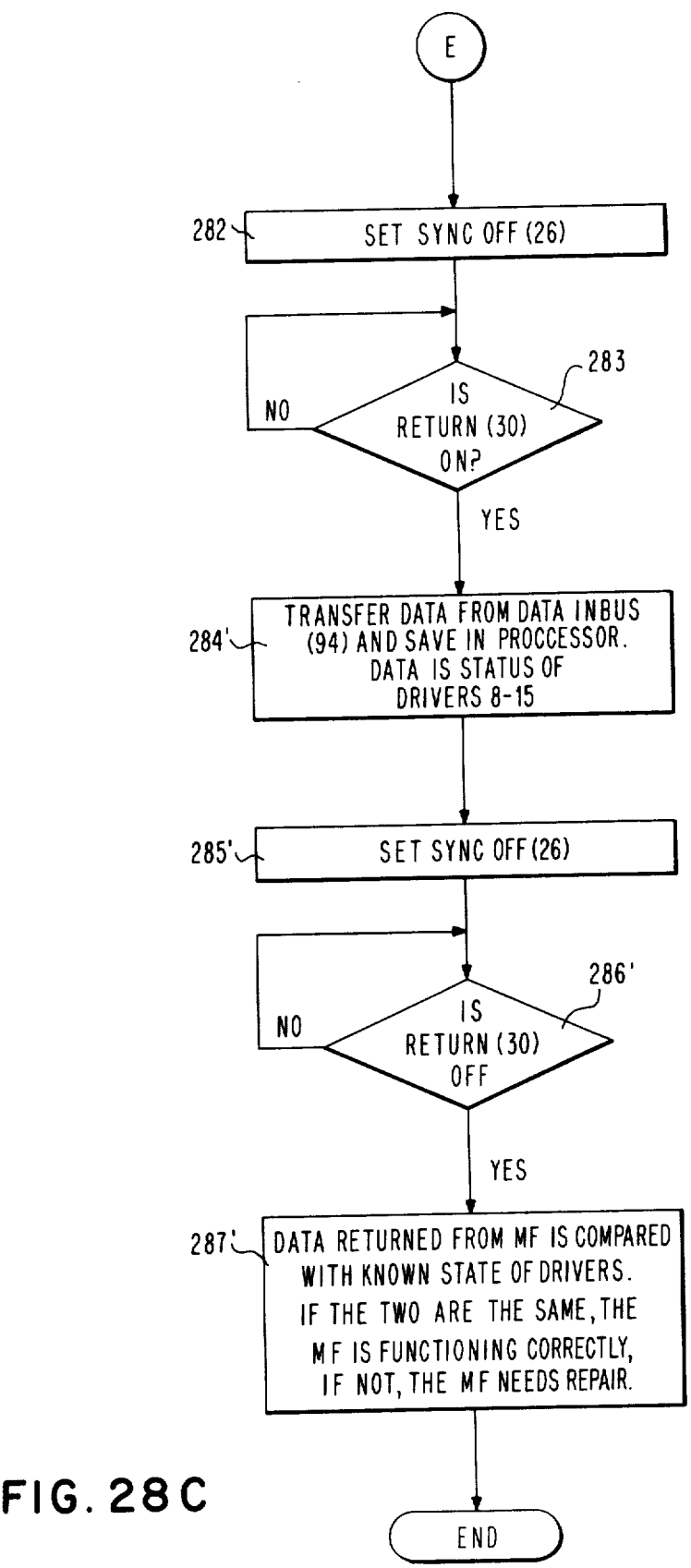

With reference to FIG. 27, there will now be described the programming sequence for writing the pattern of bits into the magnetic driver macrofunction for which the hardware is shown in FIG. 21. The addressing sequence steps 260–265 are substantially the same as that previously described with respect to the switch integrator macrofunction, FIG. 26, and will not be described in detail here.

Thus, with the channel from the central processor to the magnet driver card locked the processor will apply the byte of data (step 266) onto outbus 93. The status of each bit in this byte of data will determine whether each of eight solenoid units will be driven by an output $M_0$ to $M_7$ from the macrofunction card. Next, step 267, the command tag is applied to decoder 98 which is appropriate for writing the byte of data from the processor into eight-bit register 17 on the magnetic driver card, FIG. 21. Then, the application of the sync pulse, step 268, to the decoder 98 results in the activation of line 211 which flows the byte of data into register 17 which is an output register. Upon the completion of this operation the return line from the macrofunction card to the processor should be activated as previously described. The processor, thus, determines if the return line is on, step 269 in the manner previously described.

When the return is on, the sync pulse 26 is turned off, step 270. The operation is now completed and the status of the eight solenoid units to be driven by this portion of the macrofunction card now established with macrofunction outputs $M_0$ to $M_7$ being either active or inactive to drive their respective solenoid units dependent on the condition of the eight bits loaded into register 17 subject of course to whether an inhibit or a stop input from equipment has been applied to input points 214 and 216, respectively, as previously described in relation to the hardware.

The processor now determines, as previously described, if the return pulse is off, step 271.

It should be noted here that, as previously mentioned, while FIG. 21 illustrates an eight-bit magnet driver function, the macrofunction card utilized is most conveniently a 16-bit magnet driver, thus requiring another eight-bit register and another set of output logic associated with each of the bits in this other output register. In such a case, the second output register would have substantially the same loading sequence of that already described with respect to register 17 and this loading would follow under the control of the processor subsequent to the loading of the first register 17. Thus, upon the completion of step 271, FIG. 27, the second set of output bits for this second output register are applied to the data bus by the processor, step 266', and an appropriate command tag is applied by the processor to command bus 25, step 267', so that when this command tag and the sync pulse, step 268', are applied to decoder 98, FIG. 21, the decoder will activate an output (not shown) which in turn will activate the second output register which is not shown. The processor will then proceed with a sequence of steps 269' through 271' with respect to the second register which are the equivalent of steps 269 through 271 which were previously described with respect to the first output register 17. Upon the completion of these additional steps, sixteen bits will be loaded respectively in the two output registers, and there will be a sixteen-bit output from the magnetic driver macrofunction capable of activating up to sixteen of the corresponding solenoid units.

INSTRUCTIONS FOR READING THE MAGNETIC DRIVER MACROFUNCTION

The logical space address of the magnetic driver macrofunction is set on data outbus 93 as previously described, step 275. Then, as previously described, the address command tag is set on bus 25, step 276. The sync pulse is set on line 26, step 277, as previously described and a determination is made, step 278, as to whether a return pulse has been received indicative of the completion of the addressing operation. Then, step 279, the sync pulse is turned off and a determination is made, decision step 280, as to whether there is a return indicating that the sync pulse is off. Next, a read command tag is set on bus 25, step 281, in response to which command decoder 98 upon the application of sync line 26, step 282, activates line 60 to gate 61 which gates the levels of polarity hold register 17 indicative of bit positions 0 to 7 back to the central processor along common data bus 23. The processor then determines that the return is on, step 283, indicative of a complete transaction. When this return is indicated, the byte of data indicative of the status of driver 0 to 7 is now stored in the processor, step 284. The processor sets sync line off, step 285, which is determined by whether the return line is off, step 286. At this point, step 281', the processor applies a command tag to decoder 98 which in combination with the sync pulse, step 282', will initiate a read of the second polarity hold register indicative of the status of the other eight magnetic drive outputs. This is in the case, as previously mentioned where the macrofunction card utilized is most conveniently a sixteen-bit magnetic driver thus requiring another eight-bit polarity hold register and another set of output logic assocciated with each of the bits in this other output register. In such a case, a second output register would have substantially the same reading sequence as that already described with respect to register 17 and this reading would follow under the control of a processor subsequent to the previously described reading of this first register 17. With respect to this second eight-bit register, instructions 283' through 286' are carried out with respect to the second register and are equivalent to previously described instructions 283 through 286. In the case of such a two-register magnet driver macrofunction, it was previously mentioned with respect to FIG. 21 that gate 61 will serve as a multiplexer during the sequencing of the contents of the two polarity hold register 17 into the common data bus 23. Upon the completion of the reading of the sixteen bits in the registers, the processor will execute a compare of the sixteen-bit conditions with the known state of the solenoid or magnet drive output points $M_0$ to $M_{16}$. If the two are the same, then the macrofunction is functioning correctly. The routine ends at this point.

ILLUSTRATIVE PROGRAMMED SEQUENCE FOR THE ANALOG-TO-DIGITAL CONVERTER MACROFUNCTION

Figure 29A:
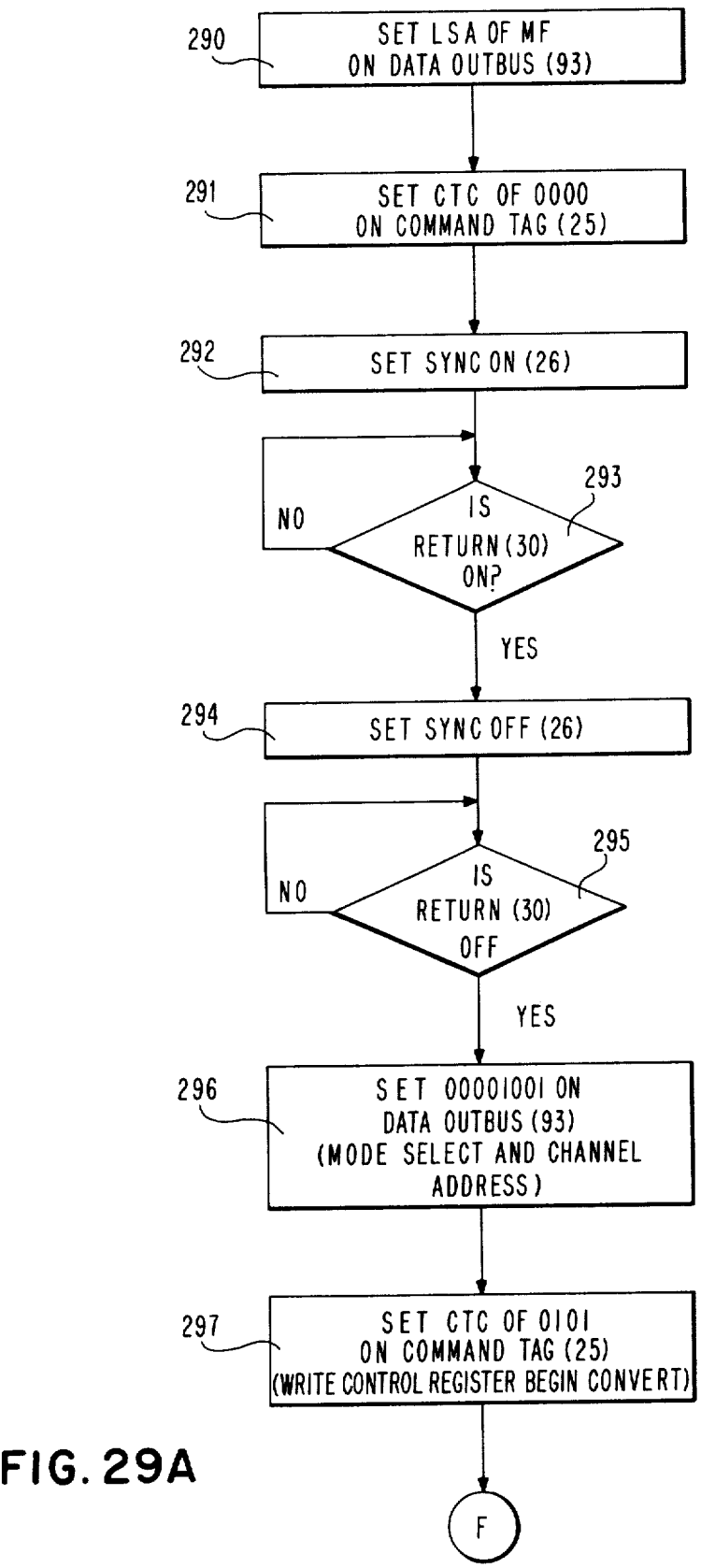
FIG. 29 is a flow chart of central processor instructions to the analog-to-digital converter macrofunction in order to read the digitized data corresponding to the condition of one of the analog channels.
Figure 29B:
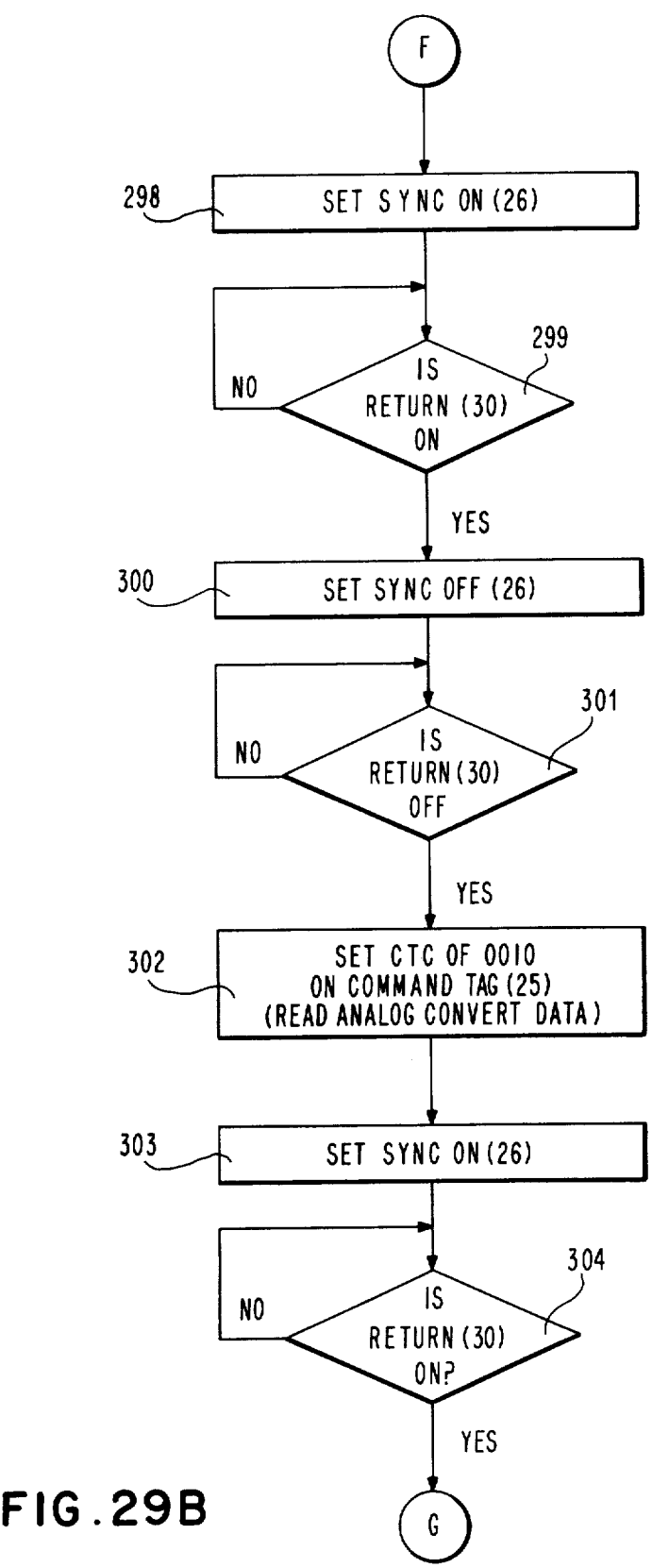
Figure 29C:
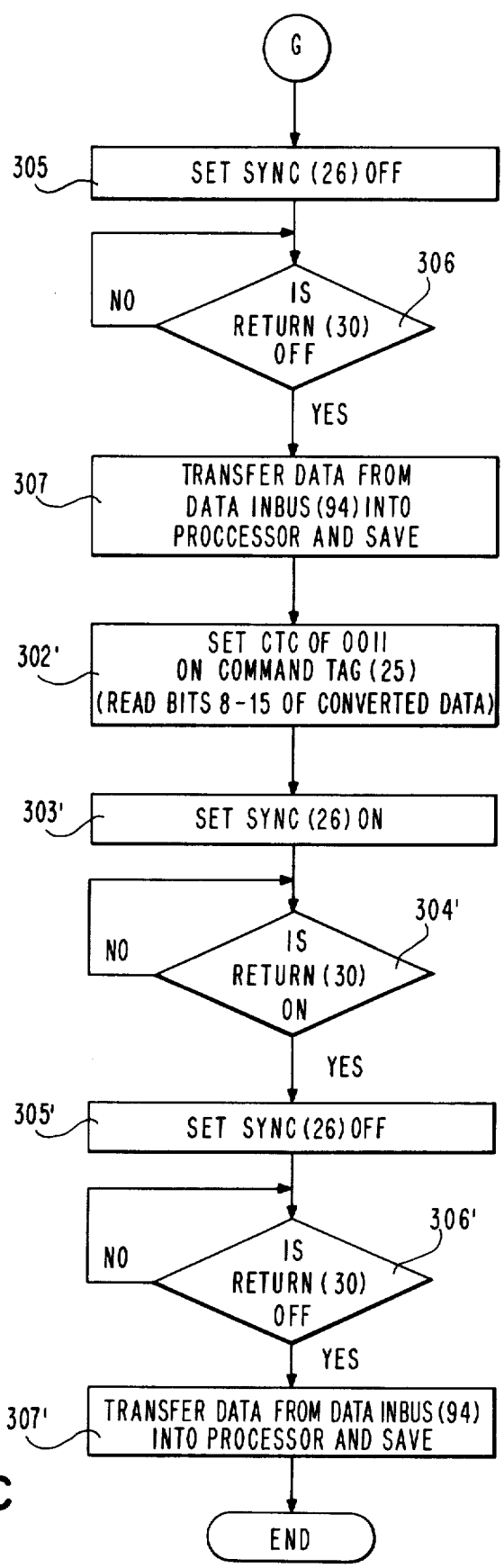

With respect to FIG. 29, there will now be described the programming sequence for reading the digitized data corresponding to the analog voltage present on one of the fifteen channels of the analog multiplexer 240, FIG. 23. For the purpose of this example, we will assume that the ninth analog channel is being read without the utilization of any interrupt procedure. The addressing sequence, steps 290-295, are substantially the same as that previously described in a flow chart of the switch integrator macrofunction; it will not be described in detail here.

Thus, with the channel from the central processor to the analog-to-digital converter macrofunction card locked, the processor will apply the byte of data, step 296, onto outbus 93. The command tag will be applied to decoder 98, step 297, when sync pulse is applied to line 26, step 298, will result in a command from the decoder on line 53 permitting control register 242 to receive and store the byte of data on outbus 93. In response to which controller 242 issues a control command along bus 243 to multiplexor 240 which in turn decodes this command to close the analog channel selected to be converted. Then, a determination is made, step 299, of the completion of this write transaction on the return line, after which sync 26 is turned off, block 300, and this is determined through the return line being off, step 301.

Next, step 302, the command tag is applied to decoder 98 which is accompanied by an application of a sync pulse, step 203, will activate the conversion of the status of the selected analog channel into twelve parallel bits of digital data which are stored in input register 51 and will gate a byte of data indicative of the first eight of said twelve bits through multiplexor 55 onto data bus 23 which is connected to inbus 94 to the central processor. The operations of the macrofunction card hardware to achieve this has been described with respect to FIG. 23 and will not be again described in detail here. In any event, the completion of this command data transaction is indicated to the processor by determining if return line 30 is on, step 304, and if yes, then the sync line 26 is turned off, step 305, and a determination is made, step 306, if the return line is off. At this point, the byte of data indicative of the first eight bits in register 51 have been transferred from the inbus 94 into the central processor and stored, step 307.

Since input register 51 stores twelve bits of data, it has been previously indicated that in reality it consists of two, eight-bit registers. Thus, after the first eight bits have been read from the first register of input register 51, the processor issues a sequence of instructions 302' through 307' which are the equivalent of the instructions 302 through 307 to transfer the remaining four bits of data from the second register of input register 51 back to the central processor wherein the twelve bits of data indicative of the status of the selected analog channel are stored.

ILLUSTRATIVE PROGRAMMED SEQUENCE FOR THE TIMER MACROFUNCTION

Figure 30A:
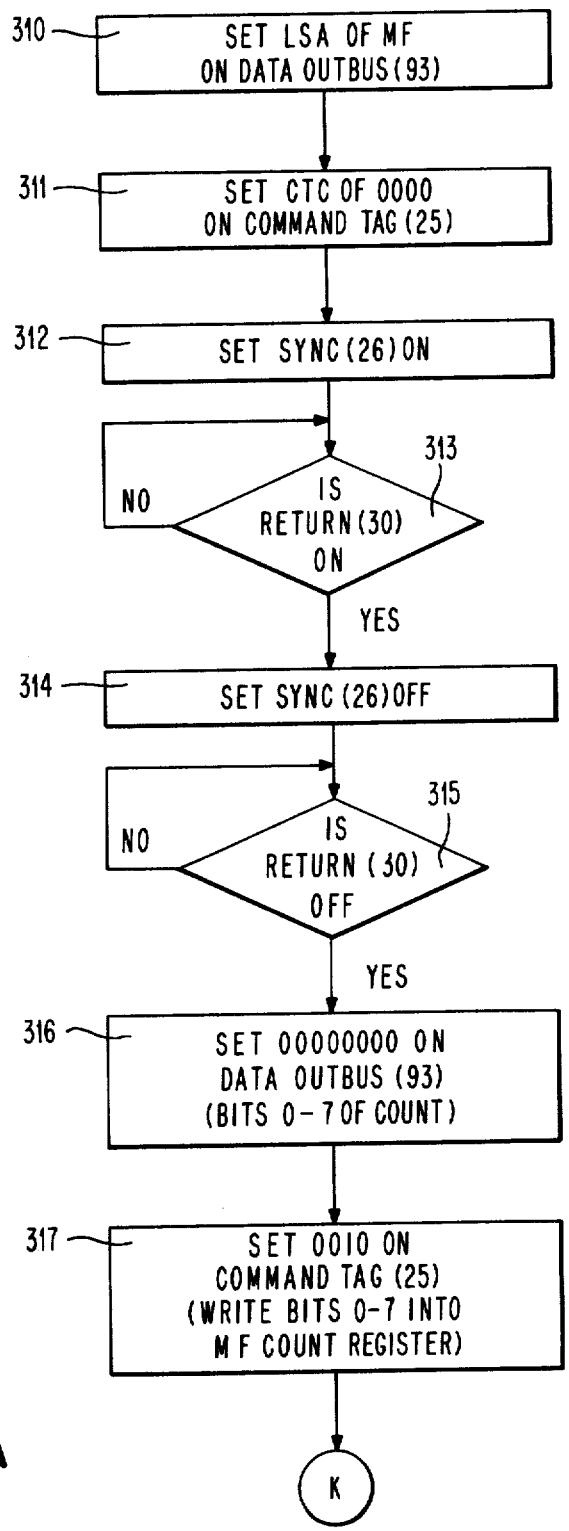
FIG. 30 is the flow chart of central processor instructions to the timer macrofunction in order to set the timer for an illustrative interval of time.
Figure 30B:
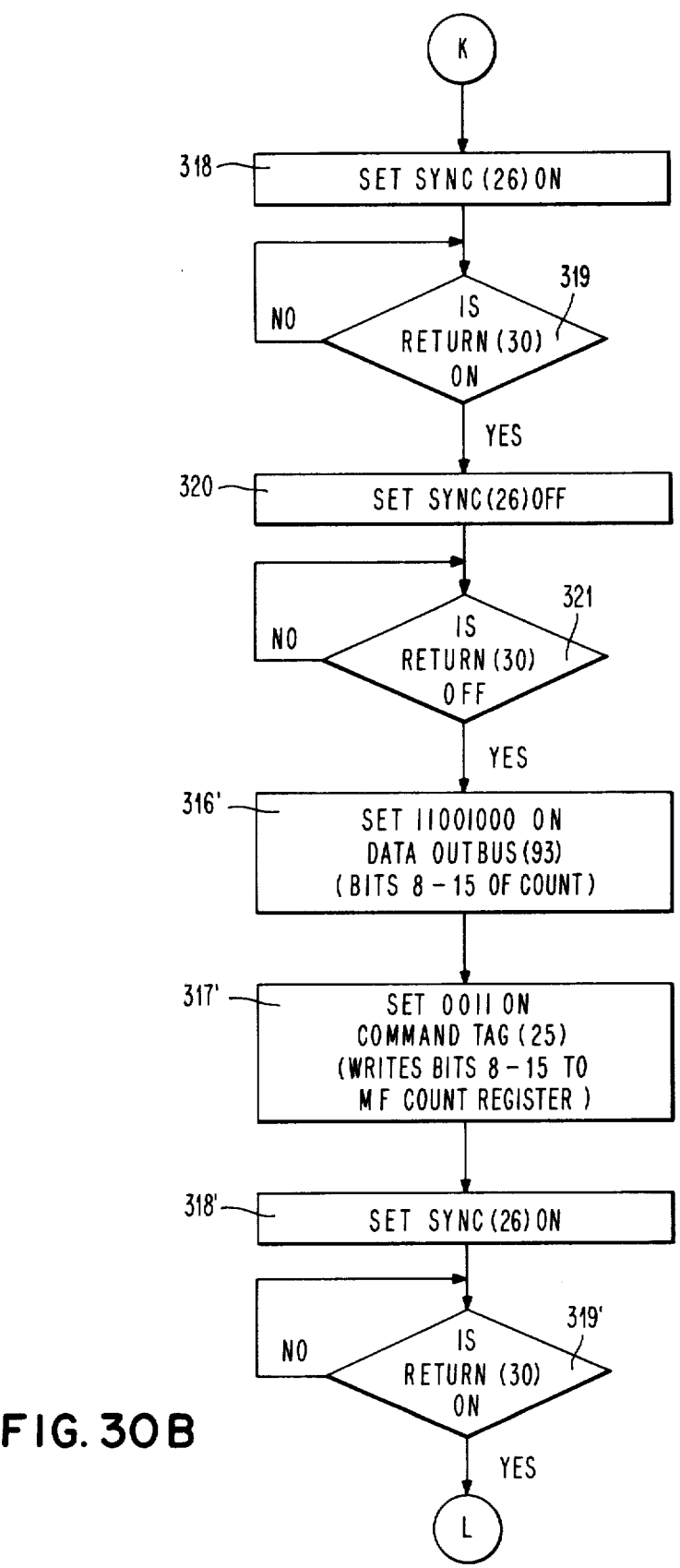
Figure 30C:
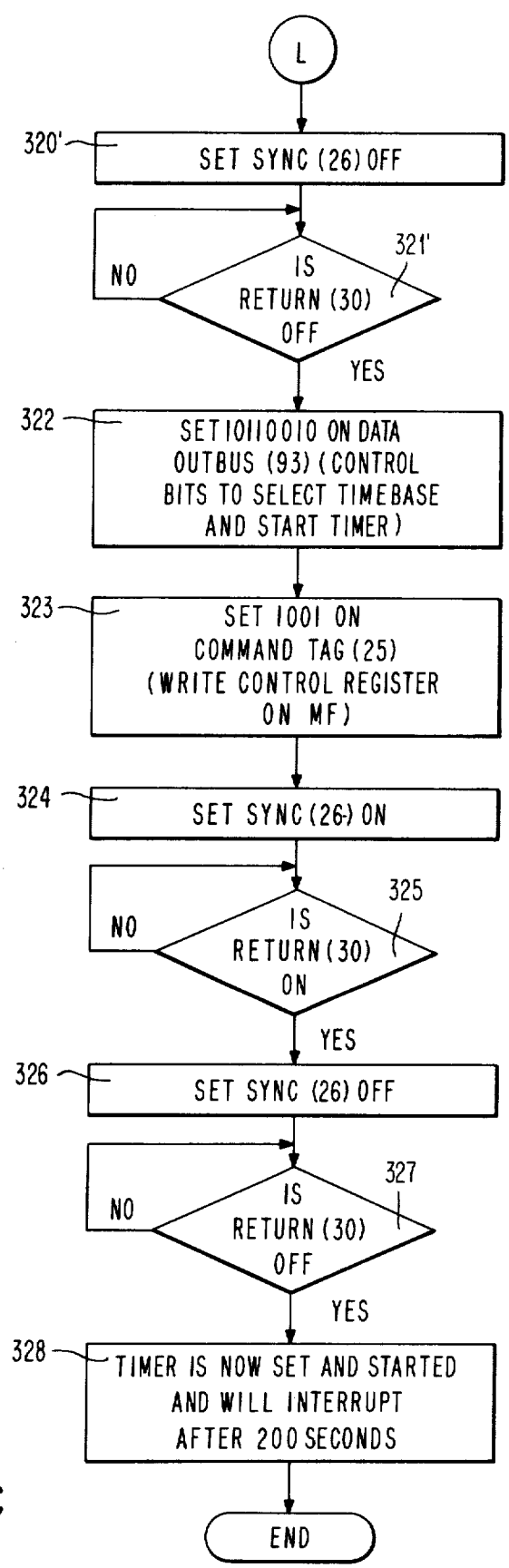

With respect to FIG. 30, there will now be described a programming sequence for the operation of the timer macrofunction card to provide a programmed time interval. The addressing sequence, steps 310-315, are substantially the same as that previously described with respect to the addressing of any of the previously described specific macrofunction; it will not be described in detail here.

Thus, with the channel from the central processor to the timer macrofunction card locked, the processor will apply the byte of data, step 316, onto outbus 93. The command tag will be applied to decoder 98, step 317, and when sync pulse is applied to line 26, step 318, a command from decoder 98 on line 222 will permit sixteen-bit control register receive and store 0 to 7 byte of data on outbut 93 applied along common data bus 23. Then, a determination is made, step 319, of the completion of the right transaction on the ready line, after which sync 26 is turned off, step 320, and this is determined through the return line being off, step 321. Next, steps 316'-321' which are substantially equivalent in operation to steps 316-321 except that the second byte of data, 8-15, is loaded into the sixteen-bit control register 221 are carried out.

Then, the processor will apply a byte of data, step 322, on outbus 93. The command tag will be applied to decoder 98, step 323, and when sync pulse is applied to line 26, step 324, a command from the decoder on line 229 will permit control register 228 which controls the timing function to receive and store the byte of data on outbus 93 via common data bus 23. Then, a determination is made, step 325, for the completion of this write transaction on the ready line, after which sync pulse 26 is turned on, step 326, and this is determined through the ready line being off, step 327. At this point, step 328, the timer macrofunction card has been initiated into a timing cycle, and the hardware in this macrofunction card will operate as previously described without any further control by the central processor to count and to interrupt after a predetermined period of time, e.g., 200 seconds.

ILLUSTRATIVE PROGRAMMED SEQUENCE FOR THE HANDLING OF INTERRUPT

With respect to FIGS. 32 and 33, there will now be described a programmed sequence for the handling of the interrupt. Let us assume that an interrupt has been applied to one of the macrofunction cards, e.g., the analog-to-digital converter card of FIG. 23. And, that this interrupt has set the interrupt request latch of the macrofunction card. We have previously stated that interrupt request latch and associated circuitry are present in all macrofunction cards selectively equipped to handle this function within the overall operation of the controller. Thus, we have not shown this circuitry on every one of the specifically illustrated macrofunction cards but have shown generalized versions of interrupt circuitry in the macrofunction of FIG. 16. Thus, let us assume that the analog-to-digital converter of FIG. 23 has such an interrupt request latch. The programmed sequence starts when this latch been set with an interrupt request.

Figure 32:
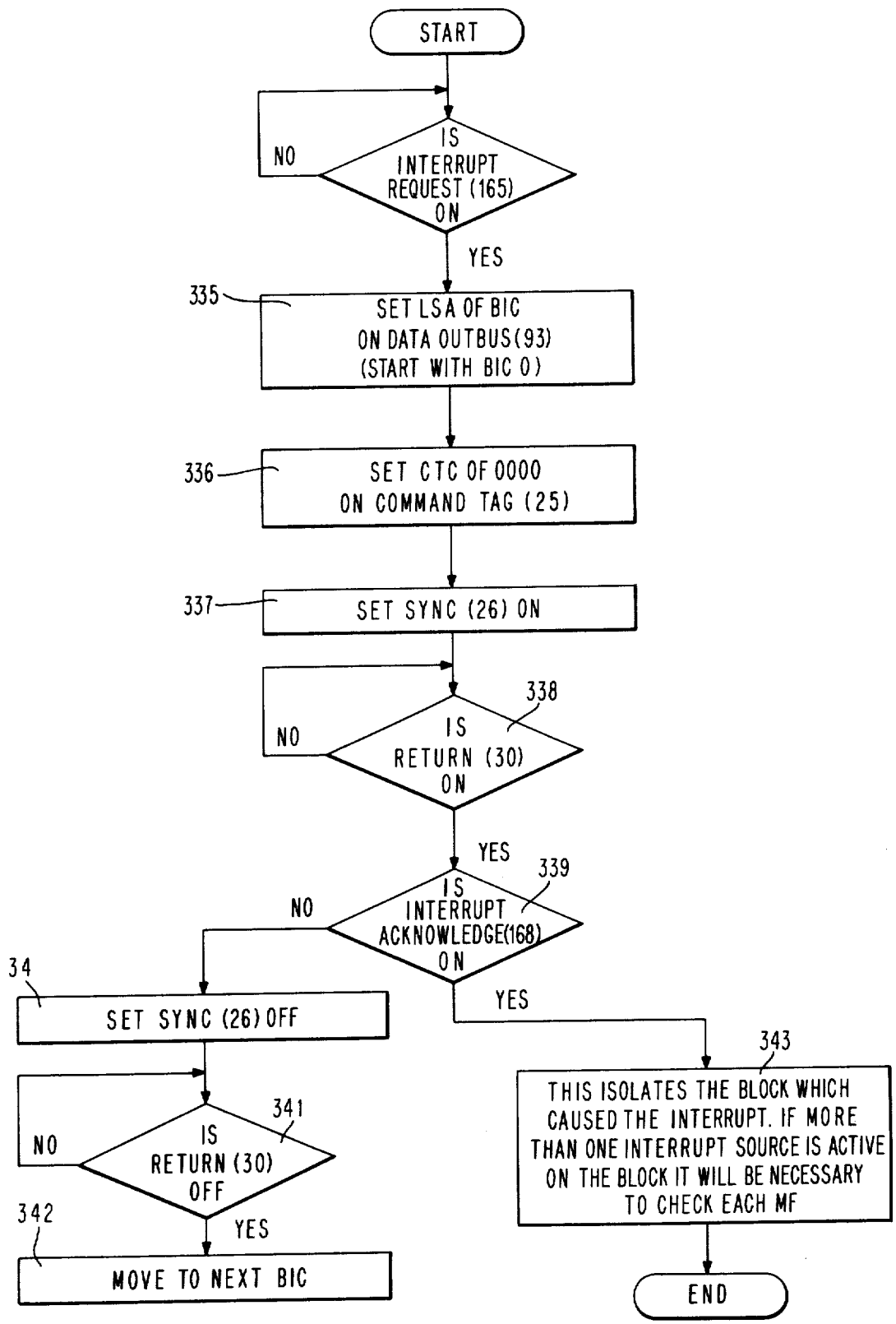
FIG. 32 is a flow chart of central processor instructions for determining the source of an interrupt state on the distributed interface.
Figure 33A:
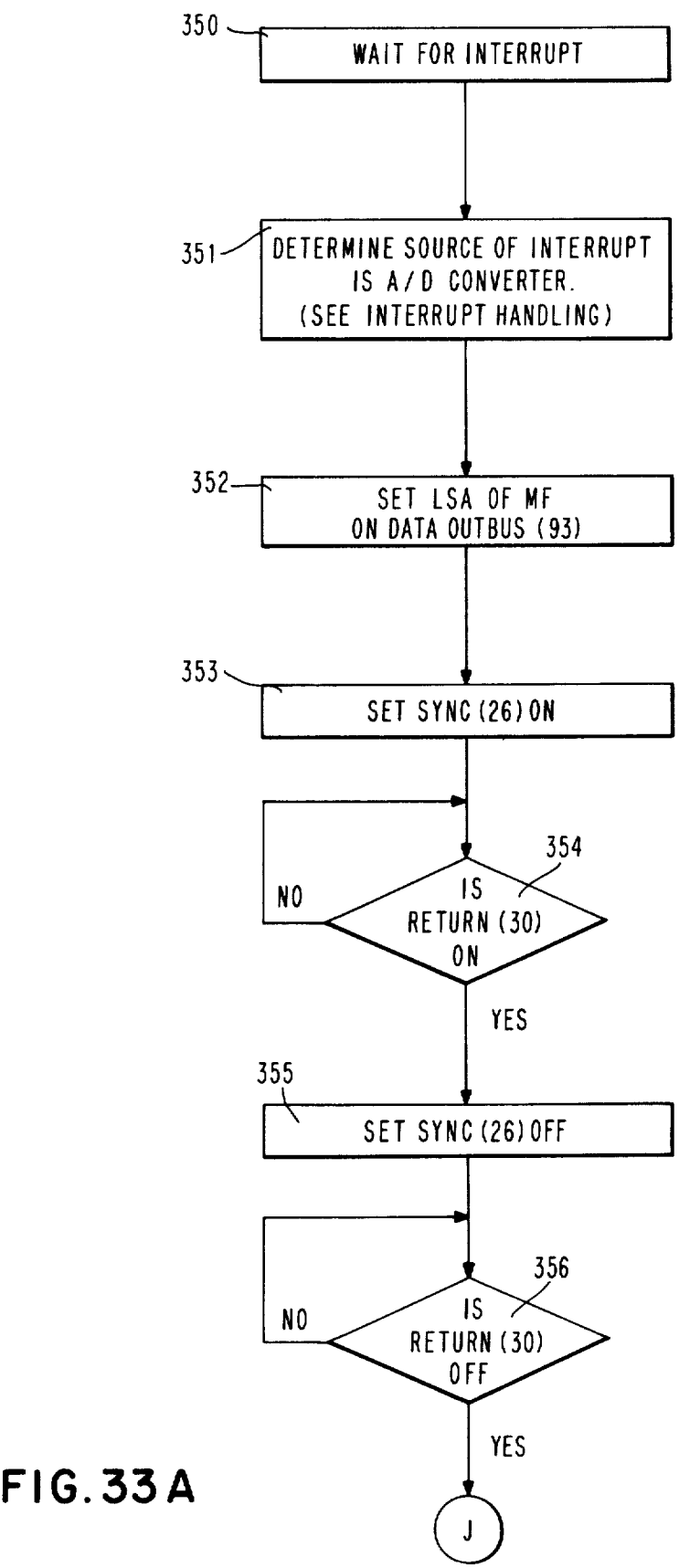
FIG. 33, consisting of 33A and 33B, is a flow chart of instructions from the central processor for determining if the source of interrupt is a particular macrofunction card which in the illustrated example shown is an analog-to-digital converter.
Figure 33:
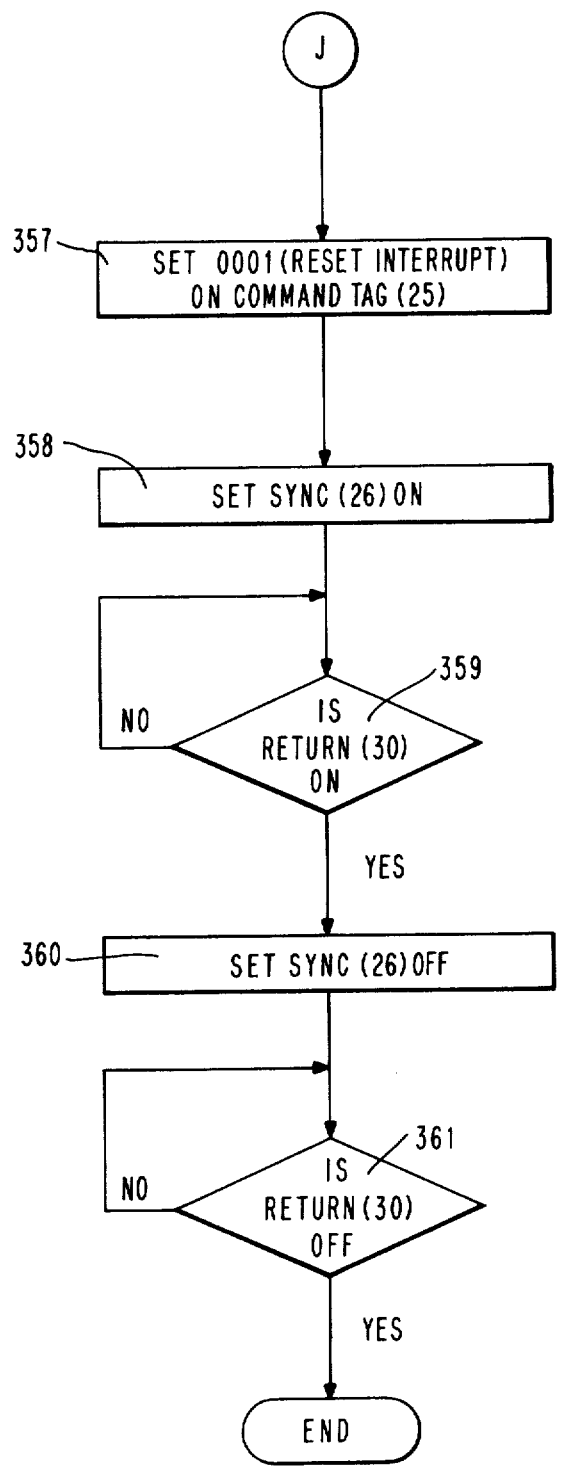

With reference to FIG. 33, when an interrupt appears, step 350, the program goes to, step 351, the interrupt handling or polling routine of FIG. 32 which will poll for an interrupt as previously described in the section under the sequencing of data headed, "Interrupt Polling". Each of the block interface cards in the system will be polled until the block interface card indicating the interrupt is found. In the present case, block interface card for the block containing the A to D macrofunction will be the block interface card eventually found to indicate the interrupt.

With reference to FIG. 32, the programming for the polling sequence is carried out as follows. The addressing sequence for each block interface, card, steps 335 - 338, are substantially the same as that previously described in many of the programming flow charts having an address function; it will not be described in detail here. With the particular block interface card to be polled for an interrupt request now properly addressed, a determination is made, decision step 339, as to whether interrupt acknowledge 168 is on. If the interrupt acknowledge is not on, then sync 26 is turned off, step 340, and this is determined by the return line being off, step 341, after which the next block interface card is addressed and the sequence resumed again, step 342. On the other hand, if the hardware as previously described with respect to FIG. 16 has issued an interrupt acknowledge along line 168 to the central processor, then a determination is made that this is the block which caused the interrupt, step 343. The output from comparator 165 will indicate which particular macrofunction card in the block initiated the interrupt.

Next, FIG. 33, the macrofunction card causing the interrupt is addressed through the conventional addressing procedures previously described, steps 352 - 356. In completing this programming cycle, FIG. 33, with reference to the hardware FIG. 16, a reset interrupt latch command, step 357, coupled with a sync pulse, step 358, to decoder 98 will reset latch 65. Then, a determination is made, step 359, of the completion of this recess transaction on return line, after which sync 26 is turned off, step 360, and this is determined through the return line being off, step 361, and the central processor has now determined the macrofunction initiating the interrupt request.

AN EXAMPLE OF A PROCEDURE FOR MACROFUNCTION DIAGNOSTICS

Figure 31:
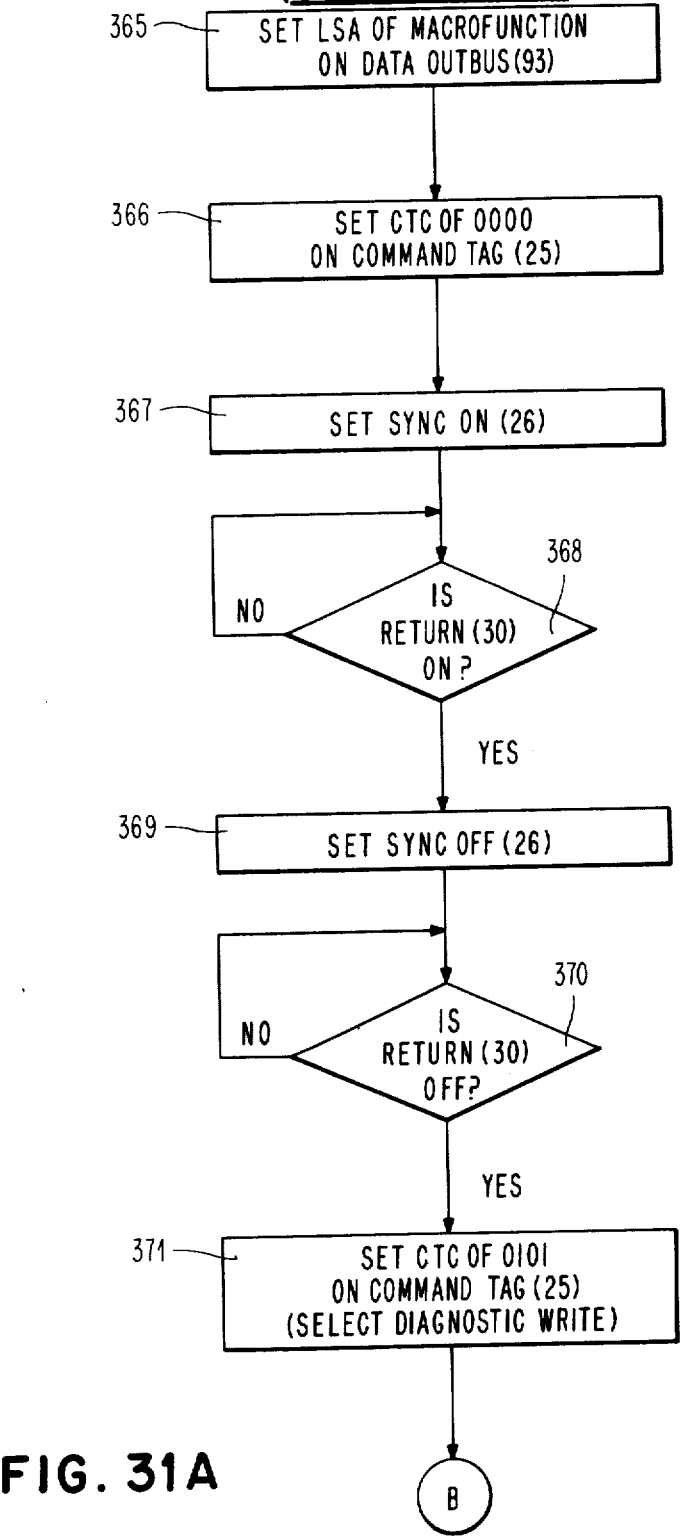
FIG. 31 is the flow chart of instructions from the central processor to the eight-switch integrator macrofunction in order to write diagnostic information into the macrofunction and to read it back to the central processor.
Figure 31B:
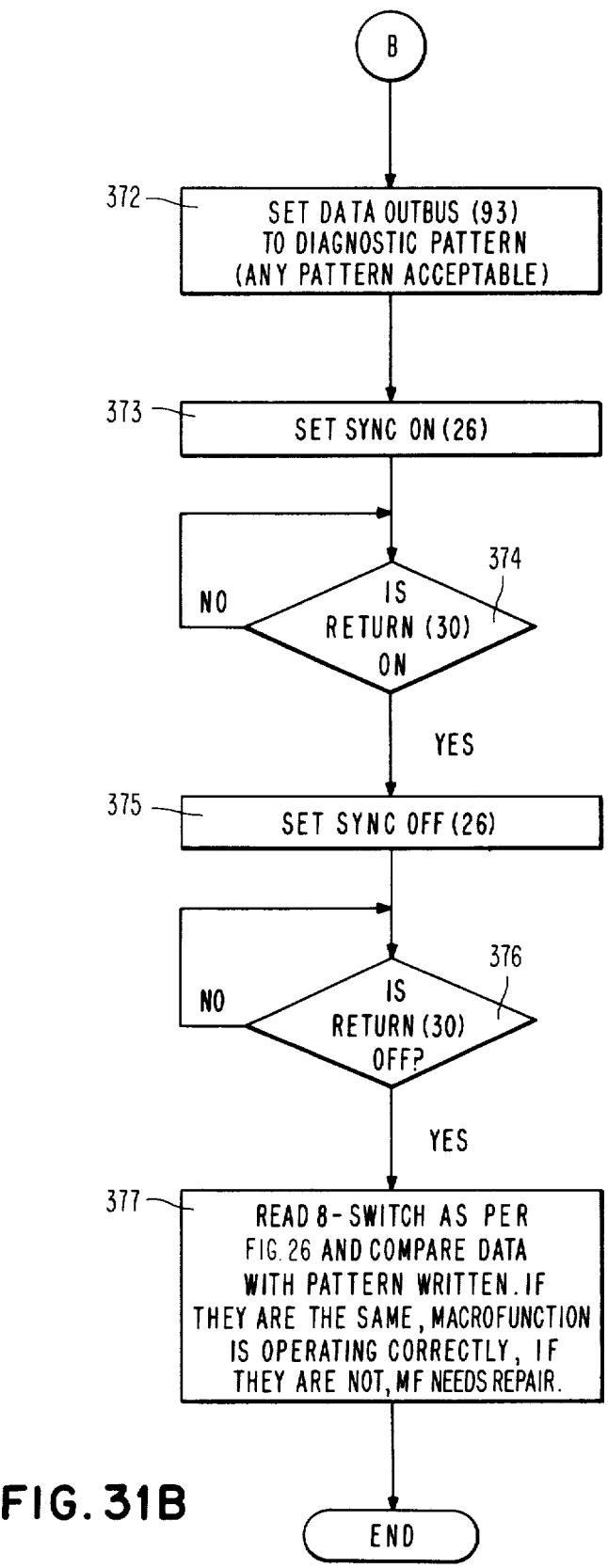

It may be desirable to periodically verify that one or more of the macrofunction cards (tool control units) is functioning properly. Also, there may be occasions when data from a particular macrofunction card back to the central processor indicates that there is a possible malfunction in the macrofunction card. For these purposes, conventional diagnostics are provided. Such diagnostics may be present in every macrofunction card. In order to illustrate how such diagnostics would typically operate, we have selected the switch integrator macrofunction card previously described in detail with respect to FIG. 20, and have in FIG. 31 set forth a typical flow chart of the central processor instructions which will exercise the switch integrator macrofunction card through a typical diagnostic operation. With reference to FIG. 31, the addressing sequence, steps 365 – 370, is substantially the same as those previously described for addressing a particular macrofunction card, e.g., as previously described in addressing the switch integrator macrofunction card in flow chart 26.

With the particular eight-switch integrator macrofunction card now addressed, a command tag is applied via bus 25 to decoder 98, step 371, which will result in the activation of a control line from decoder 98 to data multiplexor 203 causing multiplexor 203 to receive from line 204 an eight-bit diagnostic pattern which the processor applies to outbus 93, step 372, and which has been applied to the macrofunction via common data bus 23. In order to complete this write transaction into multiplexor 203, sync line 26 to decoder 98 must be on, step 373. Then, a determination is made, step 374, of the completion of this write transaction on the return line, after which sync 26 is turned off, step 375, and this is determined through the return line being off, step 376.

Then, in order to read the test pattern just written into data multiplexor 203 back to the central processor, step 377, an appropriate command is applied to decoder 98 which activates line 209 to have diagnostic logic 208 activate, in turn, line 120, causing data multiplexor to apply the written set eight-bit test pattern to input buffer register 202 and from here on the sequencing is essentially the same as that described previously for the read procedure of an eight-switch integrator macrofunction with respect to FIGS. 26 and 20. Since the purpose of this is to exercise the hardware in the macrofunction card, the central processor compares the read pattern with the pattern written into the macrofunction card, and if the two are the same then the macrofunction is operating correctly.

PHOTOCOUPLING MEANS FOR ELECTRICAL ISOLATION

FIG. 7 illustrates the data distribution paths 31 which links the central processor 1 to the distributed array of machine tools 13 via the toll controller blocks 14. The very nature of the distributed interface lends itself to the control and monitoring of a plurality of independent and physically separated machine tools. In such a system, careful consideration of interconnection should be given so as to prevent the inadvertent generation of ground loops.

The subsector distribution board 71 provides optical isolation by photocoupling means on all signal lines being coupled and distributed from bus 31 to the respective blocks 14. The optical isolation provides the means of preventing ground loops from existing between the independent machine tools and the central processor. Fault currents which might occur on the ground systems are prevented from traveling between each independent ground system on wires (signal) which are not designed to carry such duty. Each machine tool as well as the processor will normally be tied to a common ground system through earth ground which provides a zero reference point for the control common in each machine tool and processor cabinet. Electrical potential differences will often exist between the control commons of each macnine tool and the processor as a result of high energy transients created by power system ground currents. High frequency switching and control circuits within the machine tool as well as externally generated disturbances in the ground system often result in creating these energy transients. By isolating the signal paths between the independent machine tools and between such tools and processor, ground loops are minimized, reducing secondary current return and discharge paths, thus minimizing non-common mode signal conditions from existing within each tool. This, in turn, will reduce the effects associated with ground loops and fault currents upon digital and linear circuitry existing with the tool controllers and processor.

Figure 24:
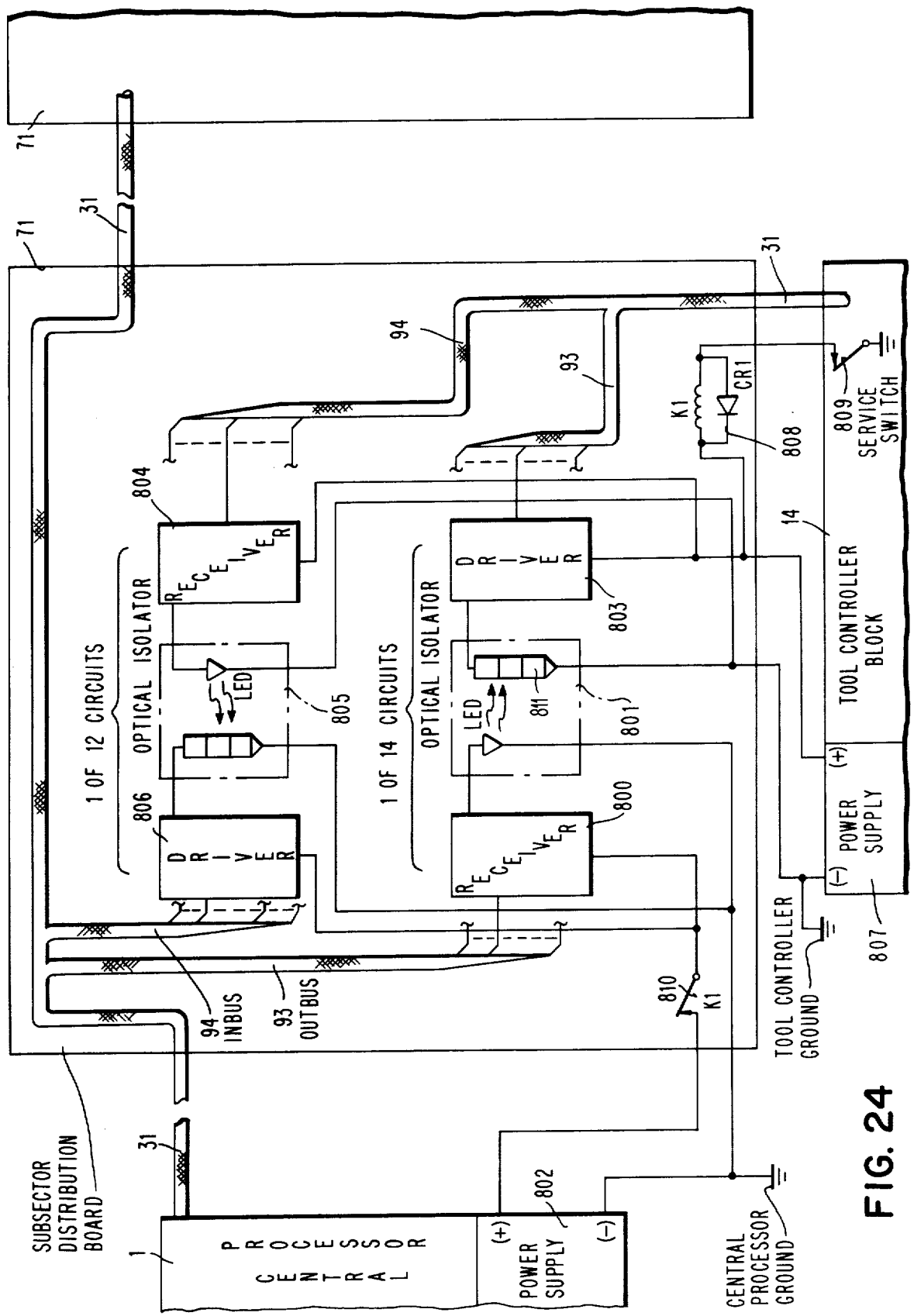
FIG. 24 is a logic diagram illustrating the photo-coupling means for electrical isolation of the tool control units from each other from the central processor.

FIG. 24 illustrates the method of implementing optical isolation within the distributed interface bus system 31. Digital output signals generated by the central processor 1 on each of the 14 signal lines on outbus 93 are sampled and signal conditioned on the subsector distribution board 71 by isolation receiver 800. The amplified output of receiver 800 is applied to the L.E.D. (Light Emitting Diode) input of optical isolator 801, thus providing a forward biased condition across the L.E.D. and allowing current to flow from the Vec source within the receiver 800 through the L.E.D. and back to the power supply 802 ground of the central processor 1. This will result within current isolator 801 in the emission of light which, in turn, will be detected by the optical isolator photodetector transistor 811. Activation of the optical isolator detector output will be sensed and amplified through driver 803 and provide a driving logic level to power the respective outbus signal line on the tool controller block 14. It should be noted that the detector side of the optical isolator 801 and amplifier/driver 803 are powered from the tool controller power supply 807. In this manner, ground paths between the central processor power supply 802 and the tool controller power supply 807 are eliminated.

On the other hand, digital input signals generated by the tool controller block 14 are applied to the 12 lines of inbus 94 of distributed interface bus 31, enter the subsector distribution board 71 and are applied to their respective one of twelve receivers 804. Transformation of the data through optical isolator 805 and driver 806 is accomplished in the same manner as described for digital output signals. Optical isolators 801 and 805 may conveniently be implemented using the electro-optical devices described in U.S. Pat. No. 3,417,249.

One additional feature is provided on block distribution board 71. In order to prevent inadvertent signals and disturbances from being coupled onto the distributed interface bus 31, to the central processor, during servicing (maintenance) of any particular tool controller block 14, along the channel, a service disconnect relay 808 is provided. During servicing operations of tool controller block 14, service switch 809 is opened, removing activating current from the service disconnect relay winding 808, causing the service disconnect relay contacts 810 to open. Relay contacts 810 opening results in breaking the power supply path of the central processor power supply 802 to the optical isolators, drivers and receivers on subsector distribution board 71. Thus, during servicing, total isolation exists between the central processor 1 and tool controller block 14. Communication between the central processor 1 and other tool controller blocks 14 along the channel which are not being serviced will be unaffected.

INTERCHANGEABLE TOOL CONTROL UNITS

With reference to FIG. 6, therer has been previously described an overall arrangement of a tool controller block. A major advantage of the tool controller block structure shown in FIG. 6 is the interchangeability of macrofunction cards 16 (tool control unit). The tool controller block housing is the same for all of the tool controller units. It comprises the base called the block or board 80 which contains a pair of cable sockets adapted to receive outbus 93 and inbus 94 which together make up distributed interface bus system 31 which is the main bus system to the central processor. Board 80 is prewired to furnish the standardized internal wiring which will provide all of the bus interconnections shown in FIG. 13 with respect to block interface card 28 for addressing purposes and to each of the interchangeable macrofunction positions into which the tool controllers or macrofunction cards 16 are plugged. The prewiring in board 80 thus provides the data bus 23, command bus 25 as well as sync and return wire connection points. In the structure shown in FIG. 6 where there are up to fifteen macrofunction cards 16 plugged into the board, the internal wiring within board 80 is identical so that these macrofunctions may be interchanged or substituted for. Block interface card 28 preferably occupies first position in board 80 in each of the controller blocks and is substantially identical in each of such controller blocks. Thus, block interface card 28 in combinatin with prewired baseboard 80 make up the housing of the tool controller block into which up to fifteen macrofunction cards performing various tool control and tool monitoring logical functions may be interchangeably plugged.

Along the input/output path provided by the main data bus 31 to and from the central processor to the tool controller, unconditioned digital data from the central processor is passed (outbus 93) to the tool controller from the central processor and unconditioned digital data is received (along inbus 94) by the central processor. The selection and distribution of such unconditioned data to and from particular macrofunctions or tool control units 16 in the tool controller block is determined by standardized block interface card 28 as previously described. The tool controller block provides to the machine tool being controlled along lines 81 data conditioned to control particular tool functions. This conditioned data may be digital or analog data. Similarly, the tool controller block receives from the controlled machine tool, also along some of the lines 81. Machine conditioned data usually from some form of sensing device indicative of a particular machine condition. The macrofunction cards or tool control units 16 in the tool controller block function to condition the unconditioned digital data received from the central processor to a form which is machine applicable and, similarly to convert the conditioned data received from the machine tool along lines 81 to an unconditioned digital data form applicable to the central processor. Since the block housing comprising the block interface card 28 and the prewired substrate or mother board 80 are standardized to all tool controllers, the nature of data conditioning that will be carried out may be determined and varied by selectively plugging any combination of a wide variety of macrofunction cards or tool control units 16 into the fifteen interchangeable positions shown in the tool controller block of FIG. 6. Many of these potential macrofunction structures 16 have been specifically described previously in the specification and many others have been mentioned generally. However, it must be emphasized that by electing an appropriate combination of the variety of macrofunction cards 16 available, the user of the tool controller block may readily tailor his tool controller block to a desired data conditioning operation.

Macrofunction cards 16 may vary in size dependent upon the logic required on a particular card. For example, in FIG. 6 the first group of cards 16 are each four units wide while the second group of cards, e.g., card 16, board 80 are two units wide. The cards may be attached to Board 80 by any convenient means. In the structure shown, the board 80 at each card position contains a repeatable arrangement of connector pins in four groups corresponding to each of the four units in width. The cards contain sockets mating with these pins. Each of the lines previously described for communication on and off the macrofunction card is connected through one of these pin and socket arrangements. Likewise, communication on and off the distribution board 80 is also accomplished through bus 31 as well as lines 81 being attached to board 80 through a similar pin and socket arrangement. In addition, board 80 will provide wiring paths necessary to interconnect outputs on any particular macrofunction card to inputs on a different macrofunction card. In such a case, communication to and from the tool controller board 80 will aldo be through the described pin and socket arrangement.

The conditioned digital data provided to and from the machine tool by the tool controller may be digital data or it may be analog data. A specific macrofunction card, FIG. 23, for analog-to-digital conversion has been described in detail to typify an analog-to-digital conversion necessary to transform analog data received from the machine tool to the digital form required for communication with the central processor. Likewise, if the machine tool requires an analog input, suitable digital-to-analog conversion may be carried out on one of the macrofunction cards using conventional digital-to-analog circuitry to meet the required analog specifications.

While in particular embodiments of the present invention, multichannel main buses and unit buses have been shown and data transmitted in parallel over such buses, it should be noted that the present invention should be applicable to bus systems which involve the serial transmission of bytes or sub-bytes of data over single channels. For example, the art conventionally uses single channels for transmission of data over long distances. Thus, if the tool controller is so remote from the central processor that data must be transmitted over distances of miles, then the main data bus may be connected to a parallel-to-serial converter and the data transmitted serially followed by a serial-to-parallel conversion prior to connection to the tool controller.

While the invention has been particularly shown and described with reference to the preferred embodiments thereof, it will be understood by those skilled in the art that various changes in form and details may be made therein without departing from the spirit and scope of the invention.

What is claimed is:

1. A system for controlling a plurality of machine tools comprising
  a central processor,
  a plurality of tool controllers each operatively associated with a machine tool,
    each of said controllers comprising at least one tool control unit, adapted to provide a data output to the associated machine tool for controlling a tool function and/or for receiving from said tool, a data input indicative of a tool condition,
  a main multiple channel data bus connected to said central processor for conducting data transactions by transferring parallel bits of digital data to and from the processor,
  a plurality of multiple channel unit data buses,
    each of said buses being connected to one of said tool control units,
  data distribution means coupling said unit data buses to said main data bus comprising
    means responsive to a set of distribution signals from said central processor for selectively activating one of said tool control units and for selectively activating only the data path from said main bus through the unit data bus connected to said selected control unit, and
    means for maintaining only said activated data path open through said main data bus to said central processor and maintaining all other data paths through unit data buses to unselected tool control units closed until the central processor issues the next set of distribution signals for selectively activating another tool control unit.

2. The system of claim 1 wherein said data distribution means include means for maintaining only said activated path open during a plurality of separate completed data transactions between the central processor and the selected tool control unit.

3. The system of claim 1 wherein said data distribution means include means for maintaining only said activated path open after the completion of a data transaction between the central processor and the selected tool unit and while the central processor completes data processing operations unrelated to said system.

4. The system of claim 3 wherein said data distribution means maintain only said activated path open after the completion by the central processor of said unrelated operations whereby said processor may conduct a subsequent data transaction with said selected tool control unit.

5. The system of claim 1 wherein said means for selectively activating one of said tool control units include
  a plurality comparing means, each respectively corresponding to and operatively associated with one of said controllers and each comparing means comprising
    means for receiving at least a portion of said set of distribution signals and for comparing said portion with a predetermined set of signals indicative of the selection of a tool control unit in the controller associated with said comprising means, and
    means for generating a compare signal when the sets compare, and
  a plurality of decoder means, each respectively corresponding to and operatively associated with one of said controllers, and each comprising
    means responsive to said compare signal for receiving and decoding at least a portion of said of distribution signals and activating a decoder output exclusive for only said selected tool control unit
  and wherein each of said tool control units includes means responsive to said exclusive decoder output for activating only the selected tool control unit.

6. The system of claim 5 wherein said means for maintaining only said activated data path open include bistable means, each respectively corresponding to and operatively associated with one of said controllers,
  and each bistable means responsive to said compare signal to maintain said activated decoder output and responsive to the absence of a compare signal to maintain in activated decoder outputs until the next set of distribution signals from the processor.

7. The system of claim 1 wherein at least one pair of controllers is operatively associated with the same machine tool.

8. The system of claim 1 wherein at least one of said tool controllers comprises means for completing a tool function initiated by a data transaction from the central processor after the data transaction is completed and the processor is no longer in communication with the tool controller.

9. The system of claim 3 wherein at least one of said tool controllers comprises means for completing a tool function initiated by a data transaction from the central processor after the data transaction is completed and the processor is no longer in communication with the tool controller.

10. The system of claim 8 wherein said tool controller further includes means for stopping the controlled tool function upon receiving from the tool a data input indicative of a preselected tool condition.

11. The system of claim 9 wherein said tool controller further includes means for stopping the controlled tool function upon receiving from the tool a data input indicative of a preselected tool condition.

12. A system for controlling a plurality of machine tools comprising
  a central processor,
  a plurality of tool controllers each operatively associated with a machine tool,
    each of said controllers comprising at least one tool control unit, adapted to provide a data output to the associated machine tool for controlling a tool function and/or for receiving from said tool, a data input indicative of a tool condition,
  a main data bus connected to said central processor for conducting data transactions by transferring bits of digital data to and from the processor,
  a plurality of unit data buses,
    each of said buses being connected to one of said tool control units,
  data distribution means coupling said unit data buses to said main data bus comprising means responsive to a set of distribution signals from said central processor for selectively activating one of said tool control units and for selectively activating only the data path from said main bus through the unit data bus connected to said selected control unit, and means for maintaining only said activated data path open through said main data bus to said central processor and maintaining all other data paths through unit data buses to unselected tool control units closed until the central processor issues the next set of distribution signals for selectively activating another tool control unit.

13. Apparatus interfacing between a central processor and a plurality of tool functions for receiving unconditioned digital data from and applying unconditioned digital data to said central processor and for applying application conditioned data correlated to unconditioned digital data to and receiving such conditioned digital data from machine tools comprising a housing, a main bus system having a plurality of channels connected to said central processor, means in said housing for receiving said main bus system, a plurality of unit buses in said housing, each unit bus having a plurality of channels corresponding to said plurality of channels in said main bus system, distribution means in said housing responsive to distribution signals from said processor for selectively actively coupling only one of said plurality of unit buses to said main bus whereby a single active path is provided to and from the central processor through said selected unit bus and said main bus, a plurality of tool control units detachably mounted in said housing, each tool control unit being adapted to receive unconditioned digital data originating from central processor and for providing application conditioned data correlated to said unconditioned data and/or to receive application conditioned data originating in said machine tool and for providing unconditioned digital data correlated to said received application conditioned data, a plurality of receiving means in said housing, each adapted to detachably and interchangeably receive one of said plurality of tool control units and to connect a different one of said unit buses respectively to each of said received tool control units whereby a selected tool control unit may be connected to the central processor by actively coupling to said mainbus the unit bus connected to the selected control unit.

14. The apparatus of claim 13 wherein said housing has means for maintaining only said active coupling between said selected unit bus and said main bus and for maintaining all other possible couplings between nonselected unit buses and said main bus inactive until said central processor issues the next set of distribution signals for selecting another unit data bus.

15. The apparatus of claim 14 wherein said means for maintaining said active coupling are adapted to maintain only said active coupling during a plurality of separate completed data transactions between the central processor and said selected tool control unit.

16. The apparatus of claim 14 wherein said means for maintaining said active coupling are adapted to maintain said active coupling after the completion of a data transaction between the central processor and the selected tool unit and while the central processor completes data processing operation unrelated to any of said tool functions.

17. A system for controlling a plurality of machine tools comprising a central processor, a plurality of tool controllers each operatively associated with a machine tool and located within the housing of said associated machine tool, each of said controllers comprising at least one tool control unit, adapted to provide a data input to the associated machine tool for controlling a tool function and/or for receiving from said tool, a data input indicative of a tool condition, means for independently grounding each housing, a multiple channel data bus connected between the central processor and each of the controllers for the communication of data transactions between the processor and a controller by the transferring of parallel bits of data to and from the processor, and photocoupling means between said tool controllers within said machine tool housing and said data bus whereby the tool controllers in each machine tool housing and the central processor are optically isolated from any transient signals generated within any other machine tool.

18. The system of claim 1 wherein the tool controller associated with each machine tool and the portion of the data distribution means for activating and maintaining the unit data buses connected to units within said controller are located within the housing of said machine tool, and each housing is independently grounded, and the system further includes photocoupling means between said portion of the data distribution means within said machine tool housing and said main data bus whereby the tool controller and the portion of the data distribution means in each machine tool housing and said central processor are optically isolated from any transient signals generated within any other machine tool housing.

19. The system of claim 18 wherein said photocoupling means include an electro-optical switch comprising a transistor amplifier biased in a low-conducting configuration and equipped with an emitter circuit, a collector circuit and an exposed base region, said base region acting as a photon detector over an energy absorption band or frequency absorption spectrum, a load in said collector circuit, a light emitting semiconductor diode positioned to irradiate said exposed base region with photons having an energy radiation band or frequency radiation spectrum overlapping with said energy absorption band or frequency absorption spectrum, and means for forward biasing said diode, whereby said forward biasing signal applied to said diode causes said diode to emit light and radiate photo energy upon said exposed base to generate a base current and to increase said transistor conduction wherein current is driven through said associated load.

20. The system of claim 17 wherein said photocoupling means are located outside of said housings.

21. The system of claim 18 wherein said coupling means are located outside of said housings.

22. The system of claim 21 further including means for decoupling each of said photocoupling means to selectively remove a machine tool housing and the contents of said housing from communication with the central processor.

* * * * *